(12) United States Patent
Myers et al.

(10) Patent No.: US 12,181,400 B2
(45) Date of Patent: *Dec. 31, 2024

(54) FLUID COMPOSITION SENSOR DEVICE AND METHOD OF USING THE SAME

(71) Applicant: Honeywell International Inc., Charlotte, NC (US)

(72) Inventors: Ronald W. Myers, Dublin, OH (US); Jamie W. Speldrich, Freeport, IL (US); Richard Charles Sorenson, London, OH (US); Andy Walker Brown, Richardson, TX (US); Steven Lowery, Grove City, OH (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,325

(22) Filed: Feb. 17, 2022

(65) Prior Publication Data

US 2022/0170838 A1    Jun. 2, 2022

Related U.S. Application Data

(63) Continuation of application No. 16/790,923, filed on Feb. 14, 2020, now Pat. No. 11,333,593.

(51) Int. Cl.
*G01N 15/02* (2006.01)
*G01N 1/22* (2006.01)
(Continued)

(52) U.S. Cl.
CPC ....... *G01N 15/0227* (2013.01); *G01N 1/2208* (2013.01); *G01N 1/2273* (2013.01);
(Continued)

(58) Field of Classification Search
CPC .......... G01N 15/0227; G01N 15/1404; G01N 15/1463; G01N 2015/0233;
(Continued)

(56) References Cited

U.S. PATENT DOCUMENTS

| 4,021,117 A | 5/1977 | Gohde et al. |
| 4,232,967 A | 11/1980 | Grachev et al. |

(Continued)

FOREIGN PATENT DOCUMENTS

| AU | 2018101327 A4 | 10/2018 |
| CA | 2326811 A1 | 5/2002 |

(Continued)

OTHER PUBLICATIONS

English Translation of CN Office Action dated Jan. 6, 2022 for CN Application No. 202010767051.2, 5 page(s).
(Continued)

*Primary Examiner* — Dominic J Bologna
(74) *Attorney, Agent, or Firm* — Alston & Bird LLP

(57) ABSTRACT

Various embodiments are directed to a fluid composition sensor device and method of using the same. In various embodiments, the fluid flow composition sensor is configured to receive a volume of fluid, the fluid composition sensor comprising a housing, a removable fluid flow component, an impactor nozzle, a collection media assembly dock element configured to receive a replaceable collection media assembly comprising a collection media configured to receive one or more particles within the volume of fluid, an imaging device configured to capture an image of at least a portion of the one or more particles received by the fluid composition sensor, and a controller configured to determine, based at least in part on the image, at least one particle characteristic of the volume of fluid. The imaging device may be configured to capture the image of one or more (Continued)

particles received by the fluid composition sensor using lensless holography.

18 Claims, 18 Drawing Sheets

(51) Int. Cl.
| | |
|---|---|
| G01N 15/00 | (2006.01) |
| G01N 15/0227 | (2024.01) |
| G01N 15/06 | (2006.01) |
| G01N 15/075 | (2024.01) |
| G01N 15/14 | (2006.01) |
| G01N 15/1404 | (2024.01) |
| G01N 15/1433 | (2024.01) |
| G01N 15/1434 | (2024.01) |

(52) U.S. Cl.
CPC ............. *G01N 15/00* (2013.01); *G01N 15/06* (2013.01); *G01N 15/1404* (2013.01); *G01N 15/1433* (2024.01); *G01N 2001/2223* (2013.01); *G01N 2015/0233* (2013.01); *G01N 15/075* (2024.01); *G01N 2015/1454* (2013.01); *G01N 2015/1493* (2013.01)

(58) Field of Classification Search
CPC ... G01N 2015/1493; G01N 2001/2223; G01N 2015/1454; G01N 1/2273; G01N 1/2208; G01N 15/00; G01N 15/06; G01N 2015/0693

See application file for complete search history.

(56) References Cited

U.S. PATENT DOCUMENTS

| | | |
|---|---|---|
| 4,839,529 A | 6/1989 | Fruengel |
| 5,001,463 A | 3/1991 | Hamburger |
| 5,040,424 A | 8/1991 | Marple et al. |
| 5,257,087 A | 10/1993 | Furuya |
| 5,404,217 A | 4/1995 | Janik et al. |
| 5,426,501 A | 6/1995 | Hokanson et al. |
| 5,440,145 A | 8/1995 | Cole |
| 5,646,597 A | 7/1997 | Hamburger et al. |
| 5,790,246 A | 8/1998 | Kuhnell et al. |
| 5,870,189 A | 2/1999 | Uesugi et al. |
| 5,870,190 A | 2/1999 | Unger |
| 5,932,795 A | 8/1999 | Koutrakis et al. |
| 6,049,381 A | 4/2000 | Reintjes et al. |
| 6,101,886 A | 8/2000 | Brenizer et al. |
| 6,115,119 A | 9/2000 | Sieracki et al. |
| 6,435,043 B1 | 8/2002 | Ferguson et al. |
| 6,463,814 B1 | 10/2002 | Letarte et al. |
| 6,562,583 B1 | 5/2003 | Herbig et al. |
| 6,629,449 B1 | 10/2003 | Kline-Schoder et al. |
| 6,729,196 B2 | 5/2004 | Moler et al. |
| 6,887,710 B2 | 5/2005 | Call et al. |
| 6,909,269 B2 | 6/2005 | Nagai et al. |
| 7,518,710 B2 | 4/2009 | Gao et al. |
| 7,633,606 B2 | 12/2009 | Northrup et al. |
| 7,762,677 B2 | 7/2010 | Lundgren |
| 7,799,567 B1 | 9/2010 | Call |
| 7,895,000 B2 | 2/2011 | Chandler et al. |
| 8,219,249 B2 | 7/2012 | Harrod et al. |
| 8,506,686 B2 | 8/2013 | Langle et al. |
| 8,866,063 B2 | 10/2014 | Ozcan et al. |
| 9,007,433 B2 | 4/2015 | Ozcan et al. |
| 9,057,702 B2 | 6/2015 | Ozcan et al. |
| 9,057,708 B2 | 6/2015 | Kurosawa et al. |
| 9,170,599 B2 | 10/2015 | Ozcan et al. |
| 9,202,835 B2 | 12/2015 | Ozcan |
| 9,254,500 B2 | 2/2016 | Linnell et al. |
| 9,715,099 B2 | 7/2017 | Ozcan et al. |
| 9,743,909 B1 | 8/2017 | Sapozhnikov et al. |
| 9,772,281 B2 | 9/2017 | Bertaux |
| 9,933,351 B2 | 4/2018 | Kent et al. |
| 9,952,191 B2 | 4/2018 | Crisp |
| 10,066,985 B2 | 9/2018 | Stephen |
| 10,281,371 B2 | 5/2019 | Hong |
| 10,317,320 B2 | 6/2019 | David |
| 10,684,209 B1 | 6/2020 | Manautou |
| 10,718,703 B2 | 7/2020 | Pariseau et al. |
| 10,794,810 B1 | 10/2020 | Brown et al. |
| 10,816,445 B2 | 10/2020 | Kelly et al. |
| 10,876,949 B2 | 12/2020 | Brown et al. |
| 11,221,288 B2 | 1/2022 | Brown et al. |
| 11,835,432 B2 | 12/2023 | McBrady et al. |
| 2002/0124664 A1 | 9/2002 | Call et al. |
| 2003/0142310 A1 | 7/2003 | Bedard et al. |
| 2004/0011975 A1 | 1/2004 | Nicoli et al. |
| 2004/0237671 A1* | 12/2004 | Ryan ..................... G01N 1/2273 73/863.01 |
| 2005/0106739 A1* | 5/2005 | Cabuz .............. A61B 5/150343 436/63 |
| 2005/0214745 A1 | 9/2005 | Ryan |
| 2005/0255001 A1* | 11/2005 | Padmanabhan .... G01N 15/1404 436/63 |
| 2006/0073585 A1 | 4/2006 | Mcdevitt et al. |
| 2006/0234621 A1 | 10/2006 | Desrochers et al. |
| 2007/0035738 A1 | 2/2007 | Bordelon |
| 2007/0159627 A1 | 7/2007 | Johnson |
| 2007/0247718 A1 | 10/2007 | Yoshikawa et al. |
| 2008/0221812 A1 | 9/2008 | Pittaro et al. |
| 2008/0233636 A1 | 9/2008 | Ryan |
| 2009/0027674 A1 | 1/2009 | Laudo |
| 2009/0066934 A1 | 3/2009 | Gao et al. |
| 2009/0097124 A1 | 4/2009 | Lundgren |
| 2009/0128810 A1 | 5/2009 | Bates |
| 2009/0219530 A1 | 9/2009 | Mitchell et al. |
| 2010/0101301 A1 | 4/2010 | Mcbrady et al. |
| 2011/0031394 A1 | 2/2011 | Knowles et al. |
| 2011/0136165 A1 | 6/2011 | Vojnovic et al. |
| 2011/0286884 A1 | 11/2011 | Eickhoff et al. |
| 2012/0096925 A1 | 4/2012 | Hansen et al. |
| 2012/0255375 A1 | 10/2012 | Kwok et al. |
| 2012/0312072 A1 | 12/2012 | Stringham et al. |
| 2012/0315666 A1 | 12/2012 | Fujioka et al. |
| 2013/0220034 A1 | 8/2013 | Peters et al. |
| 2013/0280752 A1 | 10/2013 | Ozcan et al. |
| 2013/0293873 A1 | 11/2013 | Bentien |
| 2014/0123730 A1 | 5/2014 | Yamasaki et al. |
| 2014/0146157 A1 | 5/2014 | Duplisea et al. |
| 2014/0234865 A1 | 8/2014 | Gabriel |
| 2014/0268105 A1 | 9/2014 | Bills et al. |
| 2015/0099272 A1 | 4/2015 | Hwang et al. |
| 2015/0143929 A1 | 5/2015 | Volckens et al. |
| 2015/0177143 A1 | 6/2015 | Fujita et al. |
| 2015/0186842 A1 | 7/2015 | Daniarov |
| 2015/0260617 A1 | 9/2015 | Ketcham et al. |
| 2015/0323941 A1 | 11/2015 | Pariseau et al. |
| 2015/0355000 A1 | 12/2015 | Bates et al. |
| 2015/0355084 A1 | 12/2015 | White |
| 2016/0223435 A1 | 8/2016 | Takenaka et al. |
| 2016/0290912 A1 | 10/2016 | Kent et al. |
| 2016/0290916 A1 | 10/2016 | Ben et al. |
| 2017/0016824 A1 | 1/2017 | Tucker et al. |
| 2017/0123114 A1 | 5/2017 | Stephen |
| 2017/0200197 A1 | 7/2017 | Brubaker |
| 2017/0219464 A1* | 8/2017 | Houghton ............ G01N 1/2208 |
| 2017/0242234 A1 | 8/2017 | Ashcroft et al. |
| 2017/0370809 A1 | 12/2017 | Miller-Lionberg et al. |
| 2018/0052425 A1 | 2/2018 | Ozcan et al. |
| 2018/0054425 A1 | 2/2018 | Abbott |
| 2018/0088020 A1 | 3/2018 | Couderc |
| 2018/0168490 A1 | 6/2018 | Jones et al. |
| 2018/0258469 A1 | 9/2018 | Johnson-Buck et al. |
| 2018/0259429 A1* | 9/2018 | Adams ..................... B64D 1/00 |
| 2018/0321126 A1 | 11/2018 | Manautou et al. |
| 2019/0095586 A1 | 3/2019 | Mcbrady et al. |
| 2019/0265153 A1 | 8/2019 | Rottenberg |
| 2019/0293539 A1* | 9/2019 | Manautou .......... G01N 33/4925 |
| 2019/0294108 A1 | 9/2019 | Ozcan et al. |
| 2019/0331581 A1 | 10/2019 | Ikehata et al. |

(56) References Cited

U.S. PATENT DOCUMENTS

| | | | |
|---|---|---|---|
| 2019/0336050 A1 | 11/2019 | Deck et al. | |
| 2019/0346356 A1 | 11/2019 | Karnik et al. | |
| 2020/0103328 A1 | 4/2020 | Ozcan et al. | |
| 2020/0110018 A1 | 4/2020 | Ryadinskiy et al. | |
| 2020/0240894 A1 | 7/2020 | Isaacman-Vanwertz et al. | |
| 2020/0340901 A1* | 10/2020 | Ozcan | G06N 3/045 |
| 2020/0353166 A1 | 11/2020 | Brown et al. | |
| 2021/0116339 A1 | 4/2021 | Nishikawa et al. | |
| 2021/0164878 A1 | 6/2021 | Brown et al. | |
| 2021/0223155 A1 | 7/2021 | Brown et al. | |
| 2021/0255014 A1 | 8/2021 | Speldrich et al. | |
| 2021/0255080 A1 | 8/2021 | Myers et al. | |
| 2021/0255081 A1 | 8/2021 | Myers et al. | |
| 2022/0065780 A1 | 3/2022 | Myers et al. | |
| 2022/0357261 A1 | 11/2022 | Brown et al. | |

FOREIGN PATENT DOCUMENTS

| | | |
|---|---|---|
| CN | 1695771 A | 11/2005 |
| CN | 103270404 A | 8/2013 |
| CN | 103418295 A | 12/2013 |
| CN | 104081200 A | 10/2014 |
| CN | 204073666 U | 1/2015 |
| CN | 105829860 A | 8/2016 |
| CN | 106323825 A | 1/2017 |
| CN | 107208478 A | 9/2017 |
| CN | 107466364 A | 12/2017 |
| CN | 109578599 A | 4/2019 |
| CN | 110402154 A | 11/2019 |
| CN | 110603069 A | 12/2019 |
| CN | 111272639 A | 6/2020 |
| CN | 114127537 A | 3/2022 |
| EP | 2239557 A1 | 10/2010 |
| EP | 2413293 A1 | 2/2012 |
| EP | 1904826 B1 | 2/2019 |
| EP | 3771898 A1 | 2/2021 |
| JP | 06-511554 A | 12/1994 |
| JP | 2003-075353 A | 3/2003 |
| JP | 2005-534946 A | 11/2005 |
| JP | 2007-101331 A | 4/2007 |
| JP | 2009-025191 A | 2/2009 |
| JP | 2010-145310 A | 7/2010 |
| JP | 2011-502256 A | 1/2011 |
| JP | 2011-139656 A | 7/2011 |
| JP | 2014-095571 A | 5/2014 |
| JP | 2019-511707 A | 4/2019 |
| WO | 2006/013573 A2 | 2/2006 |
| WO | 2012/081285 A1 | 6/2012 |
| WO | 2013/118259 A1 | 8/2013 |
| WO | 2014/156797 A1 | 10/2014 |
| WO | 2015/029673 A1 | 3/2015 |
| WO | 2015/049759 A1 | 4/2015 |
| WO | 2016/073745 A2 | 5/2016 |
| WO | 2016/147018 A1 | 9/2016 |
| WO | 2016/201113 A1 | 12/2016 |
| WO | 2017/051180 A1 | 3/2017 |
| WO | 2017/163650 A1 | 9/2017 |
| WO | 2017/196885 A1 | 11/2017 |
| WO | 2017/196995 A1 | 11/2017 |
| WO | 2018/117146 A1 | 6/2018 |
| WO | 2018/165590 A1 | 9/2018 |
| WO | 2018/176060 A1 | 9/2018 |
| WO | 2019/097523 A1 | 5/2019 |
| WO | 2019/165590 A1 | 9/2019 |
| WO | 2019/210375 A1 | 11/2019 |
| WO | 2020/072234 A1 | 4/2020 |
| WO | 2020/160158 A1 | 8/2020 |
| WO | 2021/034948 A1 | 2/2021 |

OTHER PUBLICATIONS

European Search Report dated Jul. 26, 2021for EP Application No. 21151236.3, 14 page(s).
European search report dated Oct. 10, 2022 for EP Application No. 22169769, 18 page(s).
Final Rejection dated May 15, 2023 for U.S. Appl. No. 17/314,420, 11 page(s).
Intention to grant dated May 4, 2023 for EP Application No. 20188262, 17 page(s).
JP Decision to grant dated Sep. 10, 2021 for JP Application No. 2020-129927, 5 page(s).
Millipore: "Millipore Particle Monitoring Guide," 69 pgs. (1998). [Retrieved from the Internet URL: <http://www.millipore.com/publications.nsf/dda0cb48c91c0fb6852567430063b5d6/b76a969e6d73cbd5852568c5006434c9/$FILEIATTKZK5J/AD030.pdf> on 2002-09-02]., Jan. 1, 1998.
Non-Final Rejection dated Jan. 23, 2023 for U.S. Appl. No. 17/314,420.
Notice of Allowance and Fees Due (PTOL-85) dated Apr. 19, 2023 for U.S. Appl. No. 17/805,072, 11 page(s).
Notice of Allowance and Fees Due (PTOL-85) dated May 9, 2023 for U.S. Appl. No. 17/805,072, 2 page(s).
Requirement for Restriction/Election dated Sep. 30, 2022 for U.S. Appl. No. 17/314,420.
Examiner Interview Summary Record (PTOL-413) dated Oct. 24, 2022 for U.S. Appl. No. 17/805,072, 1 page(s).
Final Office Action dated Mar. 3, 2023 for U.S. Appl. No. 17/247,096.
JP Office Action dated Sep. 30, 2022 for JP Application No. 2021171491, 3 page(s).
Non-Final Rejection dated Mar. 16, 2023 for U.S. Appl. No. 17/080,344, 11 page(s).
Notice of Allowance and Fees Due (PTOL-85) dated Jun. 11, 2021 for U.S. Appl. No. 16/790,918, 7 page(s).
Notice of Allowance and Fees Due (PTOL-85) dated Mar. 16, 2023 for U.S. Appl. No. 17/805,072, 2 page(s).
Notice of Allowance received for U.S. Appl. No. 16/790,923, dated Aug. 27, 2021, 2 pages.
Notice of Allowance received for U.S. Appl. No. 16/790,923, dated Jan. 25, 2022, 2 pages.
Notice of Allowance received for U.S. Appl. No. 16/790,923, dated Nov. 23, 2021, 7 pages.
Notice of Allowance received for U.S. Appl. No. 16/790,924, dated Apr. 15, 2022, 2 pages.
Notice of Allowance received for U.S. Appl. No. 16/790,924, dated Mar. 2, 2022, 14 pages.
Notice of Allowance received for U.S. Appl. No. 17/028,635, dated Apr. 15, 2022, 4 pages.
Notice of Allowance received for U.S. Appl. No. 17/028,635, dated Feb. 15, 2022, 2 pages.
Notice of Allowance received for U.S. Appl. No. 17/028,635, dated Jan. 14, 2022, 8 pages.
Notice of Allowance received for U.S. Appl. No. 17/247,096, dated Apr. 6, 2022, 4 pages.
Notice of Allowance received for U.S. Appl. No. 17/247,096, dated Feb. 18, 2022, 9 pages.
Notice of Allowance received for U.S. Appl. No. 17/247,096, dated Mar. 9, 2022, 4 pages.
Office Action for U.S. Appl. No. 16/396,524 dated Jun. 1, 2020, 13 pages.
Office Action issued in Chinese Application No. 202010767051.2 dated Jan. 6, 2022, 3 pages.
Office Action issued in Chinese Application No. 202010767051.2 dated Jul. 27, 2021, 13 pages.
Office Action received for Chinese Patent Application No. 202010341234.8, dated Jul. 27, 2021, 7 pages (English translation only).
Office Action received for European Application No. 20188262.8, dated Oct. 7, 2021, 6 pages.
Sampling Cassettes & Supplies, [online], [retrieved Nov. 3, 2020] <URL:https://www.emssales.net/cassettes-supplies.html> (5 pages).
Schneider et al., Fast Particle Characterization Using Digital Holography and Neural Networks, 2016, [online article] [retrieved on Mar. 25, 2020] retrieved from the Internet URL: https://www.ncbi.nlm.nih.gov/pubmed/26835632, 7 pages.
Unpublished U.S. Appl. No. 16/396,524, filed Apr. 26, 2019, entitled "Flow Device And Associated Method and System".

(56) References Cited

OTHER PUBLICATIONS

Unpublished U.S. Appl. No. 62/837,066, filed Apr. 22, 2019, entitled "System and Method for Deep Learning-Based Color Holographic Microscopy".
Unpublished U.S. Appl. No. 62/838,149, filed Apr. 24, 2019, entitled "Label-Free Bio-Aerosol Sensing Using Mobile Microscopy and Deep Learning".
Unpublished U.S. Appl. No. 16/530,496 for Fluid Composition Sensor Device and Method of Using the Same, filed Aug. 2, 2019 (Brown et al.) 41 pages.
Unpublished U.S. Appl. No. 16/748,543, for Fluid Composition Sensor Device and Method of Using the Same, filed Jan. 21, 2020 (Brown et al.) 95 pages.
Wallace, J. Kent, et al., "Robust, compact implementation of an off-axis digital holographic microscope", Optics Express, Jun. 29, 2015, pp. 17367-17378. vol. 23, No. 13.
Wu et al. Label-Free Bioaerosol Sensing Using Mobile Microscopy and Deep Learning, , [article, online], 2018, [retrieved Nov. 8, 2018], URL: https://pubs.acs.org/doi/10.1021/acsphotonics.8b01109, 11 pages.
Wu et al., Label-Free Bioaerosol Sensing Using Mobile Microscopy and Deep Learning, [article, online], 2018, [retrieved Jul. 25, 2019], <URL: https://www.semanticscholar.org/paper/Label-Free-Bioaerosol-Sensing-Using-Mobile-and-Deep-Wu-Calis/ff5dc6d661ab985c3d14ec04fb84907d7750ab7>, 16 pages.
Wu et al., Label-Free Bioaerosol Sensing Using Mobile Microscopy and Deep Learning, [article, online], 2018, [retrieved Jul. 25, 2019], <URL: https://www.semanticscholar.org/paper/Label-Free-Bioaerosol-Sensing-Using-Mobile-and-Deep-Wu-Calis/fff5dc6d661ab985c3d14ec04fb84907d7750ab7>, 16 pages.
Notice of Allowance and Fees Due (PTOL-85) dated Jul. 10, 2023 for U.S. Appl. No. 17/080,344, 6 page(s).
Notice of Allowance and Fees Due (PTOL-85) dated Jul. 13, 2023 for U.S. Appl. No. 17/805,072, 2 page(s).
JP Office Action w/English translation dated May 18, 2023 for JP Application No. 2022117842, 5 page(s).
Advisory Action (PTOL-303) dated Jul. 24, 2023 for U.S. Appl. No. 17/314,420, 3 page(s).
CN Office Action dated Jul. 7, 2023 for CN Application No. 202010341234, 6 page(s).
English Translation of CN Office Action dated Jul. 7, 2023 for CN Application No. 202010341234, 10 page(s).
EP Office Action dated Jul. 19, 2023 for EP Application No. 21151236, 8 page(s).
EP Office Action dated Jul. 19, 2023 for EP Application No. 21155330, 7 page(s).
European search report dated Jul. 21, 2023 for EP Application No. 23160818, 11 page(s).
Examiner Interview Summary Record (PTOL-413) dated Jul. 17, 2023 for U.S. Appl. No. 17/247,096, 1 page(s).
Examiner Interview Summary Record (PTOL-413) dated Jul. 24, 2023 for U.S. Appl. No. 17/314,420, 1 page(s).
Non-Final Rejection dated Jul. 17, 2023 for U.S. Appl. No. 17/247,096, 8 page(s).
Notice of Allowance and Fees Due (PTOL-85) dated Jul. 24, 2023 for U.S. Appl. No. 17/080,344, 2 page(s).
Notice of Allowance and Fees Due (PTOL-85) dated Jul. 28, 2023 for U.S. Appl. No. 17/805,072, 2 page(s).
Intention to grant dated Jul. 25, 2023 for EP Application No. 21154848, 9 page(s).
Notice of Allowance and Fees Due (PTOL-85) dated Aug. 10, 2023 for U.S. Appl. No. 17/410,682, 8 page(s).
Notice of Allowance and Fees Due (PTOL-85) dated Aug. 14, 2023 for U.S. Appl. No. 17/805,072, 2 page(s).
Notice of Allowance and Fees Due (PTOL-85) dated Dec. 30, 2022 for U.S. Appl. No. 17/805,072.
JP Notice of Allowance, including Search Report dated May 16, 2023 for JP Application No. 2022113697, 3 page(s).
JP Notice of Allowance, including Search Report dated May 28, 2023 for JP Application No. 2021171491, 3 page(s).
Notice of Allowance and Fees Due (PTOL-85) dated Jun 20, 2023 for U.S. Appl. No. 17/805,072, 10 page(s).
English translation for Office Action for CN Application No. 202010341234.8 dated Jan. 4, 2023.
Office Action for CN Application No. 202010341234.8 dated Jan. 1, 2023.
English translation of JP Decision to Grant dated Apr. 22, 2022 for JP Application No. 2021016701.
English Translation of JP Office Action dated Dec. 21, 2021 for JP Application No. 2021017841.
EP Office Action dated Oct. 7, 2021 for EP Application No. 20188262.
European search report dated Jul. 9, 2021 for EP Application No. 21154848.
European search report dated Jul. 19, 2021 for EP Application No. 21155330.
European search report dated Mar. 22, 2022 for EP Application No. 21204589.
JP Decision to Grant dated Apr. 22, 2022 for JP Application No. 2021016701.
JP Office Action dated Dec. 21, 2021 for JP Application No. 2021017841.
List of references Mailed on Apr. 27, 2021 for U.S. Appl. No. 16/748,543.
List of references Mailed on Aug. 24, 2021 for U.S. Appl. No. 16/748,543.
List of references Mailed on May 10, 2022 for U.S. Appl. No. 17/247,096.
Non-Final Rejection dated Feb. 2, 2021 for U.S. Appl. No. 16/790,923.
Notice of Allowance and Fees Due (PTOL-85) dated Apr. 6, 2022 for U.S. Appl. No. 17/247,096.
Notice of Allowance and Fees Due (PTOL-85) dated Apr. 13, 2022 for U.S. Appl. No. 16/790,923.
Notice of Allowance and Fees Due (PTOL-85) dated Apr. 15, 2022 for U.S. Appl. No. 16/790,924.
Notice of Allowance and Fees Due (PTOL-85) dated Apr. 15, 2022 for U.S. Appl. No. 17/028,635.
Notice of Allowance and Fees Due (PTOL-85) dated Apr. 20, 2022 for U.S. Appl. No. 16/790,923.
Notice of Allowance and Fees Due (PTOL-85) dated Aug. 18, 2021 for U.S. Appl. No. 16/790,918.
Notice of Allowance and Fees Due (PTOL-85) dated Aug. 24, 2021 for U.S. Appl. No. 16/748,543.
Notice of Allowance and Fees Due (PTOL-85) dated Aug. 27, 2021 for U.S. Appl. No. 16/790,923.
Notice of Allowance and Fees Due (PTOL-85) dated Feb. 15, 2022 for U.S. Appl. No. 17/028,635.
Notice of Allowance and Fees Due (PTOL-85) dated Jan. 25, 2022 for U.S. Appl. No. 16/790,923.
Notice of Allowance and Fees Due (PTOL-85) dated Jun. 10, 2022 for U.S. Appl. No. 16/790,924.
Notice of Allowance and Fees Due (PTOL-85) dated Jun. 11, 2021 for U.S. Appl. No. 16/790,923.
Notice of Allowance and Fees Due (PTOL-85) dated Nov. 23, 2021 for U.S. Appl. No. 16/790,923.
Notice of Allowance received for Chinese Patent Application No. 202010767051.2, dated Mar. 17, 2022, 6 pages (2 pages of English Translation and 4 pages of Original Document).
Notice of Allowance received for U.S. Appl. No. 16/790,924, dated Jun. 10, 2022, 2 pages.
Notice of Allowance received for U.S. Appl. No. 16/790,924, dated Jun. 23, 2022, 2 pages.
Office Action received for Japanese Patent Application No. 2021-017841, dated Apr. 19, 2022, 4 pages (2 pages of English Translation and 2 pages of Office Action).
CN Search report dated Jul. 19, 2021 for CN Application No. 202010341234.
Communication about intention to grant a European patent dated Oct. 12, 2022 for EP Application No. 20170458.
Communication about intention to grant a European patent received for European Application No. 20170458.2, dated Oct. 12, 2022, 6 pages.

(56) References Cited

OTHER PUBLICATIONS

English Translation of CN Office Action dated Jul. 27, 2021 for CN Application No. 202010341234.
European search report dated Mar. 3, 2022 for EP Application No. 21195550.
Non-Final Office Action dated Oct. 14, 2022 for U.S. Appl. No. 17/247,096.
Non-Final Office Action dated Oct. 26, 2022 for U.S. Appl. No. 17/410,682.
Non-Final Rejection dated Jun. 1, 2020 for U.S. Appl. No. 16/396,524.
Notice of Allowance and Fees Due (PTOL-85) dated Oct. 24, 2022 for U.S. Appl. No. 17/805,072.
Final Rejection dated Apr. 11, 2023 for U.S. Appl. No. 17/410,682, 9 page(s).
English Translation of JP Office Action dated Apr. 19, 2022 for JP Application No. 2021017841.
English Translation of JP Office Action dated Dec. 17, 2021 for JP Application No. 2021016701.
JP Office Action dated Dec. 17, 2021 for JP Application No. 2021016701.
JP Search report dated Dec. 13, 2021 for JP Application No. 2021016701.
Non-Final Rejection dated Sep. 30, 2021 for U.S. Appl. No. 16/790,924.
Notice of Allowance and Fees Due (PTOL-85) dated Jun. 23, 2022 for U.S. Appl. No. 16/790,924.
Notice of Allowance and Fees Due (PTOL-85) dated Mar. 2, 2022 for U.S. Appl. No. 16/790,924.
JP Notice of Allowance dated May 16, 2023 for JP Application No. 2022113697, 3 page(s).
Notice of Allowance and Fees Due (PTOL-85) dated Jun. 13, 2023 for U.S. Appl. No. 17/410,682, 8 page(s).
Air Sampling Filter Cassette Housings, [online], [retrieved Feb. 11, 2020_ <URL: https://www.zefon.com/cassette-housings> (10 pages).
Allergenco-D & Allergenco-D Posi-Track [online], [retrieved Feb. 11, 2020_ <URL: https://www.emssales.net/media/wysiwyg/uploads/ad peer reviewed study.pdf> 9 pages.
Communication Pursuant to Article 94(3) issued in European Application No. 20188262.8 dated Oct. 7, 2021, 6 pages.
Corrected Notice of Allowability (PTOL-37) for U.S. Appl. No. 16/790,918, dated Oct. 18, 2021, 10 pages.
Corrected Notice of Allowability (PTOL-37) dated Aug. 27, 2021 for U.S. Appl. No. 16/790,923.
Corrected Notice of Allowability (PTOL-37) received for U.S. Appl. No. 16/748,543, dated Oct. 1, 2021, 2 pages.
Corrected Notice of Allowability (PTOL-37) received for U.S. Appl. No. 16/790,918, dated Sep. 22, 2021, 2 pages.
Corrected Notice of Allowability (PTOL-37) received for U.S. Appl. No. 16/790,923, dated Aug. 27, 2021, 2 pages.
Decision to Grant issued in Japanese Application No. 2020-129927 dated Sep. 10, 2021, 5 pages.
Default Unpublished U.S. Appl. No. 16/396,524, filed Apr. 26, 2019, entitled "Flow Device And Associated Method and System".
European search opinion dated Dec. 8, 2020 for EP Application No. 20188262.8, 1 page.
European search opinion dated Sep. 10, 2020 for EP Application No. 20170458.2, 4 pages.
European Search Report and Search Opinion Received for EP Application No. 20211654.7, dated May 3, 2021, 9 pages.
European Search Report and Search Opinion received for EP Application No. 21151236.3, dated Jul. 26, 2021, 14 pages.
European Search Report and Search Opinion Received for EP Application No. 21154848.2, dated Jul. 9, 2021, 14 pages.
European Search Report and Search Opinion Received for EP Application No. 21155330.0, dated Jul. 19, 2021, 11 pages.
European Search Report and Search Opinion Received for EP Application No. 21156433.1, dated Jul. 14, 2021, 7 pages.
European Search Report and Search Opinion received for EP Application No. 21204589.2, dated Mar. 22, 2022, 10 pages.
European search report dated Dec. 8, 2020 for EP Application 20188262.
European search report dated Dec. 8, 2020 for EP Application No. 20188262.8, 2 pages.
European search report dated Sep. 10, 2020 for EP Application No. 20170458.2, 2 pages.
Examiner Interview Summary Record (PTOL-413) dated Apr. 27, 2021 for U.S. Appl. No. 16/748,543.
Extended European Search Report for Patent Application No. 20170458.2 dated Sep. 10, 2020, 8 pages.
Extended European Search Report issued in European Application No. 20188262.8 dated Dec. 8, 2020, 5 pages.
Extended European Search Report issued in European Application No. 21151236.3 dated Jul. 26, 2021, 14 pages.
Extended European Search Report issued in European Application No. 21156433.1 dated Jul. 14, 2021, 7 pages.
Extended European Search Report dated Jan. 14, 2022 for EP Application No. 21193185.2, 10 pages.
HPM Series Particulate Matter Sensors, [article, online], 2019, [retrieved Jul. 25, 2019] <URL: https://sensing.honeywell.com/sensors/particulate-sensors/hpm-series, 11 pages.
JP Search report dated Dec. 13, 2021 for JP Application No. 2021017841.
Non-Final Office Action issued in U.S. Appl. No. 16/790,918 dated Jan. 28, 2021.
Non-Final Office Action issued in U.S. Appl. No. 16/790,923 dated Feb. 2, 2021.
Non-Final Office Action received for U.S. Appl. No. 16/790,924, dated Sep. 30, 2021, 18 pages.
Non-Final Office Action received for U.S. Appl. No. 17/028,635, dated Sep. 15, 2021, 13 pages.
Non-Final Office Action received for U.S. Appl. No. 17/247,096, dated May 10, 2022, 10 pages.
Non-Final Office Action received for U.S. Appl. No. 17/247,096, dated Nov. 4, 2021, 13 pages.
Non-Final Office Action received for U.S. Appl. No. 17/247,096, dated Nov. 4, 2021, 14 pages.
Non-Final Rejection dated Apr. 27, 2021 for U.S. Appl. No. 16/748,543.
Notice of Allowance (PTOL-37) dated Jun. 11, 2021 for U.S. Appl. No. 16/790,923.
Notice of Allowance and Fees Due (PTOL-85) dated Sep. 8, 2020 for U.S. Appl. No. 16/396,524.
Notice of Allowance for U.S. Appl. No. 16/530,496 dated Jun. 2, 2020, 25 pages.
Notice of Allowance received for U.S. Appl. No. 16/748,543, dated Aug. 24, 2021, 10 pages.
Notice of Allowance received for U.S. Appl. No. 16/748,543, dated Dec. 3, 2021, 2 pages.
Notice of Allowance received for U.S. Appl. No. 16/748,543, dated Nov. 8, 2021, 2 pages.
Notice of Allowance received for U.S. Appl. No. 16/748,543, dated Oct. 1, 2021, 2 pages.
Notice of Allowance received for U.S. Appl. No. 16/790,918, dated Aug. 18, 2021, 2 pages.
Notice of Allowance received for U.S. Appl. No. 16/790,918, dated Oct. 18, 2021, 2 pages.
Notice of Allowance received for U.S. Appl. No. 16/790,918, dated Sep. 22, 2021, 2 pages.
Notice of Allowance received for U.S. Appl. No. 16/790,923, dated Apr. 20, 2022, 2 pages.
Non-Final Rejection dated Sep. 6, 2023 for U.S. Appl. No. 17/314,420, 10 page(s).
Decision to grant a European patent dated Sep. 7, 2023 for EP Application No. 20188262, 2 page(s).
CN Office Action, including Search Report dated Nov. 4, 2023 for CN Application No. 202110187527, 6 page(s).
English Translation of CN Office Action dated Nov. 4, 2023 for CN Application No. 202110187527, 1 page(s).
English translation of CN Search report dated Nov. 4, 2023 for CN Application No. 202110187527, 3 page(s).
Non-Final Rejection dated Nov. 27, 2023 for U.S. Appl. No. 17/314,420, 9 page(s).

(56) References Cited

OTHER PUBLICATIONS

Notice of Allowance and Fees Due (PTOL-85) dated Nov. 22, 2023 for U.S. Appl. No. 17/247,096, 10 page(s).
CN Office Action, including Search Report dated Nov. 15, 2023 for CN Application No. 202110188303, 7 page(s).
CN Office Action, including Search Report dated Nov. 20, 2023 for CN Application No. 202110080239, 5 page(s).
CN Office Action, including Search Report dated Oct. 13, 2023 for CN Application No. 202110188035, 10 page(s).
Decision to grant a European patent dated Dec. 8, 2023 for EP Application No. 21154848, 2 page(s).
English Translation of CN Office Action dated Nov. 15, 2023 for CN Application No. 202110188303, 4 page(s).
English Translation of CN Office Action dated Oct. 13, 2023 for CN Application No. 202110188035, 6 page(s).
English Translation of CN Office Action, including Search Report dated Nov. 20, 2023 for CN Application No. 202110080239, 5 page(s).
English translation of CN Search report dated Nov. 15, 2023 for CN Application No. 202110188303, 2 page(s).
English translation of CN Search report dated Oct. 13, 2023 for CN Application No. 202110188035, 3 page(s).
English translation of JP Decision to Grant dated Oct. 17, 2023 for JP Application No. 2022117842, 3 page(s).
English Translation of JP Office Action dated Sep. 20, 2023 for JP Application No. 2022180787, 3 page(s).
JP Decision to Grant dated Oct. 17, 2023 for JP Application No. 2022117842, 3 page(s).
JP Office Action dated Sep. 20, 2023 for JP Application No. 2022180787, 3 page(s).
CN Office Action—Decision of Rejection dated Dec. 11, 2023 for CN Application No. 202010341234, 8 page(s).
English Translation of CN Office Action—Decision of Rejection dated Dec. 11, 2023 for CN Application No. 202010341234, 10 page(s).
Intention to grant dated Dec. 15, 2023 for EP Application No. 21156433, 9 page(s).
Communication about intention to grant a European patent Mailed on Mar. 7, 2024 for EP Application No. 21204589, 6 page(s).
European search report and search opinion Mailed on Mar. 11, 2024 for EP Application No. 23215872, 13 page(s).
Intention to grant Mailed on Feb. 20, 2024 for EP Application No. 21193185, 6 page(s).
JP Decision to Grant Mailed on Mar. 1, 2024 for JP Application No. 2022180787, 5 page(s).
JP Office Action Mailed on Feb. 26, 2024 for JP Application No. 2021137874, 12 page(s).
CN Notice of Allowance Mailed on Apr. 10, 2024 for CN Application No. 202110187527, 2 page(s).
English Travel of CN Notice of Allowance dated Apr. 10, 2024 for CN Application No. 202110187527, 3 page(s).
Notice of Allowance and Fees Due (PTOL-85) Mailed on Apr. 15, 2024 for U.S. Appl. No. 18/471,167, 14 page(s).
Non-Final Rejection Mailed on Jul. 1, 2024 for U.S. Appl. No. 17/805,072, 17 page(s).
CN Office Action, including Search Report Mailed on Jul. 20, 2024 for CN Application No. 202110080239, 6 page(s).
Decision to grant a European patent Mailed on Jul. 11, 2024 for EP Application No. 21204589, 2 page(s).
Decision to grant a European patent Mailed on Jun. 13, 2024 for EP Application No. 21193185, 2 page(s).
English Translation of CN Office Action, including Search Report dated Jul. 20, 2024 for CN Application No. 202110080239, 6 page(s).
English Translation of JP Office Action dated Jul. 11, 2024 for JP Application No. 2023130726, 2 page(s).
English Translation of JP Office Action dated Jun. 3, 2024 for JP Application No. 2021137874, 3 page(s).
JP Office Action Mailed on Jul. 11, 2024 for JP Application No. 2023130726, 2 page(s).
JP Office Action Mailed on Jun. 3, 2024 for JP Application No. 2021137874, 3 page(s).
CN Notice of Allowance Mailed on May 13, 2024 for CN Application No. 202110188035, 3 page(s).
Non-Final Rejection Mailed on May 3, 2024 for U.S. Appl. No. 18/484,237, 11 page(s).
CN Office Action, including Search Report Mailed on Aug. 23, 2024 for CN Application No. 202110188303, 6 page(s).
English Translation of CN Office Action dated Aug. 23, 2024 for CN Application No. 202110188303, 4 page(s).
English Translation of CN Office Action dated Aug. 23, 2024 for CN Application No. 202110188303, 2 page(s).
CN Office Action Mailed on Aug. 28, 2024 for CN Application No. 202010341234, 6 page(s).
English Translation of CN Office Action dated Aug. 28, 2024 for CN Application No. 202010341234, 7 page(s).
English Translation of JP Decision to Grant dated Sep. 9, 2024 for JP Application No. 2021137874, 2 page(s).
JP Decision to Grant Mailed on Sep. 9, 2024 for JP Application No. 2021137874, 3 page(s).
Non-Final Rejection Mailed on Sep. 19, 2024 for U.S. Appl. No. 18/471,167, 31 page(s).
Notice of Allowance and Fees Due (PTOL-85) Mailed on Sep. 18, 2024 for U.S. Appl. No. 18/484,297, 6 page(s).
Notice of Allowance and Fees Due (PTOL-85) Mailed on Sep. 30, 2024 for U.S. Appl. No. 18/399,419, 6 page(s).
CN Office Action Mailed on Oct. 17, 2024 for CN Application No. 202010341234, 7 page(s).
English Translation of CN Office Action dated Oct. 17, 2024 for CN Application No. 202010341234, 7 page(s).
Extended European Search Report Mailed on Oct. 18, 2024 for EP Application No. 24188454, 5 page(s).
Intention to grant Mailed on Oct. 17, 2024 for EP Application No. 22182866, 8 page(s).
European search report Mailed on Nov. 13, 2024 for EP Application No. 24174131, 10 page(s).

* cited by examiner

FLUID COMPOSITION SENSOR DEVICE AND METHOD OF USING THE SAME

CROSS-REFERENCE TO RELATED APPLICATIONS

This patent application is a continuation of U.S. application Ser. No. 16/790,923 filed Feb. 14, 2020, which is incorporated herein by reference in its entirety.

BACKGROUND

Sensors and devices may be utilized to characterize various aspects of fluids in a wide variety of applications. As just one example, sensor devices may be utilized for monitoring air conditions, such as monitoring and characterizing the particulate content of a flow of air. However, existing fluid sensor devices provide limited functionality in generating data indicative of certain characteristics of fluids, such as the unique identity and concentration of individual particles contained within a fluid flow. Fluid sensor devices can use holographic imaging methods to characterize particle identity and concentration of particulate matter that has been collected via inertial impaction. It is desirable to improve various aspects of particle sampling and analysis. In general, it can be advantageous for a fluid sampling device to utilize a sampling media that enables rapid and/or simplified sequential sampling of particles. For devices utilizing holographic imaging (such as lensless holography) for in situ particle analysis, it is desirable to avoid optical reflections and scattering in order to achieve optimal image quality.

Accordingly, a need exists for an improved fluid sensor device capable of accurately collecting and analyzing the particle content of a sample volume of fluid from an ambient environment using a single sensor device in an easily repeatable manner.

BRIEF SUMMARY

Various embodiments described herein relate to apparatuses and methods for collecting and characterizing particles suspended within a fluid. Various embodiments are directed to a device for detecting fluid particle characteristics comprising: a fluid composition sensor configured to receive a volume of fluid, the fluid composition sensor comprising: a removable fluid flow component disposed within an internal sensor portion and configured to define at least a portion of a fluid flow path; a collection media assembly dock element configured to receive a replaceable collection media assembly comprising a collection media configured to receive one or more particles of a plurality of particles within the volume of fluid such that the replaceable collection media assembly is arranged within the internal sensor portion in a particle collection position; an imaging device configured to capture an image of at least a portion of the one or more particles of the plurality of particles received by the collection media; a controller configured to determine, based at least in part on the image, at least one particle characteristic of the plurality of particles of the volume of fluid; wherein at least a portion of the fluid flow path extends in a fluid flow direction that is at least substantially toward the collection media; wherein the collection media assembly dock element is configured to constrain relative movement between the replaceable collection media assembly and the imaging device in a lateral direction.

In various embodiments, the imaging device may be configured to capture the image of one or more particles of the plurality of particles received by the collection media using lensless holography. In various embodiments, the collection media assembly dock element may comprise one or more alignment features configured to engage the replaceable collection media assembly so as to constrain the replaceable collection media assembly against movement relative to the collection media assembly dock element. In certain embodiments, the replaceable collection media assembly may further comprise one or more alignment features configured to engage the collection media assembly dock element so as to constrain the replaceable collection media assembly against movement relative to the collection media assembly dock element in at least a second direction.

In various embodiments, the fluid composition sensor may further comprise a housing defining the internal sensor portion and comprising a fluid inlet configured to receive the volume of fluid; wherein the housing is selectively configurable between an open housing configuration and a closed housing configuration, wherein the open housing configuration provides an opening through which a replaceable collection media assembly may be removed from within the internal sensor portion, and wherein the fluid composition sensor in the closed configuration is configured to constrain the replaceable collection media assembly against movement relative to the collection media assembly dock element in at least the lateral direction, a vertical direction, and an angular direction. In certain embodiments, the removable fluid flow component may be configured to be removable from within the internal sensor portion when the fluid composition sensor in the open configuration. Further, in certain embodiments, the removable fluid flow component may comprise a first fluid flow component part and a second fluid flow component part, wherein the first fluid flow component part is configured to be separable from the second fluid flow component to facilitate selective access to an internal portion of the removable fluid flow component. In various embodiments, the fluid composition sensor may be configured such that when the fluid composition sensor is in the closed configuration, a vertical compression force is applied to the replaceable collection media assembly so as to at least partially constrain the replaceable collection media assembly in a vertical direction.

In various embodiments, the collection media assembly dock element may comprise an imaging orifice configured so as to define a line of sight to the one or more particles received by the collection media, the line of sight extending through at least a portion of the collection media assembly dock element. In certain embodiments, the fluid composition sensor may further comprise a removable transparent protective cover arranged within the internal sensor portion and configured to cover at least a portion of the imaging orifice. In various embodiments, the imaging device may be operatively secured to the collection media assembly dock element.

In various embodiments, the fluid flow path is defined at least in part by a fluid impaction outlet disposed within the internal sensor portion and configured relative to the collection media assembly dock element so as to direct the volume of fluid in a fluid flow direction at least substantially perpendicular to the collection media of the replaceable collection media assembly received by the collection media assembly dock element. Further, in various embodiments, the fluid impaction outlet may be defined at least in part by a fluid impaction outlet shape that is at least substantially similar to a field of view shape of the imaging device. In certain embodiments, the fluid impaction outlet may be defined at least in part by a fluid impaction outlet area that is at least substantially similar to a field of view area of the imaging device disposed. In various embodiments, the fluid composition sensor may be configured such that at least a portion of the collection media of the replaceable collection media assembly received by the collection media assembly dock element is at least substantially aligned with a field of view of the imaging device and a central axis of the fluid impaction outlet. In various embodiments, the wherein the fluid flow path may be defined at least in part by an impactor nozzle, and wherein the fluid impaction outlet is defined by an impactor nozzle outlet of the impactor nozzle.

In various embodiments, the device may further comprise at least one illumination source configured to emit one or more light beams so as to engage the collection media of the replaceable collection media assembly received by the collection media assembly dock element and illuminate the one or more particles received by the collection media. In various embodiments, the fluid composition sensor may be configured such that the volume of fluid passes over at least a portion of an internal circuitry disposed within the internal sensor portion before the volume of fluid is dispensed from the internal sensor portion through a fluid outlet of the fluid composition sensor. In various embodiments, one or both of the controller and the imaging device may be configured to read one or more identification elements disposed on the replaceable collection media assembly received by the collection media assembly dock element so as to identify the replaceable collection media assembly, wherein the one or more identification elements configured to uniquely identify the replaceable collection media assembly. In certain embodiments, the fluid composition sensor may be configured to consecutively receive a plurality of replaceable collection media assemblies within the internal sensor portion in series.

Various embodiments are directed to a method for detecting fluid particle characteristics comprising: receiving, via a sensor, a volume of fluid; directing the volume of fluid, via an impactor nozzle, toward a collection media of a replaceable collection media assembly; receiving, via the collection media, one or more particles of a plurality of particles within the volume of fluid; capturing, using an imaging device disposed within the sensor, an image of the one or more particles of the plurality of particles received by the collection media; determining, based at least in part on the image, at least one particle characteristic of the plurality of particles of volume of fluid; and upon determining the at least one particle characteristic of the plurality of particles of volume of fluid, reconfiguring the sensor to an open configuration; and replacing the replaceable collection media assembly with a second replaceable collection media assembly; wherein the second replaceable collection media assembly comprises at least one alignment feature, and wherein replacing the replaceable collection media assembly with the second replaceable collection media assembly comprises positioning the second replaceable collection media assembly within a portion of the sensor based at least in part on at least one alignment feature.

In various embodiments, the method may further comprise reconfiguring the sensor to a closed configuration, wherein reconfiguring the sensor to the closed configuration comprises constraining the second replaceable collection media assembly in at least a lateral direction, a vertical direction, and an angular direction relative to the sensor. In certain embodiments, the image of the one or more particles of the plurality of particles received by the collection media may be captured using lensless holography.

Various embodiments are directed to a collection media assembly for receiving one or more particles from a volume of fluid within a fluid composition sensor, the collection media assembly comprising: a housing; a transparent substrate; a collection media disposed upon the transparent substrate and configured to receive one or more particles from a volume of fluid received through a fluid inlet; and at least one alignment feature; wherein the housing defines an open lower end configured for interaction with an imaging device, such that the one or more particles received by the collection media are visible through the transparent substrate from the open lower end of the housing; and wherein each of the at least one alignment features is configured to engage a corresponding element disposed within the fluid composition sensor so as to constrain relative movement between the collection media assembly and the corresponding element in at least a first direction.

In various embodiments, the collection media assembly may further comprise at least one orifice extending through at least a portion of the housing, the at least one orifice being arranged so as to define a line of sight to the one or more particles received by the collection media, the line of sight extending through at least a portion of the housing. In certain embodiments, the at least one orifice may be configured to enable the volume of fluid to flow through the collection media assembly. In various embodiments, the housing may comprise a first housing portion and a second housing portion, wherein the first housing portion and the second housing portion are configured to at least partially constrain the collection media relative to the housing. In various embodiments, the housing may be defined at least in part by a central vertical axis extending therethrough in a vertical direction, and wherein the housing comprises a perimeter that is asymmetric about the central vertical axis.

In various embodiments, the at least one alignment features of the collection media assembly may be configured to constrain relative movement between the collection media assembly and an imaging device disposed within the fluid composition sensor. In certain embodiments, the at least one alignment features of the collection media assembly may be configured to constrain the replaceable collection media assembly relative to the fluid composition sensor in at least a lateral direction, a vertical direction, and an angular direction. In various embodiments, the fluid inlet may be defined at least in part by a fluid inlet shape that is at least substantially similar to a field of view shape of an imaging device disposed within the fluid composition sensor.

In various embodiments, the fluid inlet may be defined at least in part by a fluid inlet area that is at least substantially similar to a field of view area of an imaging device disposed within the fluid composition sensor. In certain embodiments, the collection media assembly may further comprise an impactor nozzle configured to define at least a portion of the fluid inlet of the collection media assembly, wherein the impactor nozzle is configured to direct the volume of fluid toward the collection media in a fluid flow direction that is at least substantially perpendicular to the collection media. In certain embodiments, the impactor nozzle may comprise an impactor nozzle outlet defined at least in part by a nozzle outlet shape that is at least substantially similar to a field of view shape of the imaging device disposed within the fluid composition sensor. In certain embodiments, the impactor nozzle may comprise an impactor nozzle outlet defined at least in part by a nozzle outlet area that is at least substantially similar to a field of view area of the imaging device disposed within the fluid composition sensor.

Various embodiments are directed to a device for detecting fluid particle characteristics comprising: a fluid composition sensor configured to receive a volume of fluid, the fluid composition sensor comprising: a housing defining an internal sensor portion and comprising a fluid inlet configured to receive the volume of fluid; a fluid flow component disposed within the internal sensor portion and configured to define at least a portion of a fluid flow path; an impactor nozzle configured to receive at least a portion of the volume of fluid such that the at least a portion of the volume of fluid received by the impactor nozzle is directed in a fluid flow direction; at least one collection media assembly dock element configured to receive a replaceable collection media assembly comprising a collection media configured to receive one or more particles of a plurality of particles within the volume of fluid such that the replaceable collection media assembly is arranged within the internal sensor portion in a particle collection position and constrained against movement relative to the at least one collection media assembly dock element in at least one direction; an imaging device configured to capture an image of at least a portion of the one or more particles of the plurality of particles received by the collection media of the replaceable collection media assembly received by the at least one collection media assembly dock element; a collection media assembly ejection element; and a controller configured to determine, based at least in part on the image, at least one particle characteristic of the plurality of particles of volume of fluid; wherein the fluid flow direction is at least substantially toward the collection media; wherein the fluid composition sensor is configured to receive a pressing force from the replaceable collection media assembly so as to constrain the replaceable collection media assembly against movement relative to the imaging device in at least a vertical direction.

In various embodiments, the fluid composition sensor may be configured to, upon receiving the pressing force received from the replaceable collection media assembly, align the replaceable collection media assembly in a position at least substantially adjacent the imaging device so as to define an air seal that at least partially isolates the imaging device from the volume of fluid. In various embodiments, one or both of the controller and the imaging device may be configured to read one or more identification elements disposed on the replaceable collection media assembly received by the collection media assembly dock element so as to identify the replaceable collection media assembly, and wherein the one or more identification elements are configured to uniquely identify the replaceable collection media assembly. In various embodiments, the impactor nozzle may comprise an impactor nozzle outlet defined at least in part by a nozzle outlet shape that is at least substantially similar to a field of view shape of the imaging device. In certain embodiments, the impactor nozzle may comprise an impactor nozzle outlet defined at least in part by a nozzle outlet area that is at least substantially similar to the field of view area of the imaging device. In various embodiments, the collection media assembly ejection element may be configured to engage a latch of the replaceable collection media assembly received by the at least one collection media assembly dock element, the latch being configured to impede the removal of the replaceable collection media assembly from the sensor.

Various embodiments are directed to a collection media assembly for receiving one or more particles from a volume of fluid within a fluid composition sensor, the collection media assembly comprising: a frame element; a transparent substrate; a collection media disposed upon the transparent substrate and configured to receive one or more particles from a volume of fluid; and at least one compression element configured to apply a pressing force against an adjacent portion of an internal sensor portion within the fluid composition sensor so as to constrain the replaceable collection media assembly relative to an imaging device of the fluid composition sensor in at least one direction; and a latch configured to impede the removal of the replaceable collection media assembly from the sensor; wherein each of the at least one alignment features is configured to engage a corresponding element disposed within a fluid composition sensor so as to constrain relative movement between the collection media assembly and the corresponding element in at least a vertical direction. In various embodiments, the collection media assembly may further comprise one or more identification elements configured to uniquely identify the replaceable collection media assembly, wherein the one or more identification elements are further configured to be read by the imaging device.

Various embodiments are directed to a method for detecting fluid particle characteristics comprising: inserting at least a portion of a collection media assembly into an interior portion of a sensor, the collection media assembly comprising: a collection media configured to receive one or more particles of a plurality of particles within the volume of fluid; at least one compression element configured to apply a pressing force against an adjacent portion of the internal sensor portion so as to constrain the replaceable collection media assembly relative to the imaging device in at least one direction; a latch configured to impede the removal of the replaceable collection media assembly from the sensor; receiving, via the sensor, a volume of fluid; directing the volume of fluid, via an impactor nozzle in a first nozzle configuration, toward the collection media of the collection media assembly, receiving, via the collection media, one or more particles of a plurality of particles within the volume of fluid; capturing, using an imaging device disposed within the sensor, an image of the one or more particles of the plurality of particles received by the collection media; determining, based at least in part on the image, at least one particle characteristic of the plurality of particles of volume of fluid; and upon determining the at least one particle characteristic of the plurality of particles of volume of fluid, removing the collection media assembly from the internal portion of the sensor. In certain embodiments, method may further comprise identifying, using one or both of a sensor controller and the imaging device, the replaceable collection media assembly based at least in part on an identifying element disposed thereon.

BRIEF DESCRIPTION OF THE DRAWINGS

Reference will now be made to the accompanying drawings, which are not necessarily drawn to scale, and wherein.

DETAILED DESCRIPTION

Figure 1:
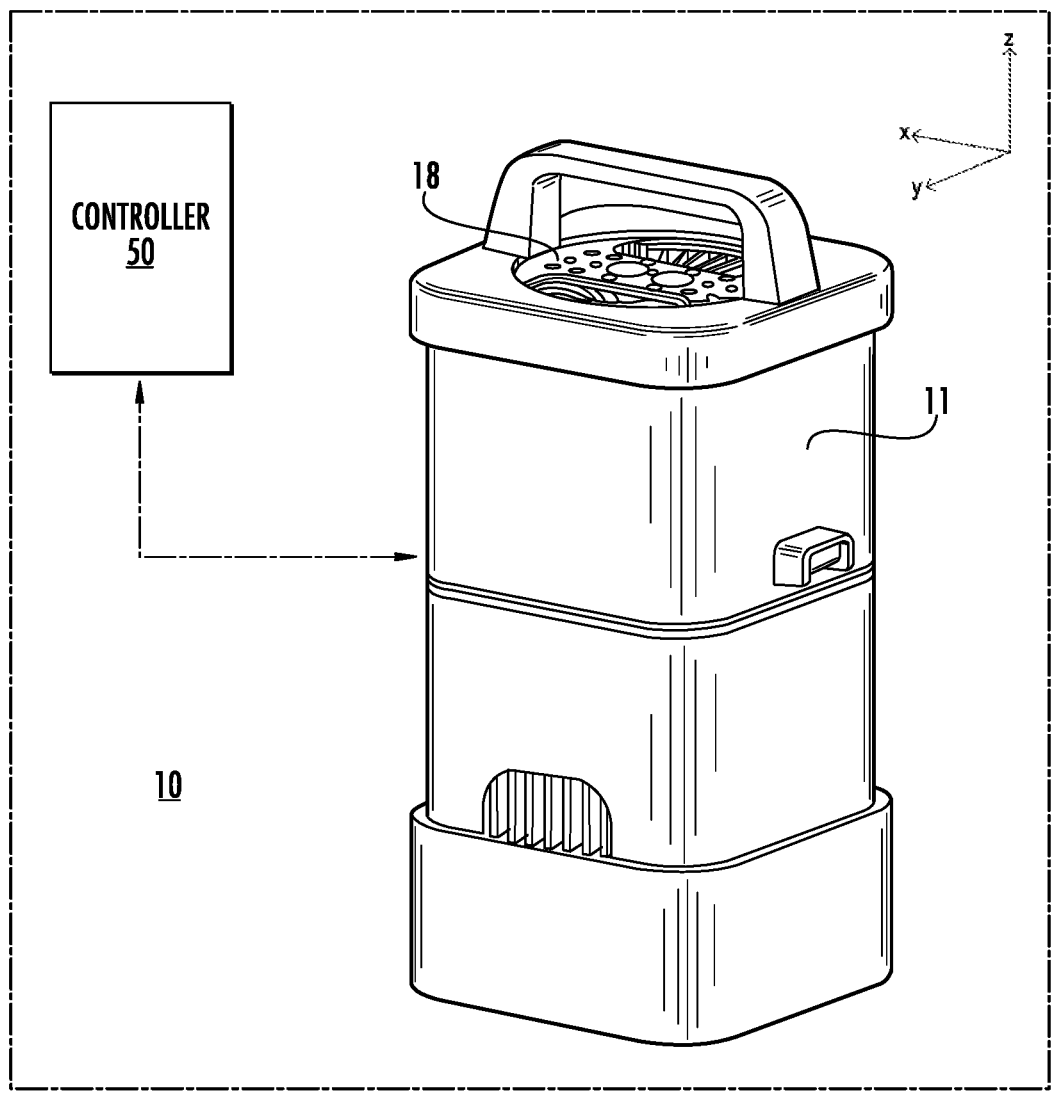
FIG. 1 illustrates a perspective view of an exemplary fluid composition sensor in accordance with various embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations. As used herein, a "fluid" may be embodied as a gas, a liquid, or a combination of a gas and a liquid in a single flow. Thus, the term "fluid" encompasses various materials subject to flow, such as, but not limited to, liquids and/or gases (e.g., air, oil, or the like). Thus, various embodiments are directed to fluid sensing systems, such as gas sensing systems (e.g., certain embodiments being specifically configured for operation with air; other embodiments being configured for operation with other gases, such as inert gases, volatile gases, and/or the like), liquid sensing systems, and/or the like.

Overview

Described herein is a device (which may be referred to as a fluid composition sensor, a fluid particulate sensor, a gas particulate sensor, or an air particulate senor as discussed herein) configured to characterize and monitor particulate matter within a volume of fluid. The device discussed herein may be configured to quantify and classify the particles within a volume of fluid based at least in part on the imaging of particles received by a collection media of a fluid composition sensor. Further, the device discussed herein may be configured to characterize the particle composition within the volume of fluid by directly identifying the particle size and particle type of each of the particles received by the collection media of the fluid composition sensor. By directly determining the particle size and particle type, the device as described herein may be configured to detect a change in particle composition within a volume of fluid over time and/or location.

Further, the device described herein may be configured to execute both a particle collection function and a particle analysis function without requiring the time, effort, and inherent inaccuracies associated with removing a collection media from a sensor device and transporting the media to a secondary location for subsequent analysis. The device described herein facilitates both a particle collection function and a particle analysis function by enabling an imaging device disposed within the fluid composition sensor to capture an image of a plurality of particles received by the collection media while the replaceable collection media assembly remains secured in a particle collection position within an internal portion of the sensor.

Further, the device described herein may be configured to increase device reliability and user satisfaction associated with the device by utilizing one or more replaceable components. In accordance with certain embodiments discussed herein, one or more components of the device may be easily removed from an internal portion of the device facilitate the cleaning and/or replacement thereof, thereby minimize the risk of contamination of samples and/or system inaccuracies caused by image distortion generated by accumulated particulate matter disposed within the device. In accordance with certain embodiments discussed herein, the collection media used to collect particles from a volume of fluid within the fluid composition sensor may be either manually or automatically replaceable (within a fluid collection position) upon of a sample collection process. The fluid composition sensor and the replaceable collection media assembly include alignment features and self-positioning elements that facilitate the repeatability of inserting a collection media into a device in an arrangement that enables the operability of both a particle collection functionality and a particle analysis functionality of the sensor. The device herein may minimize intermittent user-interaction with the collection media, thereby expediting a sample collection process, reducing the physical work required of a user, facilitating measurement automation, and minimizing device failures caused by misalignment during a user-defined reconfiguration of one or more device components.

Fluid Composition Sensor

The fluid composition sensor 10 may be configured to receive a volume of fluid flowing therethrough. Specifically, the fluid composition sensor 10 may be configured to receive a volume of a gas, such as air, flowing therethrough. In various embodiments, the fluid composition sensor 10 may be further configured to capture an image of one or more particles of a plurality of particles present within the received volume of fluid. As illustrated in FIG. 1, the fluid composition sensor 10 may comprise a housing 11 defining an internal sensor portion in which one or more components of an exemplary fluid composition sensor 10 described herein may be at least partially disposed. In various embodiments, the housing may comprise rigid materials (e.g., rigid plastic materials) and/or resilient materials (e.g., resilient polymeric materials forming protective sleeves on an upper and lower end of the housing). In various embodiments, the housing 11 may comprise an upper surface and bottom surface, with one or more sidewalls extending therebetween in a substantially vertical direction. As described herein, the one or more sidewalls of the fluid composition sensor housing 11 may define at least a portion of the height of the fluid composition sensor 10, wherein the height of the sensor 10 extending in the z-direction. Similarly, the bottom surface of the fluid composition sensor housing 11 may extend along an at least substantially horizontal plane defining at least a portion of both the length and the width of the fluid composition sensor 10, wherein the length and the width of the sensor 10 extending in the x-direction and the y-direction, respectively. The housing 11 of the fluid composition sensor 10 may comprise a sensor fluid inlet 18 embodied as an opening through which the fluid composition sensor may receive a volume of fluid from an ambient environment. As described herein, the fluid composition sensor 10 may comprise a power supply (e.g., batteries 80 discussed herein) and a controller 50 such that one or more components of the fluid composition sensor 10, as described herein, may be electronically and communicatively connected to the controller 50.

Figure 2:
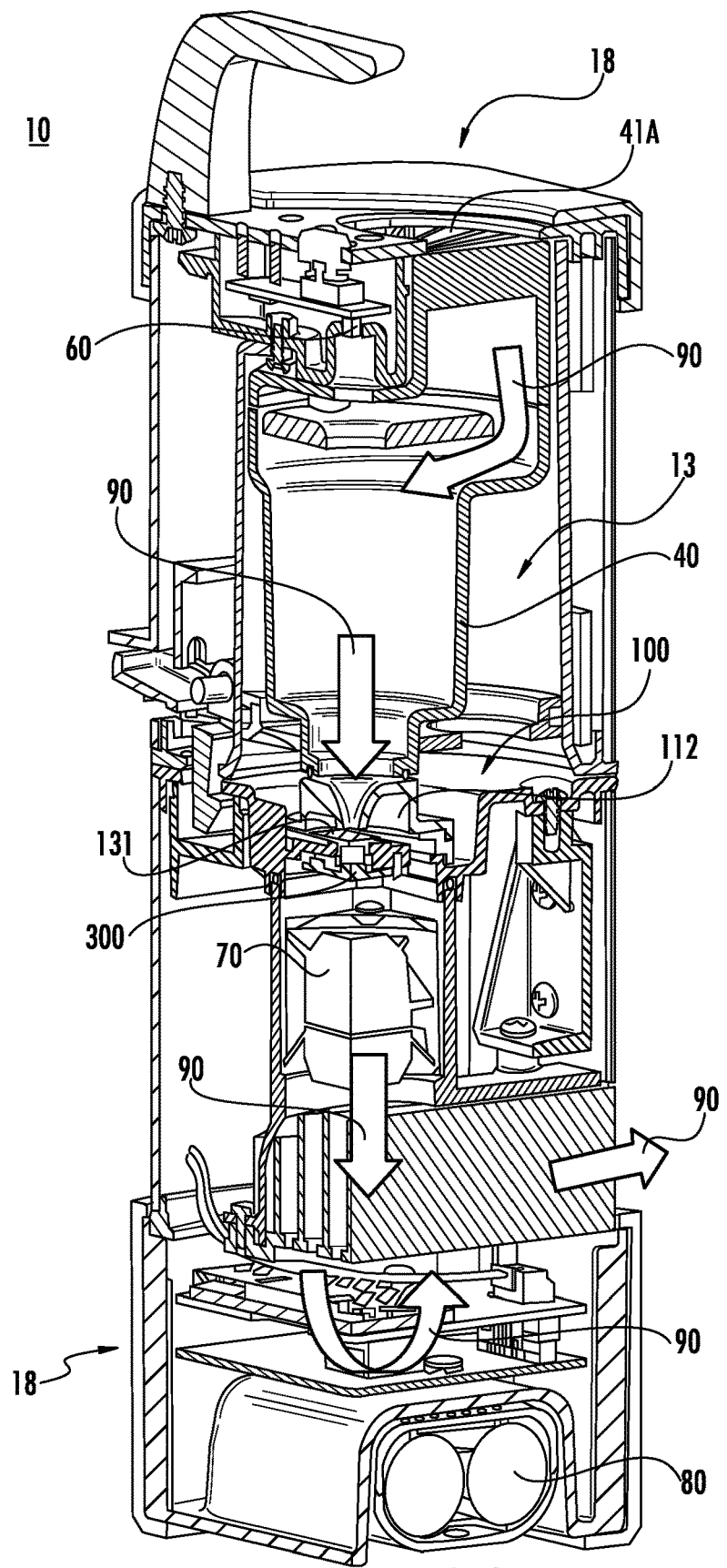
FIG. 2 illustrates a cross-sectional view of an exemplary apparatus in accordance with one embodiment described herein.
Figure 3:
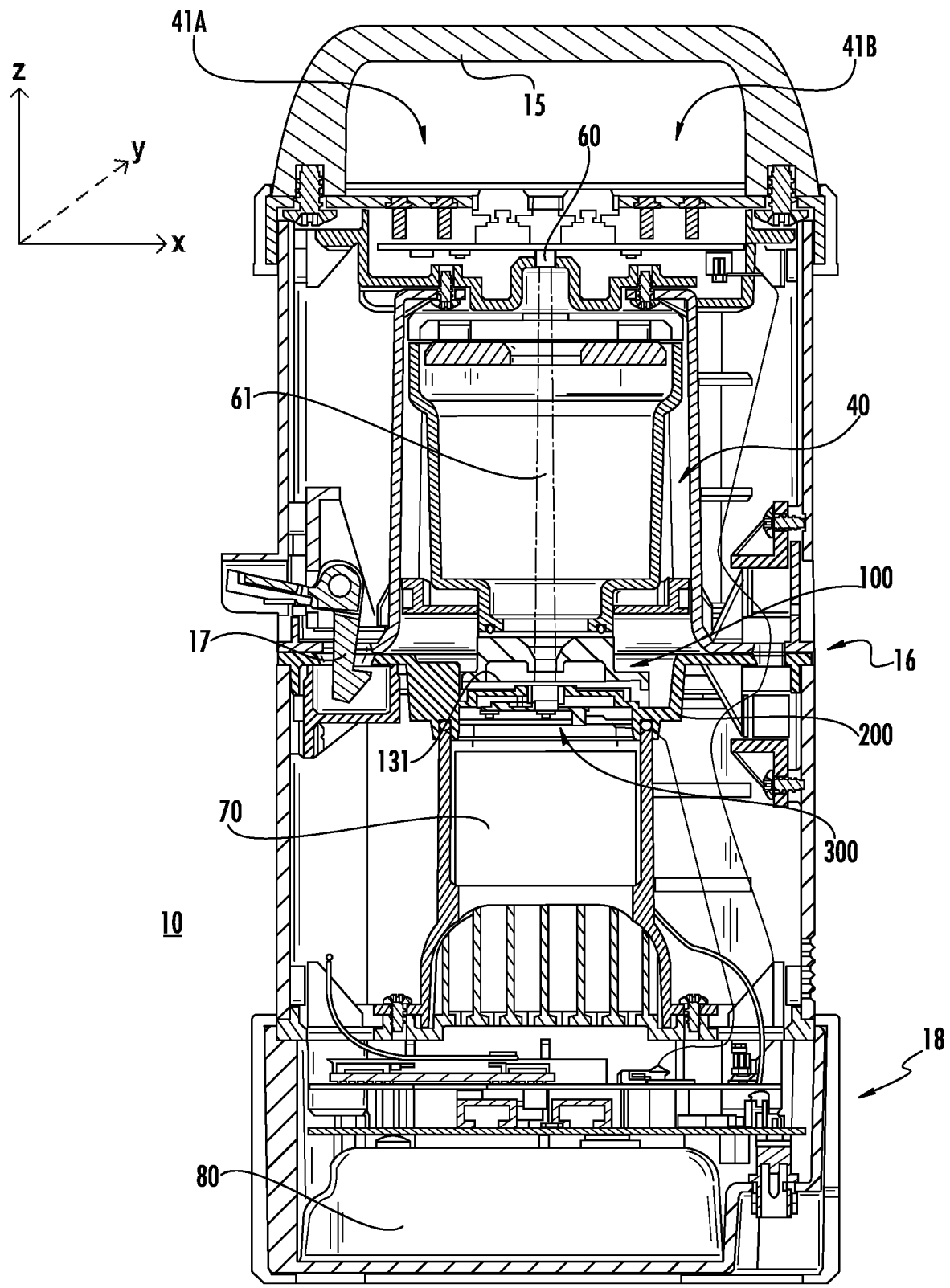
FIG. 3 illustrates a cross-sectional view of an exemplary apparatus in accordance with one embodiment described herein

In various embodiments, as illustrated in FIGS. 2 and 3, a fluid composition sensor 10 may comprise an illumination source 60, a controller 50, a replaceable collection media assembly 100, a collection media assembly dock element 200, and an imaging device 300. Further, in various embodiments, the fluid composition sensor 10 may further comprise a removable fluid flow component 40 configured to define a fluid flow path and direction within the fluid composition sensor 10 from a sensor fluid inlet 18 in a direction at least substantially toward a collection media disposed within sensor 10. The fluid composition sensor 10 of the illustrated embodiment further comprises a fan or pump 70 configured to pull the volume of fluid into and through the fluid composition sensor 10 along the defined fluid flow path, a power source 80 configured to power the fluid composition sensor, and/or internal circuitry 18 configured to be in electronic communication with one or more of the aforementioned components of the fluid composition sensor 10. In various embodiments, the fan or pump 70 is calibrated, such that the flow rate of fluid moving through the device is known/determined based at least in part on the operating characteristics (e.g., operating power) of the fan or pump 70. In various embodiments, the fluid composition sensor may further comprise one or more buttons (or other user interface elements) disposed about the housing 11, each of which may be in electronic communication with the internal circuitry 18 of the sensor 10 to, upon user engagement with the button, facilitate one or more sensor functionalities as described herein. For example, user engagement with a button may initiate the transmission to a controller 50 of at least one electrical signal associated with the one or more sensor functionalities corresponding to the button.

In various embodiments, as described herein, the fluid composition sensor 10 may be configured to execute both a particle collection function and a particle analysis function. FIG. 2 illustrates a perspective sectional view of an exemplary fluid composition sensor 10 according to various embodiments described herein. In particular, the exemplary fluid composition sensor 10 illustrated in FIG. 2 is shown as executing at least a portion of the particle collection function of the sensor 10. As described herein, the particle collection function of the fluid composition sensor 10 may correspond to the fluid composition sensor 10 receiving from an ambient environment a volume of fluid comprising a plurality of particles and utilizing a removable fluid flow component 40 and an impactor nozzle 112 disposed within the internal sensor portion 13 to direct the volume of fluid toward a collection media 131 disposed within sensor 10. As described herein, the removable fluid flow component 40 may be configured to receive the volume of fluid from the sensor fluid inlet 18 through at least one fluid flow component inlet 41A and may define a fluid flow path 90 such that the volume of fluid may travel from the fluid flow component inlet 41A to the impactor nozzle 112. The impactor nozzle 112 may comprise a nozzle inlet configured to receive the volume of fluid from the removable fluid flow component 40 and a nozzle outlet, wherein the nozzle inlet comprises a cross-sectional area that is larger than that of the nozzle outlet. The impactor nozzle 112 may be configured such that the volume of fluid containing the plurality of particles passes therethrough in a fluid flow direction at least substantially perpendicular to the collection media 131. As described, the variable cross-sectional areas of the impactor nozzle 112 may be configured to increase the velocity of the volume of fluid flowing through the nozzle 112 (e.g., the plurality of particles therein) and induce laminar flow such that at least a portion of the particles of the plurality of particles within the volume of fluid comprise a momentum sufficient to impact the collection media 131 and become disposed therein. For example, the volume of fluid may travel from the outlet of the impactor nozzle 112 and pass across at least a portion of a surface of the collection media 131 such that at least a portion of the plurality of particles within the volume of fluid become disposed within the collection media 131.

In various embodiments, upon passing across the surface of the collection media 131, the volume of fluid may continue to travel within an internal sensor portion 13 along a fluid flow path 90. At least a portion of the volume of fluid may be directed (e.g., by the fan and/or pump 70) to an outlet of the fluid composition sensor 10 (e.g., one or more exhaust slots) whereby the volume of fluid may be dispensed back into the ambient environment. In various embodiments, the fluid composition sensor 10 may be configured such that prior to being dispensed from the sensor 10, at least a portion of the volume of fluid may be directed toward the internal circuitry 18 within the internal sensor portion 13 and circulated so as to facilitate the cooling of the internal circuitry 18 by passing the volume of fluid over at least a portion thereof. In such a circumstance, the fluid composition sensor 10 may be configured such that the portion of the volume of fluid used to cool the internal circuitry 18 may be subsequently dispensed from the outlet of the sensor 10.

FIG. 3 illustrates a cross-sectional view of an exemplary fluid composition sensor 10 according to various embodiments described herein. In particular, the exemplary fluid composition sensor 10 illustrated in FIG. 3 is shown as executing at least a portion of the particle analysis function of the sensor 10. As described herein, the particle analysis function of the fluid composition sensor 10 may correspond to the fluid composition sensor 10 capturing an image of the one or more particles received by—and disposed within—the collection media 131 and determining, based at least in part on the captured image, at least one particle characteristic of the volume of fluid received by the fluid composition sensor 10. In various embodiments, the fluid composition sensor 10 may comprise an illumination source 60 configured to emit one or more light beams. In various embodiments, the illumination source 60 may be a laser, lamp, light-emitting diode (LED), and/or the like, which may be collectively configured to generate a light beam (e.g., ultraviolet, visible, infrared, white, a single visible color, or multiple color light) that may be emitted toward the collection media 131, as described herein in further detail. For example, an illumination source 60 of the fluid composition sensor 10 may be configured to emit one or more light beams 61 so as to engage the collection media 131 and illuminate the one or more particles disposed therein, as described herein. In various embodiments, as illustrated in FIG. 3, the fluid composition sensor 10 may be configured such that the illumination source 60 is at least substantially aligned with the imaging device 300. Further, for example, the illumination source 60 may be at least substantially aligned with the central axis of the impactor nozzle 112. In such a configuration, the illumination source 60 may be arranged such that the light beam 61 emitted therefrom extends through the removable fluid flow component 40 in a direction that is at least substantially aligned with the central nozzle axis, such that at least a portion of the one or more light beams 61 extend through both the nozzle inlet and the nozzle outlet of the impactor nozzle 112 to illuminate the one or more particles disposed in the collection media 131. As described herein, an imaging device 300 disposed within the internal sensor portion 13 may be configured to utilize the light beam 61 emitted from the illumination source 60 in order to capture an image of the one or more particles of the plurality of particles received by the collection media 131 using one or more imaging techniques such as, for example holographic microscopy (e.g., lensless holography) and/or the like.

The fluid composition sensor 10 (e.g., controller 50) may be configured to analyze the captured image, as described herein, so as to determine a particle size and/or other particle characteristics of one or more of the particles captured within the collection media 131. For example, wherein the imaging device 300 is configured to utilize lensless holography analyze one or more particles embedded within the collection media 131, the imaging device 300 may computationally produce an image of the one or more particles received by the collection media 131 by digitally reconstructing one or more microscopic images of one or more particles without using a lens. In executing the particle analysis function as described herein, the fluid composition sensor 10 may characterize the particle composition within the volume of fluid by directly identifying the particle size and/or particle type of each of the particles received by the collection media 131. For example, the fluid composition sensor may detect a change in particle composition within a volume of fluid over time and/or location.

As described herein, in various embodiments, the particle collection function and the particle analysis function of the fluid composition sensor 10 may be executed in sequence, such that upon determining that an entirety of a sample volume of fluid has passed across a surface of a collection media 131, and thus, that the need for the particle collection functionality of the fluid composition sensor has been at least temporarily exhausted, the fluid composition sensor may be configured to initiate the particle analysis functionality.

As described above, in various embodiments, the fluid composition sensor 10 may comprise a lens free microscope, such as one described in WIPO Publication Number 518/165590, which is incorporated herein by reference in its entirety. In various embodiments, a lens-free microscope may utilize one or more techniques, such as, for example, holographic microscopy (e.g., lensless holography), to capture a particle image, as described herein, of the one or more particles of a plurality of particles received by a collection media 131. Alternatively, the fluid composition sensor 10 may comprise a lens-based imaging device or any other apparatus configured to capture an image which may be analyzed, as described herein, so as to determine a particle size or other particle characteristics of one or more particles captured from within a volume of fluid by a collection media 131 disposed within the internal sensor portion of the fluid composition sensor 10. In various embodiments, a lens-based imaging device may utilize one or more imaging techniques, such as, for example, optical microscopy, to capture a particle image, as described herein, of the one or more particles of a plurality of particles received by a collection media 131, as described herein.

In various embodiments, the fluid composition sensor 10 may be connected to a power supply 80 configured to receive power and power the fluid composition sensor 10. As non-limiting examples, the power supply 80 may comprise one or more batteries, one or more capacitors, one or more constant power supplies (e.g., a wall-outlet), and/or the like. In some embodiments the power supply 80 may comprise an external power supply positioned outside of the fluid composition sensor 10 and configured to deliver alternating or direct current power to the fluid composition sensor 10. Further, in some embodiments, as illustrated in FIGS. 2 and 3, the power supply 80 may comprise an internal power supply, for example, one or more batteries, positioned within the housing 11 of the fluid composition sensor 10. In various embodiments, a power supply 80 may be connected to the controller 50 to enable distribution of power through the controller to the fluid composition sensor 10.

As described, the imaging device 300 of the fluid composition sensor 10 may be positioned at least substantially adjacent (e.g., in contact with or spaced a distance away from) the collection media 131 such that the imaging device 300 may effectively capture one or more images of the one or particles embedded within the collection media 131. As discussed herein, the collection media 131 may be replaceable (e.g., as a part of a cassette that may be inserted into and/or removed from the fluid composition sensor 10), and accordingly the fluid composition sensor 10 may define one or more alignment features, support features, and/or the like for maintaining a desired positioning of the collection media 131 relative to the imaging device 300 (e.g., such that a bottom surface of the collection media 131 is in contact with or proximate (e.g., within 5 mm, within 3 mm, within 1 mm and/or the like) an imaging surface of the imaging device 300. Such alignment features and/or support features may comprise one or more grooves, slots, ridges, and/or the like configured to position the collection media 131 in a desired position relative to the imaging device 300. In various embodiments, the fluid composition sensor 10 (e.g., the imaging device 300) may have a designated field of view for capturing, permanently and/or temporarily, an image of multiple particles of the plurality of particles simultaneously. The collection media 131 may be positioned within the fluid composition sensor 10 relative to the imaging device 300 such that at least a portion of the collection media 131 is within the field of view of the imaging device 300. Further, the collection media 131 may be positioned relative to the imaging device 300 such that the portion (e.g., at least a portion) of the collection media 131 within which the particles from the volume of fluid flowing through the sensor 10 are disposed is visible by the imaging device 300 (i.e. within the field of view). In various embodiments, the field of view of the imaging device 300 may be rectangular and may be configured to comprise an aspect ratio of up to 1:20. The aspect ratio may be selectively configured to optimize the field of view of the imaging device 300 based at least in part on a fluid flow velocity, pressure drop, and/or Reynolds number associated with a volume of fluid traveling along at least a portion of the fluid flow path (e.g., through an impactor nozzle 112), each of which may be optimized in order to maximize flow performance and particle collection. For example, in various embodiments, the field of view of the imaging device 300 may have an aspect ratio of 3:4.

However, it should be understood that other shapes, sizes, and proportions of a field of view may be provided in other embodiments (e.g., round, ovular, rectangular with a different aspect ratio, and/or the like).

As described herein, the field of view of the imaging device 300 on the collection media 131 may correspond to the configuration of the imaging device 300 relative to the collection media 131. In particular, the field of view of the imaging device 300 may be defined at least in part by the distance between the imaging device 300 and the collection media 131 disposed within the sensor 10. Further, as described herein, the area of the collection media 131 that receives particles from an exemplary volume of fluid as the exemplary fluid flows through the sensor 10 may correspond to the configuration of the outlet of the impactor nozzle 112 from which the exemplary volume of fluid is dispensed prior to impacting the collection media 131. For example, the area of the collection media 131 that receives particles from a volume of fluid may be defined at least in part by the shape of the outlet of the impactor nozzle 112 and the distance between the nozzle outlet and the collection media 131. Accordingly, the outlet of the impactor nozzle 112 may be configured so as to comprise a shape that corresponds with the shape of the field of view of the imaging device 300 of the sensor 10. Specifically, the outlet of the impactor nozzle 112 may be configured so as to define a shape that is at least substantially similar to the size and shape of the field of view of the imaging device 300 of the sensor 10. As described herein, in various embodiments, the field of view of the imaging device 300 may have an aspect ratio of up to 1:20, so as to optimize the field of view based at least in part on one or more fluid flow characteristics of the volume of fluid. For example, in an exemplary circumstance wherein the field of view is defined by an aspect ratio of 3:4 having a defined size, the outlet of the impactor nozzle 112 may comprise a rectangular cross-section with a length-to-width ratio of 3:4 and having the same defined size (e.g., shape and/or area), corresponding to the configuration of the imaging device 300. For example, the impactor nozzle 112 may comprise a rectangular cross-section with a length of at least substantially between 1 mm and 10 mm (between 3 mm and 3.6 mm) and a width of at least substantially between 1 mm and 10 mm (between 3.9 mm and 4.5 mm).

Further, in various embodiments, the fluid composition sensor 10 may be configured such that a central axis of the impactor nozzle 112 is at least substantially aligned with the field of view of the imaging device 300 in order to facilitate the convergence of the field of view of the imaging device 300 and the portion of the collection media 131 configured to receive particles from the volume of fluid flowing through the sensor 10. As described herein, in order to ensure proper alignment of each of the aforementioned components, the fluid composition sensor 10 may be configured to secure the collection media 131, the impactor nozzle 112, and the imaging device 300 within the sensor (e.g., temporarily during the execution of the particle collection and/or particle analysis functions) in each of the x-direction, the y-direction, the z-direction, and the angular direction. For example, the fluid composition sensor 10 may be configured such that the collection media 131 is arranged therein at a predetermined distance away from both the imaging device 300 and the outlet of the impactor nozzle 112, respectively, wherein both the distance between the collection media 131 and the imaging device 300 and the distance between the collection media 131 and the and the outlet of the impactor nozzle 112 are calibrated to optimize the particle collection and particle analysis functions of sensor 10, as described herein.

As described herein, in various embodiments, a fluid composition sensor may be configurable between an open housing configuration and a closed configuration. In various embodiments, the open housing configuration of a fluid composition sensor 10 may facilitate the removal of one or more sensor components from within the internal sensor portion 13. For example, a fluid composition sensor 10 in an open housing configuration may be configured so as to allow for the reconfiguration of a collection media assembly 100 relative to at least a portion of the internal sensor portion 13 of the housing 11. In various embodiments wherein the fluid composition sensor 10 is in an open configuration, a collection media assembly 100 comprising a collection media 131 disposed therein may be removed from a particle collection position within the internal sensor portion 13 of the fluid composition sensor 10. For example, upon determining that at least substantially the entirety of a sample volume of fluid has passed across a surface of the collection media 131 and that the one or more images of the particles needed to enable the particle analysis function of the sensor 10 have been captured, the collection media assembly 100 may be removed from the internal sensor portion 13 and transported to an exemplary secondary location. While the fluid composition sensor 10 is in an open configuration, the removed collection media assembly 100 may be replaced with a different, unused replaceable collection media assembly 100.

As a further example, in various embodiments, the open sensor configuration of a fluid composition sensor 10 may facilitate the removal of the removable fluid flow component 40 from the internal sensor portion 13 of the housing 11. As described herein, the removable fluid flow component 40 may be configured to receive the volume of fluid from the sensor fluid inlet 18 through at least one fluid flow component inlet 41A and may define a fluid flow path 90 such that the volume of fluid may travel from the fluid flow component inlet 41A to an impactor nozzle 112. The removable fluid flow component 40 may define an interior portion through which each sample volume of fluid (and each of the plurality of particles therein) received by the sensor 10 passes, such that, after one or more uses, an undesirable volume of particulate matter may begin to accumulate within the interior portion of the removable fluid flow component 40. The removable fluid flow component 40 may be arranged such that, when the sensor 10 is in an open configuration, the fluid flow component 40 may be removed from the internal sensor portion 13 of the fluid composition sensor 10 to facilitate the cleaning and/or replacement of the fluid flow component 40 so as to decrease the amount of undesired particulate present therein and minimize the risk of system error caused by contamination.

Figure 4:
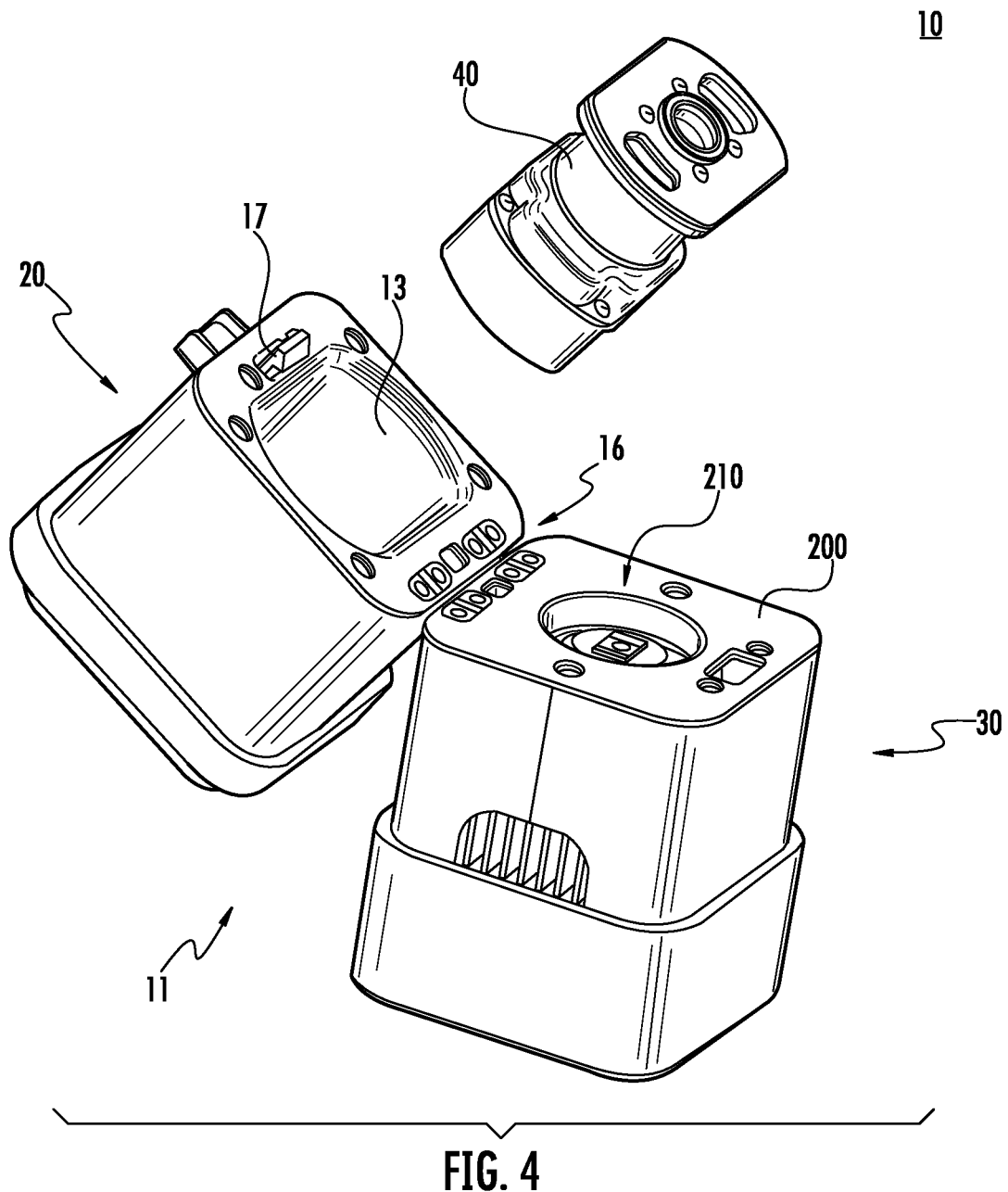
FIG. 4 illustrates an exploded view of an exemplary apparatus in accordance with various embodiments described herein.

FIG. 4 illustrates a perspective view of an exemplary fluid composition sensor 10 in an open configuration according to an embodiment described herein. In particular, FIG. 4 illustrates an exemplary fluid composition sensor 10 defining an open sensor configuration, wherein the fluid composition sensor 10 comprises an upper sensor housing 20 and a lower sensor housing 30 that are connected to one another via a hinged connection 16 such that the sensor 10 may be opened by moving the upper sensor housing 20 about the hinged connector 16 relative to the lower sensor housing 30. In the illustrated embodiment, the hinges are hidden hinges (e.g., barrel hinges) that are entirely contained within the perimeter of the housing and which enable a flush connection between planar surfaces of the upper sensor housing 20 and the lower sensor housing 30 when in the closed position. However, it should be understood that other hinging configurations may be provided in other embodiments. Moreover, although not shown, it should be understood that the hinge configuration may additionally comprise one or more electrical connectors, electrical connections, and/or the like, thereby enabling the transmission of electrical power and/or control signals between the lower sensor housing 30 and the upper sensor housing 20. As illustrated, the upper sensor housing 20 and the lower sensor housing 30 are configured such that when the exemplary fluid composition sensor 10 is in a closed configuration, the interface between the two sensor housing portions 20, 30 defines an at least substantially horizontal plane. In various embodiments, the fluid composition sensor may comprise a latch mechanism 17 configured to secure the upper sensor housing 20 in position relative to the lower sensor housing 30 such that the sensor 10 is locked in the closed configuration. The latch mechanism 17 may be configured to disengage based at least in part on detecting user interaction therewith (e.g., via a button disposed about the sensor housing 11 that is mechanically connected to the latch 17) to selectively reconfigure the fluid composition sensor 10 from the closed configuration to an open configuration, as described herein. Although illustrated as a mechanical latch mechanism, it should be understood that the latch mechanism 17 may be embodied as any means configured to secure the upper sensor housing 20 to a lower sensor housing 30 so as to prevent the relative movement therebetween.

In various embodiments, the upper sensor housing 20 defines an internal sensor portion 13 configured to receive the removable fluid flow component 40. The upper sensor housing 20 may be configured to restrict the lateral movement of the removable fluid flow component 40 disposed therein relative to the internal sensor portion 13, wherein the lateral movement of the fluid flow component 40 is movement in a direction that is at least substantially perpendicular to a removal/insertion direction of the fluid flow component 40 (i.e. the direction in which the removable fluid flow component 40 is removed from and/or inserted into the upper sensor housing 20). For example, one or more portions of the upper sensor housing 20 may engage the removable fluid flow component 40 so as to stabilize the position of the fluid flow component 40 relative to the sidewalls of the internal sensor portion 13 of the upper sensor housing 20, such that when the fluid composition sensor 10 is in a closed configuration, the fluid flow component 40 is restricted from moving in the x-y plane. Further, in various embodiments, the internal sensor portion 13 of the upper sensor housing 20 may comprise a geometry corresponding to an asymmetric external geometry of the removable fluid flow component 40 such that the fluid flow component 40 will only fit into the upper sensor housing 20 when inserted into the internal sensor portion 13 in an angular configuration that ensures proper alignment of the fluid flow component 40 relative to, for example, an illumination source, an impactor nozzle, a collection media assembly and/or an imaging device positioned within the housing 11 of the sensor 10.

Additionally, the fluid composition sensor 10 may be configured such that when the sensor 10 is in a closed configuration, the upper sensor housing 20 may restrict the vertical movement of the removable fluid flow component 40 disposed therein relative to the internal sensor portion 13, wherein the vertical movement of the fluid flow component 40 is movement in a direction that is at least substantially similar to the removal/insertion direction thereof. For example, in various embodiments wherein the impactor nozzle of the fluid flow sensor 10 is not attached to the removable fluid flow component 40 (e.g., wherein the impactor nozzle defines an inlet portion of a collection media assembly 100; wherein the impactor nozzle defines a portion of the housing 11 of the sensor 10), one or more portions of the upper sensor housing 20 may engage the removable fluid flow component 40 so as to apply a compression force onto the fluid flow component in the z-direction so as to stabilize the position of the fluid flow component 40 relative to the impactor nozzle and/or the collection media. In such a configuration, when the fluid composition sensor 10 is in a closed configuration, the fluid flow component 40 may be restricted from moving in the z-direction relative to the collection media 131. In addition to further stabilizing the position of the removable fluid flow component 40 relative to the collection media 131, the vertical compression force applied to the fluid flow component 40 from the upper sensor housing 20 may function to create a secured seal at the outlet of the fluid flow component 40 so as to isolate the sample volume of fluid flowing through fluid flow component 40 from a volume of ambient fluid.

In various embodiments, as shown in the exemplary embodiment illustrated in FIG. 4, the lower sensor housing 30 of the fluid composition sensor 10 may comprise a collection media assembly dock element 200 configured to receive a replaceable collection media assembly 100 and secure the collection media assembly 100 in a preferred alignment within the internal sensor portion 13, as described herein. In various embodiments, the collection media assembly dock element 200 may be disposed within the internal sensor portion 13 of the fluid composition sensor 10 when the sensor 10 is in a closed configuration. In various embodiments, wherein the fluid composition sensor 10 is configured in an open configuration so as to define an opening through which a replaceable collection media assembly 100 and/or a removable fluid flow component 40 may be removed, the collection media assembly dock element 200 may be disposed within the internal sensor portion 13 proximate the opening of the sensor 10 to allow for the removal and/or replacement of a replaceable collection media assembly 100 arranged therein through said sensor opening. In various embodiments, as illustrated in FIG. 4, wherein the fluid composition sensor 10 is configured such that the interface between the upper and lower sensor housing portions 20, 30 defines an at least substantially horizontal plane, the collection media assembly dock element 200 may be disposed about a top portion of the lower sensor housing 30 proximate said interface.

In various embodiments, the collection media assembly dock element 200 may comprise a collection media assembly receptacle 210 in which a replaceable collection media assembly 100 may be inserted. As described herein, the collection media assembly receptacle 210 may be embodied, at least in part, by an outer frame having a geometry corresponding to that of a collection media assembly 100 such that the collection media assembly 100 may be inserted therein and secured in a desired position relative one or more other components of the sensor. In various embodiments, the collection media assembly receptacle 210 may be configured to restrict the lateral movement of the replaceable collection media assembly 100 disposed therein relative collection media assembly dock element 200, wherein the lateral movement of the collection media assembly 100 is movement in a direction that is at least substantially perpendicular to a removal/insertion direction of the collection media assembly 100 (i.e. the direction in which the collection media assembly 100 is removed from and/or inserted into the collection media assembly receptacle 210). For example, one or more portions of the collection media assembly receptacle 210, such as, for example, one or more of the collection media assembly receptacle sidewalls, a peripheral alignment protrusion, and/or a bottom alignment protrusion 211, may engage the replaceable collection media assembly 100 so as to stabilize the position of the replaceable collection media assembly 100 within the collection media assembly receptacle 210. In various embodiments, such a configuration may restrict the replaceable collection media assembly 100 from moving in the x-y plane relative to the imaging device, as discussed herein.

Further, in various embodiments, a collection media assembly dock element 200 may comprise one or more alignment features positioned at least substantially adjacent the collection media assembly receptacle 210 and configured to engage a corresponding feature of a replaceable collection media assembly 100 disposed within the receptacle 210. For example, in various embodiments, as discussed herein, the collection media assembly dock element 200 may comprise a peripheral alignment element configured to extend from the collection media assembly dock element 200 inward toward a collection media assembly 100 disposed therein, the replaceable collection media assembly 100 having a corresponding recess configured to receive the peripheral alignment element therein. In such a circumstance, the recess defined within the replaceable collection media assembly 100 may at least partially surround the peripheral alignment element such that as the collection media assembly 100 begins to rotate in an angular direction relative to the collection media assembly dock element 200, at least a portion of the replaceable collection media assembly 100 defining an edge of the recess engages the adjacent peripheral alignment element, which acts as a physical barrier to prevent the replaceable collection media assembly 100 from moving in a radial direction relative to the collection media assembly dock element 200.

Additionally, as described above, the fluid composition sensor 10 may be configured such that when the sensor 10 is in a closed configuration, the upper sensor housing 20 may restrict the vertical movement (e.g., in the z-direction) of the removable fluid flow component 40 disposed therein by applying a vertical compression force to the fluid flow component 40 such that the fluid flow component 40 is compressed in the vertical direction against an adjacent impactor nozzle. In various embodiments, the aforementioned compression force generated by the housing 11 and applied to the fluid flow component 40 may be transmitted to a replaceable collection media assembly 100 disposed within the collection media assembly dock element 200 (e.g., the collection media assembly receptacle 210) so as to prevent the collection media assembly 100 from moving in the vertical direction (e.g., in the z-direction) relative to the collection media assembly dock element 200 by pressing the collection media assembly 100 against a constrained bottom surface of the collection media assembly dock element 200.

In various embodiments, the collection media assembly dock element 200 may further comprise an imaging orifice extending through a thickness thereof. The imaging orifice may be positioned within the collection media assembly dock element 200 (e.g., the collection media assembly receptacle 210) so as to enable a clear line of sight between a receiving area of the collection media 131 (i.e. the portion of the collection media 131 configured to receive particles from the volume of fluid flowing through the sensor 10) disposed within the replaceable collection media assembly 100 secured within the collection media assembly dock element 200 and an imaging device arranged within the lower sensor housing 30 below the collection media assembly dock element 200. For example, the imaging orifice may be defined, at least in part, within a bottom surface of the collection media assembly dock element 200 so as to facilitate the particle analysis functionality of the fluid composition sensor 10, as described herein, by enabling the imaging device to capture an image of the plurality of particles embedded within the receiving area of the collection media 131. In various embodiments, the imaging orifice may be configured such that the collection media assembly dock element 200 does not interfere with the field of view of the imaging device.

As described herein, the collection media assembly dock element 200 may further comprise a transparent protective cover (e.g., transparent glass, transparent plastic, and/or the like) configured to cover the imaging orifice so as to protect the imaging device from contamination. A protective cover may be configured so as to allow the imaging device to maintain a line of sight to the collection media 131, as described above while physically isolating the imaging device from any fluid and/or particulate matter flowing through the sensor 10. For example, by preventing the fluid and/or particulate matter flowing through the sensor 10 from interacting with the imaging device, the transparent protective cover reduces the errors associated with the particle analysis function that may be caused by the contamination of the imaging device. which may result in error. In various embodiments wherein the fluid composition sensor 10 is in an open configuration, a replaceable collection media assembly 100 disposed within the collection media assembly dock element 200 may be removed from a particle collection position within the internal sensor portion 13 of the fluid composition sensor 10. For example, the transparent protective cover may be arranged such that it is accessible to a user upon the removal of the replaceable collection media assembly 100. The transparent protective cover may be removed from the collection media assembly dock element 200 to facilitate the cleaning and/or replacement of the cover so as to minimize the risk of system inaccuracies caused by leftover particles from a previous sample volume of fluid being disposed on the protective cover within the field of view of the imaging device such that image distortion is created with respect to the imaging and analysis of any subsequently examined particle samples.

In various embodiments, the collection media assembly dock element 200 may be arranged within the internal sensor portion 13 (e.g., within the lower sensor portion 30) such that when the fluid composition sensor 10 is in a closed configuration, at least a portion of a collection media 131 of a replaceable collection media assembly 100 secured within the collection media assembly dock element 200 may be within a field of view of the imaging device 300. Further, in various embodiments wherein the impactor nozzle is included as an inlet of the replaceable collection media assembly 100, the collection media assembly dock element 200 may be arranged within the internal sensor portion 13 such that the impactor nozzle (e.g., central nozzle axis thereof) is at least substantially aligned with both the imaging device (e.g., the field of view) disposed within the lower sensor housing 30 and the outlet of the fluid flow component 40, as described herein. Additionally, in such a configuration, the collection media assembly dock element 200 may be arranged within the internal sensor portion 13 such that when the fluid composition sensor 10 is in a closed configuration, a light beam 61 emitted from an illumination source 60 may engage the portion of the collection media 131 that is at least substantially aligned with the field of view of the imaging device upon extending through both the inlet and the outlet of the impactor nozzle.

As described herein, the fluid composition sensor 10 comprises an upper sensor housing 20 and a lower sensor housing 30 that are connected to one another via a hinged connection 16 such that the sensor 10 may be opened by moving the upper sensor housing 20 about the hinges 16 relative to the lower sensor housing 30. In various embodiments, the hinged connection of the fluid composition sensor 10 may at least partially anchor the relative motion between the between the upper sensor housing 20 and lower sensor housing 30 so as to facilitate the repeatability of properly aligning each of the various sensor components respectively disposed within the two housing portions, as described herein.

Figure 5:
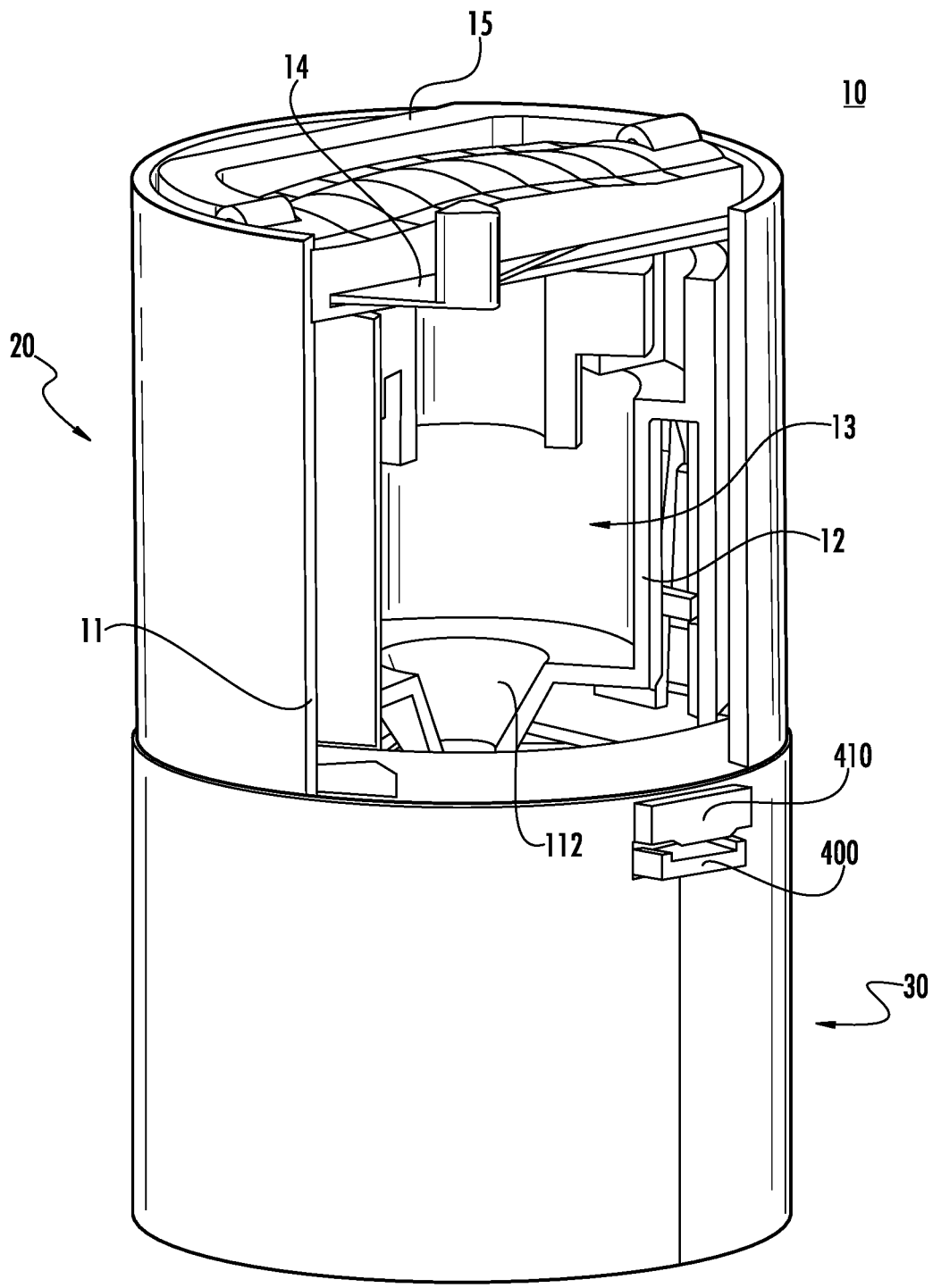
FIG. 5 illustrates a perspective view of an exemplary fluid composition sensor in accordance with various embodiments.

Alternatively, or additionally, the upper sensor housing 20 and lower sensor housing 30 of the fluid composition sensor 10 may be configured to be completely detachable from one another, such that configuring the fluid composition sensor 10 in an open configuration comprises entirely detaching one of the two aforementioned sensor portions 20, 30 from the other. In such a configuration, the fluid composition sensor 10 may comprise one or more additional latch and/or fasting elements configured to secure the upper sensor housing 20 to the lower sensor housing 30 in a closed sensor configuration. FIG. 5 illustrates a perspective view, and further a partial sectional view, of an exemplary fluid composition sensor 10 according to an embodiment described herein. In particular, FIG. 5 illustrates an exemplary fluid composition sensor 10 that is configurable between at least an open sensor configuration and a closed sensor configuration and comprises an upper sensor housing 20 and a lower sensor housing 30, wherein the upper sensor housing 20 is illustrated using a cutaway perspective view. The open sensor configuration of the exemplary fluid composition sensor 10 may be defined by the upper sensor housing 20 and the lower sensor housing 30 being completely detached from one another. In various embodiments, the upper sensor housing 20 and the lower sensor housing 30 may be configured such that when the exemplary fluid composition sensor 10 is in a closed configuration, the interface between the two sensor housing portions 20, 30 extends around at least a portion of the peripheral edge of the housing 11 about an at least substantially horizontal plane positioned between the two sensor portions 20, 30.

The exemplary fluid composition sensor 10 may be configured such that the sensor 10 may be selectively arranged in a closed configuration by utilizing one or more corresponding interlocking engagement features (e.g., tabs, guided tracks, pins, and/or the like) disposed on the upper sensor housing 20 and the lower sensor housing 30, respectively. For example, each of the interlocking features may be disposed proximate the respective interface portions of the two sensor housing portions 20, 30 such that upon the execution of, for example, a two-step attachment action, the upper sensor housing 20 may be secured to the lower sensor housing 30 and arranged such that the removable fluid flow component 40 disposed therein is aligned with an imaging device and at least a portion of the collection media 131 disposed within the lower sensor housing 30, as described herein. In various embodiments, the removable fluid flow component 40 disposed therein may be aligned with the imaging device and at least a portion of the collection media 131 disposed within the lower sensor housing 30 about a vertical axis extending through a central portion of the fluid composition sensor 10 or, alternatively, through a portion of the sensor positioned a distance away from the aforementioned central portion. In various embodiments, the fluid composition sensor 10 may be configured such that the two-step attachment action may be defined by two actions that facilitate the arrangement of the sensor 10 in a closed configuration when executed in sequence. Further, in various embodiments, the fluid composition sensor 10 may be configured such that the sensor 10 may be rearranged to define an open configuration by executing the two actions of the two-step attachment action in a reverse sequence. For example, in various embodiments, the exemplary fluid composition sensor 10 may be configured in a closed configuration using a two-step attachment action similar to that that used to attach a camera lens to a single-lens reflex (SLR) camera or the sequential, bi-directional action required to open a child-resistant prescription pill bottle. The upper sensor housing 20 may be attached to the lower sensor housing 30 so as to define a closed sensor configuration by positioning one or more of the engagement features disposed about the upper sensor housing 20 relative to the one or more corresponding engagement features of the lower sensor portion 30 and rotating the upper sensor housing 20 about a central vertical axis of the fluid composition sensor 10 an angular distance of, for example, 90 degrees. In various embodiments, the upper sensor housing 20 may comprise one or more electronic components that may establish electronic communication with the internal control circuitry of the sensor 10 upon being rotated, for example, 90 degrees to a locked position.

In various embodiments, the upper sensor housing 20 comprises sensor fluid inlet embodied as an opening through which the fluid composition sensor 10 may receive a volume of fluid from an ambient environment, a handle 15, and a dust cap 14 that may be configured to mitigate the amount of ambient fluid that unintentionally enters the fluid composition sensor 10 through the fluid flow component inlet by providing a physical cover that at least substantially isolates the fluid flow component inlet from the ambient environment. For example, the dust cover 14 may be integrated in to the housing 11 such that it may be selectively moved between an open position and a closed position. Further, in various embodiments, the upper sensor housing 20 defines an internal sensor portion 13 configured to receive a removable fluid flow component 40. The removable fluid flow component 40 may be inserted into the internal sensor portion 13 of the upper sensor housing 20 when the fluid composition sensor 10 is in an open configuration. For example, the removable fluid flow component 40 may be secured within the upper sensor housing 20 using one or more corresponding "snap-in" fastening features disposed about both the fluid flow component 40 and the internal sensor portion 13, respectively. The upper sensor housing 20 may be configured to maintain a desired alignment of the removable fluid flow component 40 within the internal sensor portion 13 using a force-inducing element such as, for example, a torsional spring that remains in contact with the fluid flow component 40 while allowing for the rotation thereof. As shown, in various embodiments, the impactor nozzle 112 of the fluid composition sensor 10 may be part of the removable fluid flow component 40. For example, the impactor nozzle 112 may define the fluid outlet of the fluid flow component 40.

In various embodiments, the lower sensor housing 30 may comprise a top surface configured to at least partially isolate the various sensor 10 components disposed within the lower sensor housing 30 from the ambient environment and a fluid inlet, which may be defined by an orifice positioned about the aforementioned top surface that is configured to receive a volume of air from a fluid flow component 40 when the fluid composition sensor 10 is in a closed sensor configuration. As shown, the exemplary fluid composition sensor 10 is configured such that the collection media may be positioned within the lower sensor housing 30 to receive a plurality of particles from a volume of fluid dispensed from the outlet of the impactor nozzle (e.g., the fluid flow component 40). The collection media may be disposed upon a collection media assembly 400 embodied as a disposable slide, as described in further detail herein. The fluid composition sensor 10 may be configured to receive a disposable slide 400 having a collection media 131 attached thereto through an opening in the housing 11 and position the slide 400 at least partially within an internal sensor portion 13, such that the collection media 131 is disposed within a fluid flow path of a volume of fluid traveling through the sensor 10. As described herein, the fluid composition sensor 10 may be further configured to arrange the slide 400 (e.g., the collection media) within the internal sensor portion 13 such that it may be aligned with an outlet of the impactor nozzle 112, an imaging device 300, and an illumination source. In various embodiments, the fluid composition sensor may further comprise a slide ejection button 410 configured to facilitate the removal of the disposable slide 400 from the housing 11 of the sensor 10. In various embodiments, upon the commencement of the particle collection functionality of the fluid composition sensor 10, as described herein, the sensor may be configured to lock the slide ejection button 410 such that it will not function to release the slide 400 disposed within the internal sensor portion 13 until a determination is made, for example, by the controller that both the particle collection and particle analysis functions have been completed.

Figure 6A:
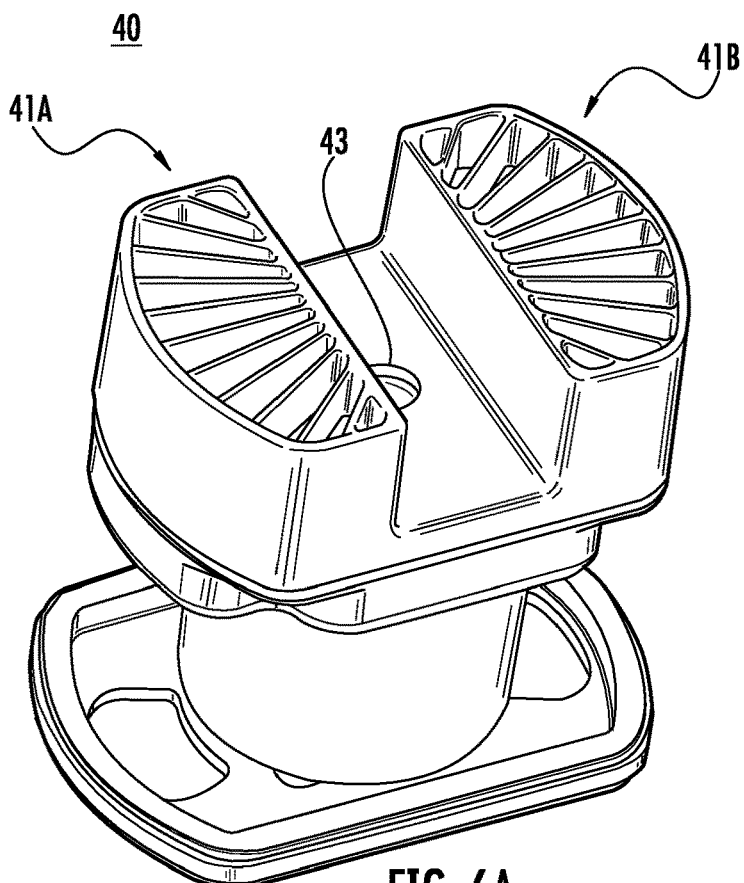
FIGS. 6A-6B illustrate perspective views of an exemplary apparatus in accordance with various embodiments.
Figure 6B:
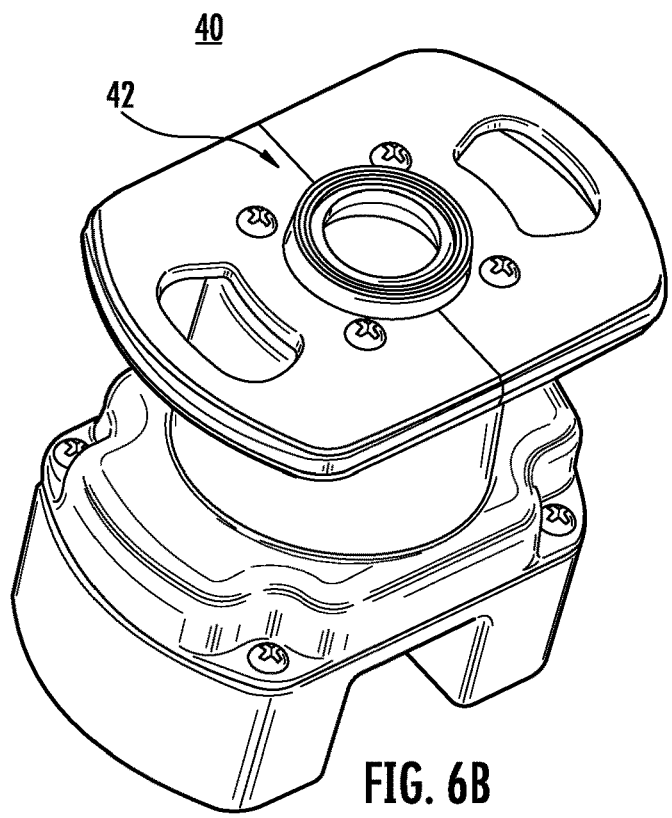

FIGS. 6A-6B illustrate perspective views of an exemplary apparatus in accordance with various embodiments. In particular, FIGS. 6A and 6B show a top perspective view and a bottom perspective view, respectively, of an exemplary removable fluid flow component 40 according to various embodiments described herein. In various embodiments, the removable fluid flow component 40 may be configured to receive a volume of fluid from a sensor fluid inlet through at least one fluid flow component inlet 41A and may define at least a portion of a fluid flow path of the volume of fluid whereby the volume of fluid may travel from the fluid flow component inlet 41A to a fluid flow component outlet 42. The removable fluid flow component 40 may be disposed within an internal sensor portion of an exemplary fluid composition sensor 10 and arranged such that the at least one fluid flow component inlet 41A is positioned at least substantially proximate a sensor fluid inlet. As illustrated in FIG. 6A, in various embodiments, the at least one fluid flow component inlet may comprise a first fluid flow component inlet 41A and a second fluid flow component inlet 41B, each being configured to receive a respective volume of fluid.

In various embodiments, a removable fluid flow component 40 may include a light path orifice 43 comprising a channel extending through at least a portion of the removable fluid flow component 40. For example, an illumination source, as described herein, may be positioned within an internal sensor portion at least substantially adjacent an exterior portion of the removable fluid flow component 40. The illumination source may emit a light beam in a direction at least substantially towards the collection media 131. In various embodiments, the light path orifice 43 of the removable fluid flow component 40 may be configured to enable the light beam emitted from the illumination source to extend through at least a portion of the removable fluid flow component 40 to the fluid flow component outlet 42 without being interrupted by a portion (e.g., a wall) of the removable fluid flow component 40. As such the configuration of the light path orifice 43 may correspond to that of the illumination source and the light beam emitted therefrom. For example, in various embodiments, the illumination source may be arranged such that the light beam emitted therefrom extends in a direction that is at least substantially coaxial with a central axis of the removable fluid flow component 40 (e.g., the fluid flow component outlet 42). In such an exemplary configuration, the light beam orifice 43 of the removable fluid flow component 40 may similarly extend in a direction coaxial with the central axis of the fluid flow component 40 between the surface of the fluid flow component 40 adjacent the illumination source and the fluid flow component outlet 42. Further, the light beam orifice 43 may be defined at least in part by a diameter that is at least as large as the corresponding diameter of the light beam and such that sidewalls of the light beam orifice 43 (along a thickness of the fluid flow component 40) do not substantially interfere with the light beam (e.g., causing reflections of light which may create interference in the generated image once the light is received at the imaging device). In various embodiments, the diameter of the light beam orifice 43 may be either constant or may vary based at least in part on the light beam having a variable diameter (e.g., a diverging light beam).

As shown in FIG. 6B, the fluid flow component outlet 42 may comprise a passage disposed at least substantially near a bottom surface of the removable fluid flow component 40 through which a volume of fluid traveling through the removable fluid flow component 40 may be dispensed. As described herein, the fluid flow component outlet 42 may be configured so as to dispense a volume of fluid from the removable fluid flow component 40 in a direction at least substantially toward an impactor nozzle. For example, in various embodiments, the fluid flow component outlet 42 may be configured so as to be at least substantially aligned with a nozzle inlet of an impactor nozzle. Further, in various embodiments, the size and shape of the fluid flow component outlet 42 may be at least substantially similar to that of the nozzle inlet. As described herein, in various embodiments, the fluid composition sensor 10 may be configured to apply a compression force to the removable fluid flow component 40, at least in part, to create a secured seal at the fluid flow component outlet 42 so as to ensure that the sample volume of fluid flowing from the fluid flow component outlet 42 to the impactor nozzle remains fluidly isolated from a volume of ambient fluid. Further, in various embodiments, the impactor nozzle of the fluid composition sensor 10 may be connected to the removable fluid flow component 40 so as to define a singular sensor component, as described herein.

The removable fluid flow component 40 may be disposed within an internal sensor portion of the fluid composition sensor 10. As described herein, the removable fluid flow component 40 may be removed from the internal sensor portion to facilitate the cleaning and/or replacement of the removable fluid flow component 40 in order to decrease the amount of undesired particulate matter that has accumulated therein and minimize the risk of system error caused by contamination. In various embodiments, the removable fluid flow component 40 may be comprised of a plurality of separable components that fit together to collectively define the removable fluid flow component 40. In such a circumstance, the removable fluid flow component 40 may be at least partially disassembled such that at least a portion of the plurality of separable components may be cleaned as individually. For example, disassembling the removable fluid flow component 40 prior to the cleaning process may make accessible one or more areas that could not traditionally be reached in a singular component.

In various embodiments the removable fluid flow component 40 may comprise a light trap configured to absorb light so as to minimize the amount of light reflected off of a component within an internal sensor portion and toward a field of view of the imaging device, which may produce image interference that may at least partially obscure one or more features of the one or more particles disposed within the collection media 131, as described herein.

Receipt of Replaceable Collection Media Assembly by Fluid Composition Sensor

Figure 7:
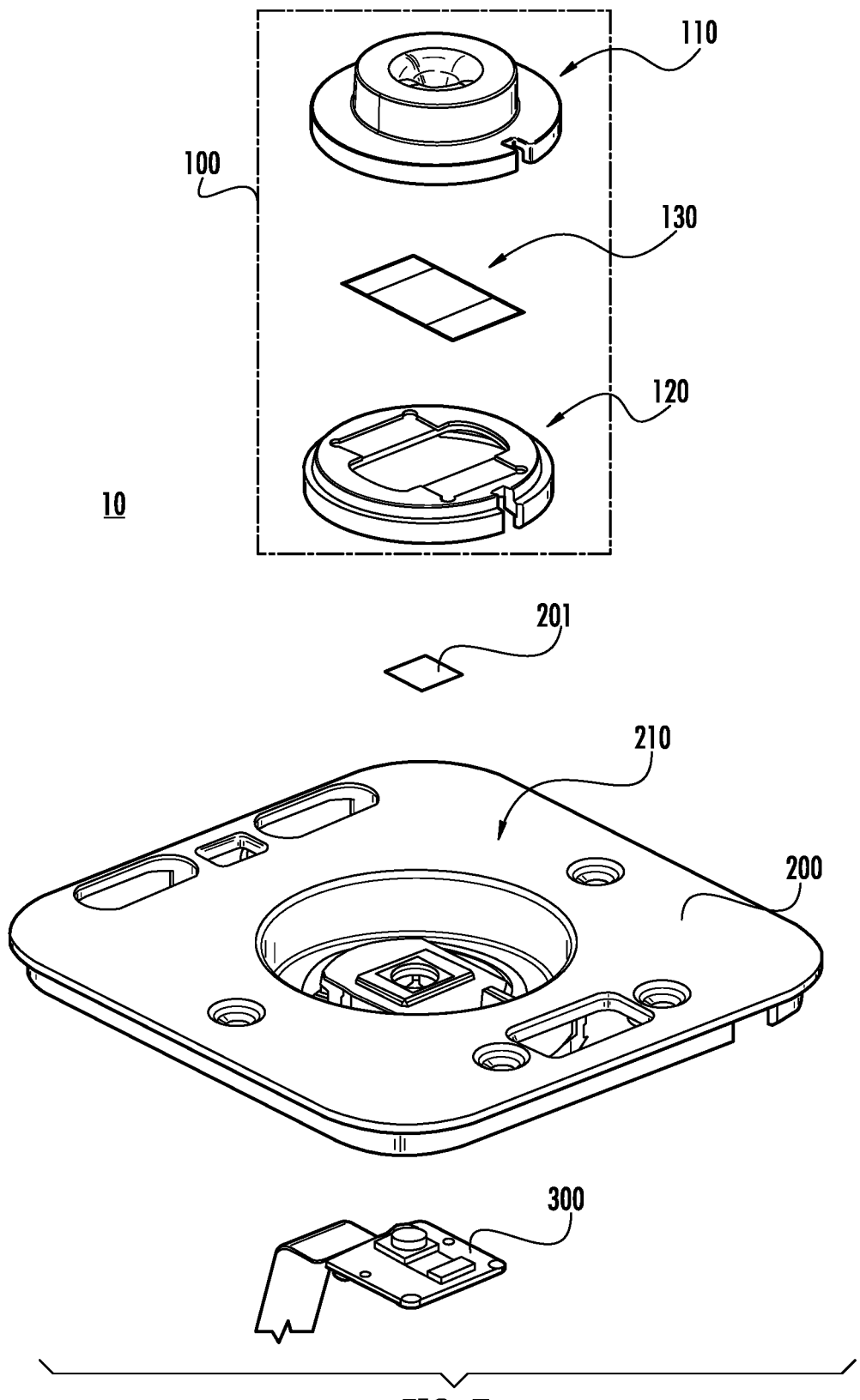
FIG. 7 illustrates an exploded view of an exemplary apparatus in accordance with various embodiments described herein.

FIG. 7 illustrates an exploded view of various components of an exemplary apparatus in accordance with various embodiments described herein. In particular, FIG. 7 illustrates an exploded view of an exemplary embodiment wherein a fluid composition sensor 10 comprises an imaging device 300, a collection media assembly dock element 200, a transparent protective cover 201, and a replaceable collection media assembly 100. As illustrated, each of the aforementioned sensor components may be at least substantially coaxially aligned along a central vertical axis extending between the imaging device 300, an imaging orifice disposed within the collection media assembly dock element 200, the a field of view of the imaging device on a collection media of the particle collection slide 130, and both the nozzle outlet and the nozzle inlet of the impactor nozzle disposed about a top of the of an upper cassette portion of the replaceable collection media assembly 100. In various embodiments, as described herein, the imaging device 300 (e.g., a field of view of the imaging device 300) and a receiving area of the collection media 131 disposed within the replaceable collection media assembly 100 may be aligned about a vertical axis extending through a central portion of the fluid composition sensor or, alternatively, through a portion of the sensor positioned a distance away from the aforementioned central portion. Further, in various embodiments, an impactor nozzle, an illumination source, and/or an imaging orifice of the collection media assembly dock element may be similarly aligned along an at least substantially similar vertical axis.

In various embodiments, the replaceable collection media assembly 100 may be embodied as, for example, a replaceable cassette comprising an upper cassette portion 110, a lower cassette portion 120, and a particle collection slide 130. In various embodiments, the upper cassette portion 110 and the lower cassette portion 120 may collectively define a collection media housing configured to receive and secure the particle collection slide 130 therein. As described herein, the upper cassette portion 110 may be configured to receive a volume of fluid and/or direct the volume of fluid toward a receiving area of the collection media disposed upon the particle collection slide 130 such that at least a portion of the particles within the volume of fluid received by the upper cassette portion become embedded in the collection media. Further, the lower cassette portion 120 may comprise an opening extending therethrough so as to enable an image to be taken of the plurality of particles disposed on the particle collection slide 130 from the underside of the replaceable collection media assembly 100.

As described herein, one or both of the upper cassette portion 110 and the lower cassette portion 120 may be made from one or more of a variety of materials having any of a variety of different physical properties (e.g., surface finishes, colors). For example, in various embodiments, at least a portion of one or both of the upper cassette portion 110 and the lower cassette portion 120 may comprise a transparent material. Further, in various embodiments, at least a portion of one or both of the upper cassette portion 110 and the lower cassette portion 120 may comprise a transparent material, such as, for example, glass. Alternatively, or additionally, in various embodiments, at least a portion of one or both of the upper cassette portion 110 and the lower cassette portion 120 may be made from a non-reflective material having a black (e.g., matte black) finish so as to reduce and diffuse any optical reflections within and/or near the replaceable collection media assembly 100. For example, in various embodiments, one or more surfaces of the replaceable collection media assembly housing may comprise a matte SPI C-2 finish. In various embodiments, at least a portion of one or both of the upper cassette portion 110 and the lower cassette portion 120 may comprise a conductive portion that is either made from a static-dissipative material or has a static-dissipative surface treatment applied thereto. Further, in various embodiments, at least a portion of one or both of the upper cassette portion 110 and the lower cassette portion 120 may comprise a hydrophobic material or has a hydrophobic surface treatment applied thereto. Alternatively, or additionally, in various embodiments, at least a portion of one or both of the upper cassette portion 110 and the lower cassette portion 120 may comprise a hygroscopic material or has a hygroscopic surface treatment applied thereto. In various embodiments, at least a portion of one or both of the upper cassette portion 110 and the lower cassette portion 120 may comprise an oleophobic material or has an oleophobic surface treatment applied thereto. Alternatively, or additionally, in various embodiments, at least a portion of one or both of the upper cassette portion 110 and the lower cassette portion 120 may comprise an oleoscopic (e.g., oleophilic) material or has an oleoscopic (e.g., oleophilic) surface treatment applied thereto.

In various embodiments, the fluid composition sensor 10 may further comprise a collection media assembly dock element 200 configured to receive a replaceable collection media assembly 100 and secure the collection media assembly 100 in a preferred alignment within the internal sensor portion. For example, the collection media assembly dock element 200 may be embodied as a tray (e.g., inset relative to the lower sensor housing 30) comprising a collection media assembly receptacle 210 designed to include one or more geometric features corresponding to the physical configuration of the replaceable collection media assembly 100 such that a replaceable collection media assembly 100 may be inserted therein and secured in a desired position relative one or more other components of the sensor 10. In various embodiments, the imaging device 300 may be operatively attached (e.g., via a printed circuit board) to a bottom surface of the collection media assembly dock element 200 and positioned directly adjacent an imaging orifice extending through the collection media assembly dock element 200 such that the imaging device 300 may have an unimpeded line of sight to the receiving area of the particle collection slide 130, which may be at least substantially aligned with an illumination source, as described herein. Such a configuration facilitates the particle analysis functionality of the fluid composition sensor 10, as described herein, by enabling the imaging device 300 to capture an image of the plurality of particles embedded within the receiving area of the particle collection slide 130 (e.g., the collection media) while the replaceable collection media assembly 100 remains secured within the collection media assembly dock element 200. In various embodiments, the collection media assembly dock element 200 may further comprise a transparent protective cover 201 configured to cover the imaging orifice at the top surface of the collection media assembly dock element 200 so as to protect the imaging device 300 from contamination.

In various embodiments, one or more portions of the collection media assembly receptacle 210, such as, for example, one or more of the collection media assembly receptacle sidewalls, a peripheral alignment protrusion, and/or a bottom alignment protrusion, may engage the replaceable collection media assembly 100 so as to prevent the collection media assembly 100 within the collection media assembly receptacle 210 from moving in the x-y plane relative to the imaging device 300. Further, in various embodiments, a collection media assembly dock element 200 may comprise one or more alignment features positioned at least substantially adjacent the collection media assembly receptacle 210 and configured to engage a corresponding feature of a replaceable collection media assembly 100 disposed within the receptacle 210 so as to facilitate the angular alignment of the replaceable collection media assembly 100 and to prevent the replaceable collection media assembly 100 from moving in a radial direction relative to the collection media assembly dock element 200. For example, such alignment features may be an alignment key and corresponding slot, as shown in the illustrated embodiments, a non-round portion of the perimeter of the replaceable collection media assembly 100, and/or the like. Additionally, as described in further detail herein, the replaceable collection media assembly may be further constrained in the vertical direction (e.g., z-direction) based at least in part on the configuration of the fluid composition sensor 10 and a downward vertical force transmitted through one or more sensor components to the replaceable collection media assembly 100 disposed within the collection media assembly receptacle 210 such that the replaceable collection media assembly 100 is pressed against a constrained bottom surface of the collection media assembly dock element 200. As described herein, the collection media assembly dock element 200 may be configured within the fluid composition sensor 10 such that a replaceable collection media assembly 100 inserted therein may prevented from moving relative to the imaging device 300 in each of the x-direction, the y-direction, the z-direction, and the angular direction.

Replaceable Collection Media Assembly

As shown in FIGS. 8-12B, the fluid composition sensor 10 may comprise a replaceable collection media assembly 100. In various embodiments, a replaceable collection media assembly 100 may be configured to be disposed within an internal sensor portion of a fluid composition sensor and positioned within a fluid flow path defined by the sensor. As described herein, a volume of fluid comprising a plurality of particles and traveling along the fluid flow path may pass across a collection media of the replaceable collection media assembly 100 such that at least a portion of the plurality of particles within the volume of fluid become embedded within the collection media. In various embodiments, a replaceable collection media assembly 100 disposed within the fluid composition sensor may be removed from, for example, a particle collection position within the internal sensor portion of the fluid composition sensor. For example, upon determining that at least substantially the entirety of a sample volume of fluid has passed across a surface of the collection media and that the one or more images of the particles needed to enable the particle analysis function of the sensor 10 have been captured by an imaging device, the replaceable collection media assembly 100 may be removed from the internal sensor portion of the fluid composition sensor. Further, as described herein, the removed replaceable collection media assembly 100 may be replaced with a different, unused replaceable collection media assembly 100.

Figure 8:
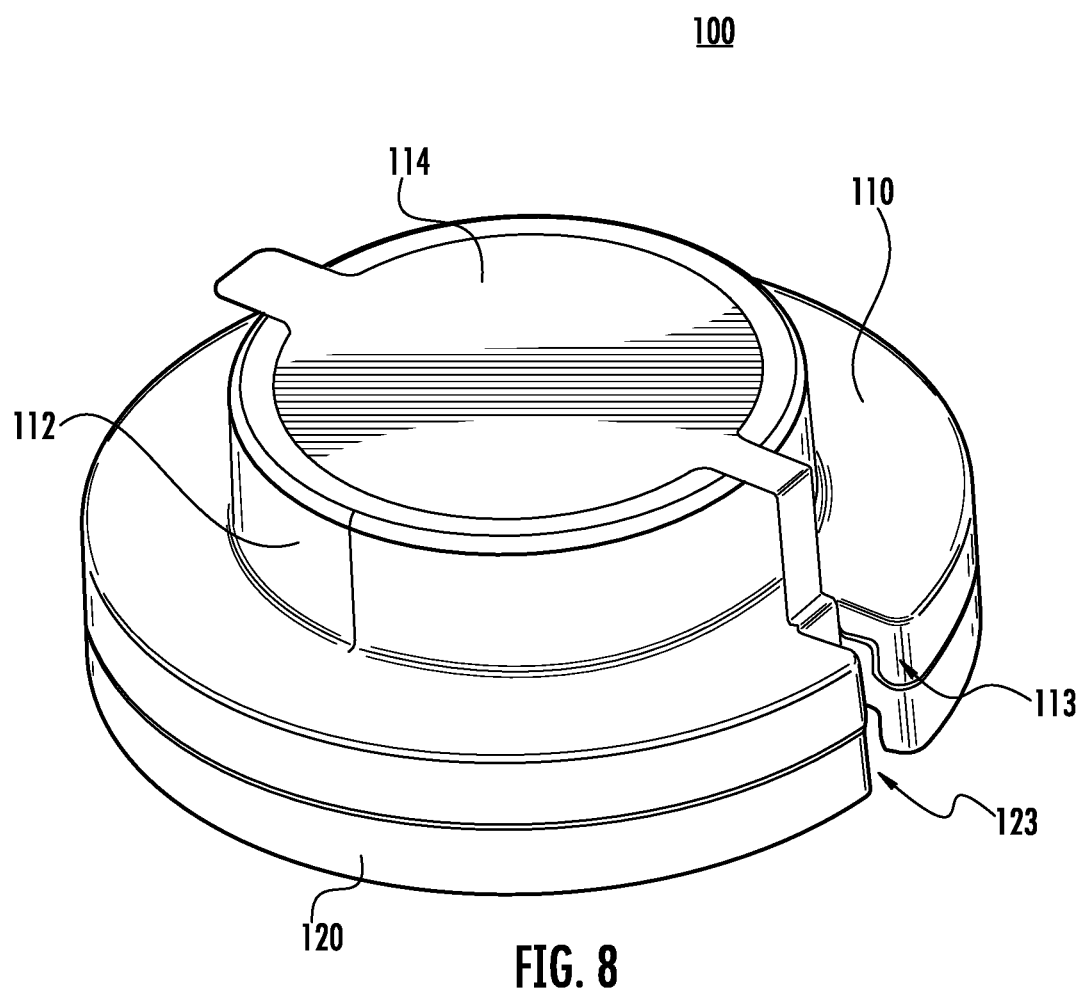
FIG. 8 illustrates a perspective view of an exemplary replaceable collection media assembly in accordance with various embodiments described herein.

FIG. 8 illustrates a perspective view of an exemplary replaceable collection media assembly in accordance with various embodiments described herein. In particular, FIG. 8 illustrates an unused replaceable collection media assembly 100, wherein the replaceable collection media assembly 100 is embodied as a replaceable cassette. As described herein, a replaceable collection media assembly 100 may comprise a collection media and a collection media housing (e.g., a frame element) configured to receive and secure the collection media (e.g., a particle collection slide upon which the collection media may be disposed) relative to the housing. Further, in various embodiments, a collection media housing may be configured facilitate the transportation and positioning of the replaceable collection media assembly 100 within a fluid composition sensor.

As illustrated in FIG. 8, a replaceable collection media assembly 100 may comprise an upper cassette portion 110, a lower cassette portion 120, and a particle collection slide (not shown). The upper cassette portion 110 and lower cassette portion 120 may define corresponding alignment features for assembly of the cassette 100. For example, the upper cassette portion 110 may comprise a protruding edge along a lower side of the upper cassette portion 110 that is configured to engage a corresponding inset edge along the upper side of the lower cassette portion 120, thereby enabling the upper cassette 110 to engage the lower cassette portion 120. In various embodiments, the upper cassette portion 110 may be secured relative to the lower cassette portion 120 via any of a variety of fastening configurations, such as tape (e.g., around an exterior perimeter of the cassette 100), adhesive, ultrasonic welding, and/or the like).

In various embodiments, the upper cassette portion 110 and the lower cassette portion 120 may collectively define a collection media housing configured to receive and secure the particle collection slide therein. Specifically, as shown the lower cassette portion 120 may define a receiving portion for the particle collection slide (e.g., an inset portion having a size and/or shape corresponding to the size and shape of the particle collection slide). The receiving portion may be an inset portion having a depth corresponding to the thickness of the particle collection slide, and having length and width dimensions corresponding to the length and width, respectively, of the particle collection slide, such that the particle collection slide is entrapped within the cassette 100 when assembled to impede undesired movement therein. As illustrated, the replaceable collection media assembly 100 may define an at least substantially circular perimeter. In various embodiments, the upper cassette portion 110 may comprise a fluid inlet configured to receive a volume of fluid. Further, as illustrated, the impactor nozzle 112 of the fluid composition sensor 10 may be part of the replaceable collection media assembly 100. For example, the impactor nozzle 112 may be positioned on a top portion of the replaceable collection media assembly 100 so as to define a portion of the upper cassette portion 110. In such a configuration, the impactor nozzle 112 may define the fluid inlet of the replaceable collection media assembly 100 through which the replaceable collection media assembly 100 may be configured to receive a volume of fluid from a removable fluid flow component positioned upstream within the fluid composition sensor. The impactor nozzle 112 may be further configured to direct the volume of fluid toward the collection media of the replaceable collection media assembly 100 such that at least a portion of the particles within the volume of fluid received by the upper cassette portion become embedded within the collection media.

As described herein, in various embodiments, both the upper cassette portion 110 and the lower cassette portion 120 may comprise one or more alignment features configured to assist with the alignment and/or positioning of the replaceable collection media assembly 100 within the in the fluid composition sensor. For example, as illustrated in FIG. 8, both the both the upper cassette portion 110 and the lower cassette portion 120 define a peripheral alignment recess 113, 123 extending from a peripheral edge inward toward a central portion thereof. The peripheral alignment recesses 113, 123 may comprise a portion of the upper and lower cassette portions 110, 120, respectively, that has been cut away (e.g., a slit) such that they may be configured to receive a corresponding peripheral alignment element extending from a collection media assembly dock element 200 in which the replaceable collection media assembly 100 is disposed inward toward the central portion of the replaceable collection media assembly 100. The upper peripheral alignment recess 113 and the lower peripheral alignment recess 123 may be at least substantially aligned relative to one another and may each receive a portion of the peripheral alignment element so as to align the upper and lower cassette portions 110, 120, respectively, in a desired angular configuration relative to the collection media assembly dock element 200 (and thus, to an imaging device positioned adjacent thereto, as described herein). In such a configuration, the peripheral alignment recesses 113, 123 may at least partially surround the peripheral alignment element of the collection media assembly dock element 200. In an exemplary circumstance wherein the collection media assembly 100 begins to rotate in an angular direction relative to the collection media assembly dock element 200, for example, at least a portion of the replaceable collection media assembly 100 defining an edge of the peripheral alignment recesses 113, 123 may engage the adjacent peripheral alignment element, thereby acting acts as a physical barrier preventing the replaceable collection media assembly 100 from moving in an angular direction relative to the collection media assembly dock element 200.

In various embodiments, a fluid composition sensor may be susceptible to increased inaccuracies over time, for example, as a number of particles collected within a replaceable collection media assembly 100 changes as a result of the increased number of particles disposed therein. Thus, the collection media assembly 100 and/or one or more components thereof may be replaceable. In various embodiments, replacing a replaceable collection media assembly 100 and/or one or more components thereof may comprise removing the assembly from the fluid composition sensor and replacing the replaceable collection media assembly 100 and/or the one or more components thereof with a substantially similar part. For example, in order to minimize the risk of system inaccuracies caused by leftover particles from a previous sample volume of fluid being disposed within a collection media prior to the start of the particle collection function of the sensor, the replaceable collection media assembly 100 comprising the used collection media may be removed from the sensor and replaced with an unused replaceable collection media assembly 100. In various embodiments, as illustrated in FIG. 8, an unused replaceable collection media assembly 100 may comprise a sealed cover 114, such as, for example, an adhesive sticker, configured to cover an entirety of the fluid inlet of replaceable collection media assembly 100. Additionally, in various embodiments, an unused replaceable collection media assembly 100 may further comprise a sealed cover 114 configured to cover an entirety of the fluid outlet of the replaceable collection media assembly 100, defined at least in part by an opening along a bottom portion of the collection media assembly 100. In such a configuration, the collection media of the replaceable collection media assembly 100 may be at least substantially isolated from an ambient environment such that the risk of contamination of the collection media prior to being inserted into the fluid composition sensor is minimized. As illustrated, the sealed cover 114 of the replaceable collection media assembly 100 may comprise a singular adhesive element with various portions configured to cover one of the fluid inlet and fluid outlet of the replaceable collection media assembly 100 and an intermediary connection portion extending therebetween through the peripheral alignment recesses 113, 123.

Figure 9:
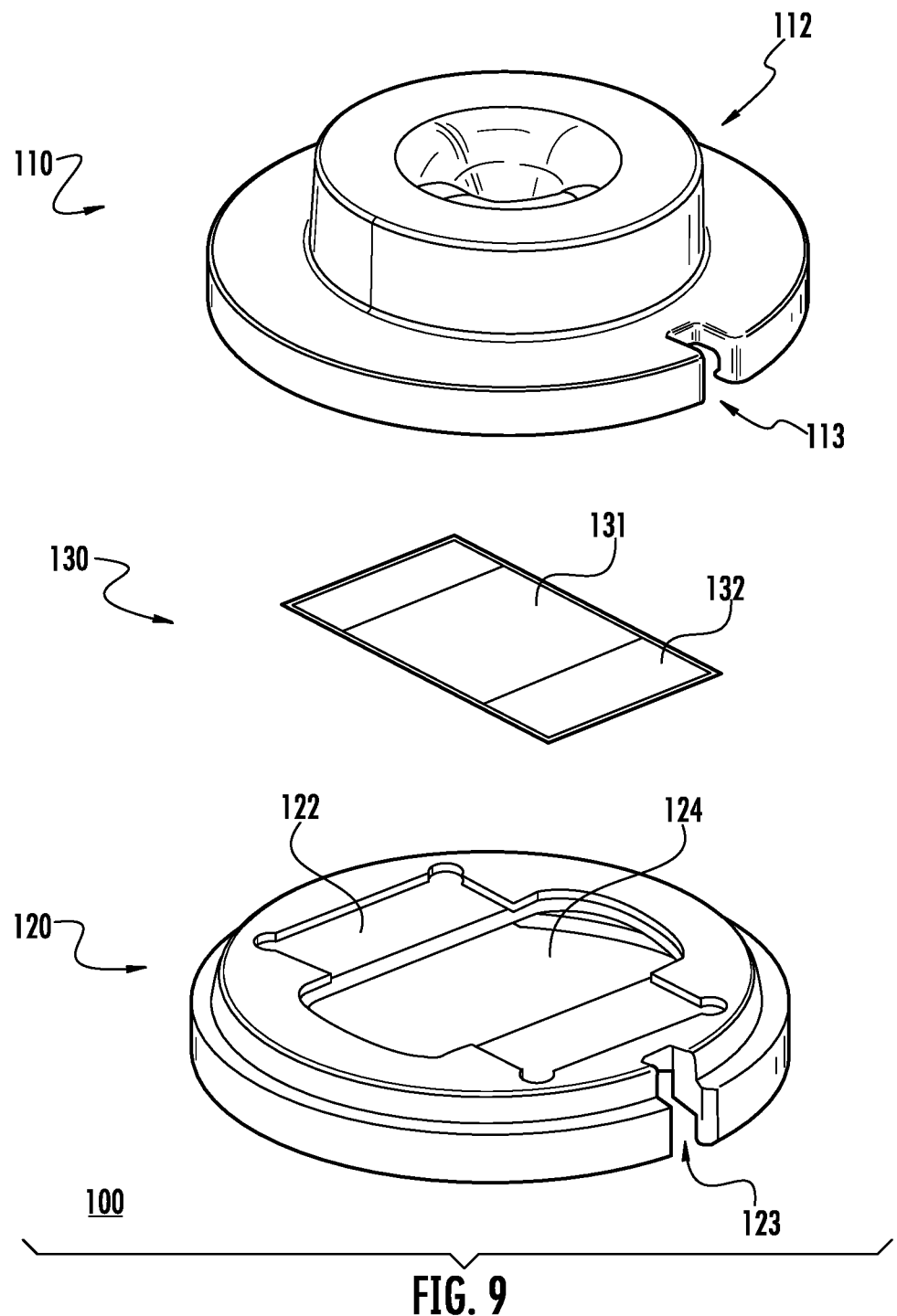
FIG. 9 illustrates an exploded view of an exemplary replaceable collection media assembly in accordance with various embodiments described herein.

FIG. 9 illustrates an exploded view of various components of an exemplary apparatus in accordance with various embodiments described herein. In particular, FIG. 9 illustrates an exploded view of an exemplary replaceable collection media assembly 100. As described herein, the replaceable collection media assembly 100 of a fluid composition sensor may be embodied as, for example, a replaceable cassette comprising an upper cassette portion 110, a lower cassette portion 120, and a particle collection slide 130. The upper cassette portion 110 and the lower cassette portion 120 may collectively define a collection media housing configured to receive and secure the particle collection slide 130 therein. As described herein, the upper cassette portion 110 may be configured to receive a volume of fluid, for example, through an impactor nozzle 112 (e.g., via a nozzle inlet) positioned at a top portion thereof, and/or direct the volume of fluid toward a receiving area of the collection media 131 disposed upon the particle collection slide 130 such that at least a portion of the particles within the volume of fluid received by the upper cassette portion 110 become embedded in the collection media.

In various embodiments, the particle collection slide 130 may comprise a transparent substrate 132 having a collection media 131 on at least a portion of an upper surface thereof. As described herein, the collection media 131 may be configured to receive one or more particles of a plurality of particles via interaction with a volume of fluid traveling through a fluid composition sensor along a fluid flow path. In various embodiments, the collection media 131 may comprise a receiving surface configured to face toward an impactor nozzle 112, and a backside that may be positioned at least substantially adjacent (e.g., secured directly to) the transparent substrate 132. The receiving surface of the collection media 131 may comprise a receiving area defining the portion of the collection media 131 that, based at least in part on the arrangement of the collection media 131 relative to the nozzle outlet of an impactor nozzle 112, is configured to receive particles from the volume of fluid flowing through the sensor 10. Further, the collection media 131 may have a thickness of at least substantially between about 10 and about 1000 microns, (e.g., 100 microns) defined by the distance between the receiving surface and the backside. In various embodiments, the collection media 131 may comprise a material suitable to stop one or more particles of a plurality of particles traveling at a velocity into the receiving surface before the particle reaches the backside, such that the one or more particles of the plurality of particles are embedded within the collection media at a distance along the thickness of the collection media 131. For example, in various embodiments, the collection media may comprise an adhesive (i.e. sticky) material, such as a gel.

In various embodiments, the replaceable collection media assembly 100 may comprise a plurality of components. For example, as illustrated in FIG. 9, the upper cassette portion 110, the lower cassette portion 120 and the particle collection slide 130 are three distinct components of the replaceable collection media assembly 100. Alternatively, in various embodiments, the particle collection slide 130 may be molded into the lower cassette portion 120 such that the replaceable collection media assembly 100 may comprise two distinct components that may be pieced together to form a singular cassette. Further, the upper cassette portion 110 and the lower cassette portion 120 may be molded together into a singular frame element. In such a circumstance the singular frame may comprise one or more openings configured to receive the particle collection slide 130 such that it may be properly positioned within the singular frame, as described herein.

In various embodiments, the lower cassette portion 120 of the replaceable collection media assembly 100 may comprise one or more features configured to receive the particle collection slide 130 and at least partially secure the slide 130 in a preferred arrangement adjacent a top portion thereof. For example, the lower cassette portion may receive and secure the particle collection slide 130 using a recessed shelf 122 embodied as an indention in a top surface of the lower cassette portion, the recessed shelf 122 having a shape and size that are at least substantially similar to those of the particle collection slide 130. Further, the lower cassette portion 120 may comprise an opening 124 extending therethrough so as to enable an image to be taken of the plurality of particles disposed on the particle collection slide 130 from the underside of the replaceable collection media assembly 100. Further, the opening 124 of the lower cassette portion 120 may enable a volume of fluid to flow through the replaceable collection media assembly 100 to a fluid outlet thereof. As described herein, when the replaceable collection media assembly 100 is disposed within a fluid composition sensor, at least a portion of the opening 124 of the lower cassette portion 120 may be aligned with the receiving area of the collection media 131 and a field of view of an imaging device of the fluid composition sensor.

In various embodiments, the upper cassette portion 110 and the lower cassette portion 120 may be configured to be assembled together such that the particle collection slide 130 arranged on the lower cassette portion 120 is secured therebetween. In various embodiments, the upper and lower cassette portions 110, 120 may each have respective attachment features corresponding to the attachment features of the other cassette portion such that the two cassette portions 110, 120 assembled and secured together. For example, the one or more attachment features may comprise one or more geometric features (e.g., protrusions ridges, indentions, ad/or the like) configured to facilitate a semi-permanent engagement between the two cassette portions 110, 120. In various embodiments, upon being assembled together with a particle collection slide 130 arranged therebetween, the upper cassette assembly 110 and the lower cassette assembly 120, may be collectively configured to at least substantially fully constrain the particle collection slide 130 such that the slide cannot move in any direction relative to either the upper or lower cassette portions 110, 120.

Figure 10A:
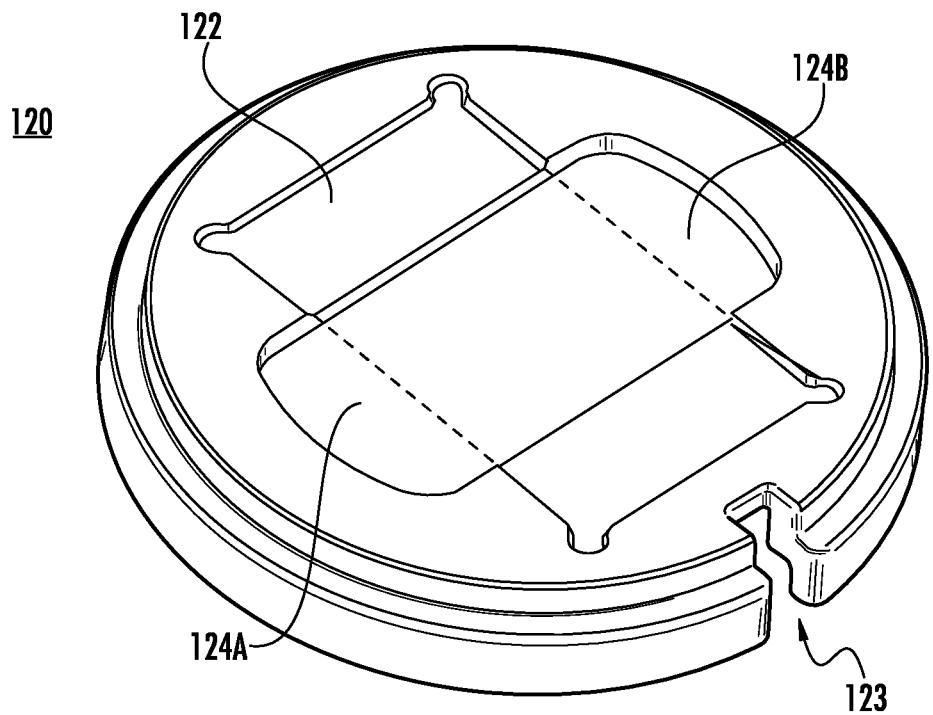
FIGS. 10A-10B illustrate perspective views of an exemplary replaceable collection media assembly in accordance with various embodiments described herein.
Figure 10B:
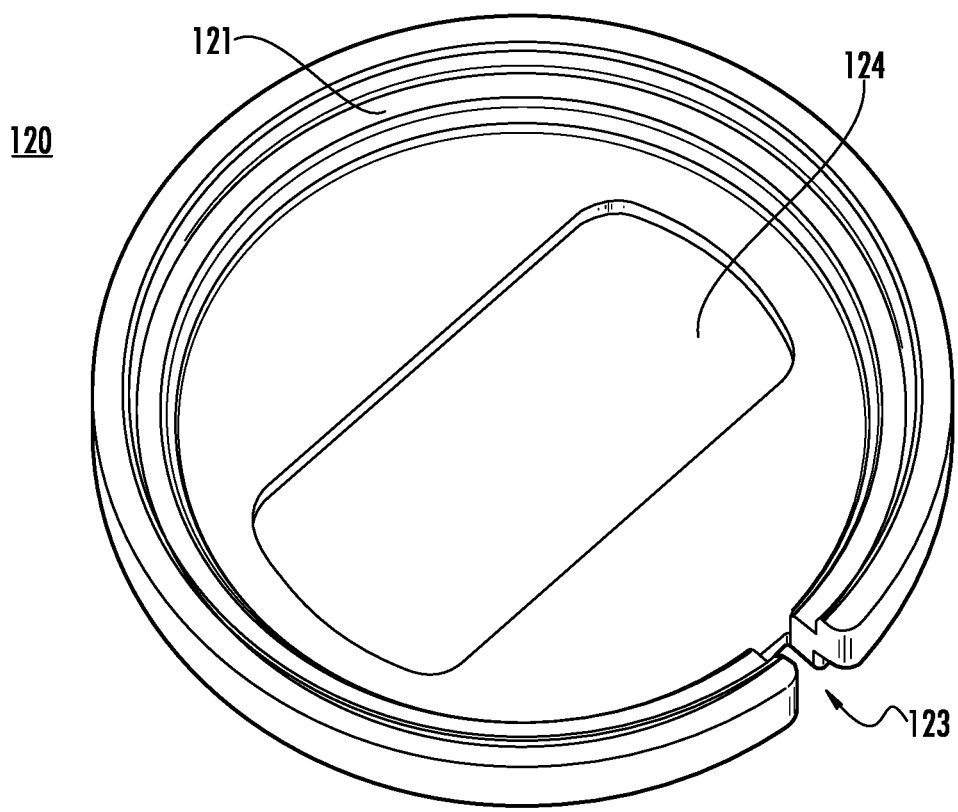

FIGS. 10A-10B illustrate a perspective view of an exemplary replaceable collection media assembly in accordance with various embodiments described herein. In particular, FIGS. 10A and 10B show a top perspective view and a bottom perspective view, respectively, of a lower cassette portion 120 of an exemplary replaceable collection media assembly 100 according to various embodiments described herein. The lower cassette portion 120 of the replaceable collection media assembly 100 may comprise a frame element defining at least a portion of a collection media housing. In various embodiments, the lower cassette portion 120 may be configured to receive and secure a particle collection slide. For example, the lower cassette portion may comprise one or more features configured to receive the particle collection slide and at least partially secure the slide in a preferred arrangement adjacent a top portion thereof. As illustrated in FIG. 9, the lower cassette portion 120 may receive the particle collection slide using a recessed shelf 122 embodied as an indention in a top surface of the lower cassette portion 120. The recessed shelf 122 may be defined at least in part by perimeter sidewalls extending around an outer boundary thereof so as to at least partially constrain the movement of a particle collection slide disposed therein. The recessed shelf 122 may have a shape and size that are at least substantially similar to those of the particle collection slide. In various embodiments, the recessed shelf 122 may be configured to extend across an opening 124 of the lower cassette portion 120, such that the recessed shelf 122 defines two distinct shelf portions located on either side of the opening 124, each configured to receive a portion of the particle collection slide. In such a configuration, the recessed shelf of the lower cassette portion 120 is configured such that a particle collection side disposed therein may extend over at least a portion of the opening 124.

As described herein, an opening 124 of the lower cassette portion 120 may extend through the lower cassette portion 120 in a substantially vertical direction so as to enable an underside of a particle collection slide positioned within the lower cassette portion 120 (e.g., a plurality of particles embedded within a collection media disposed on the particle collection slide) to be visible from beneath the replaceable collection media assembly 100. As described herein, such a configuration may allow an imaging device positioned beneath a replaceable collection media assembly 100 within a fluid composition sensor to capture an image of the plurality of particles embedded in the collection media of the replaceable collection media assembly 100. Further, the opening 124 of the lower cassette portion 120 may enable a volume of fluid received by the replaceable collection media assembly 100 to flow therethrough to a fluid outlet of the replaceable collection media assembly 100 upon passing across at least a portion of a surface the collection media. For example, wherein the recessed shelf 122 may be configured to extend across an opening 124 of the lower cassette portion 120, the volume of fluid may flow through one of two distinct opening portions 124A, 124B located on either side of the particle collection slide. In various embodiments, when the replaceable collection media assembly 100 is disposed within a fluid composition sensor, at least a portion of the opening 124 of the lower cassette portion 120 may be at least substantially aligned with the receiving area of the collection media and a field of view of an imaging device of the fluid composition sensor.

As described herein, the lower cassette portion 120 may be configured such that it may be assembled together with an upper cassette portion in order to define a collection media housing. In various embodiments, the lower cassette portion 120 may comprise one or more attachment features configured to facilitate the connection between the lower cassette portion 120 and the upper cassette portion. For example, the one or more attachment features may comprise one or more geometric features (e.g., protrusions ridges, indentions, ad/or the like) configured to facilitate a semi-permanent engagement of the lower cassette portion 120 with the upper cassette portion. As illustrated in FIG. 10A, the one or more attachment features of the lower cassette portion 120 may comprise a geometric profile, such as, for example, a ridge, extending around at least a portion of the perimeter of the lower cassette portion 120. In various embodiments, the one or more attachment features of the lower cassette portion 120 may correspond to at least one of the attachment features defined by the upper cassette portion so as to facilitate the assembly of the lower cassette portion 120 to the upper cassette portion in a secured configuration.

As illustrated in FIG. 10B, the lower cassette portion 120 may comprise an interior cavity defined by the bottom surface and/or sidewalls thereof. In various embodiments, the bottom surface of the lower cassette portion 120 may be defined at least in part by one or more geometric features 121 so as to create an interior cavity profile corresponding to the profile of at least a portion of a collection media assembly dock element disposed within a fluid composition sensor. The lower cassette portion 120 may be configured to facilitate the insertion and alignment of the replaceable collective media assembly 100 within the collection media assembly dock element based at least in part on the interior cavity and the one or more geometric features 121 arranged therein. For example, in various embodiments wherein a collection media assembly dock element comprises a bottom alignment protrusion extending upward into a collection media assembly receptacle from a bottom surface thereof, the lower cassette portion 120 may be configured to receive the bottom alignment protrusion within the interior cavity such that the one or more geometric features 121 therein may engage the bottom alignment protrusion so as to stabilize the position of the replaceable collection media assembly 100 within the collection media assembly receptacle. In various embodiments, the configuration of the lower cassette portion 120, such as, for example, the arrangement of geometric features 121 within the interior cavity, sidewall length, and/or the like, may be such that when the lower cassette portion 120 is disposed within a collection media assembly dock element in a fluid composition sensor, a particle collection slide secured to the lower cassette assembly 120 may be positioned at a predetermined distance away from an imaging device in order to optimize a particle analysis function of sensor, as described herein.

Figure 11A:
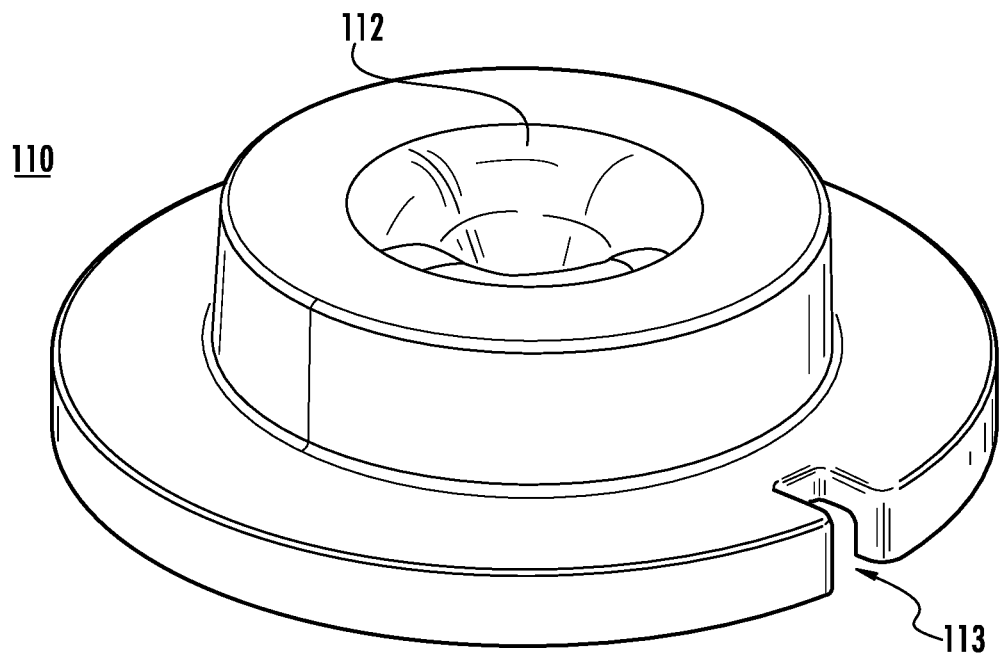
FIGS. 11A-11B illustrate perspective views of an exemplary replaceable collection media assembly in accordance with various embodiments described herein.
Figure 11B:
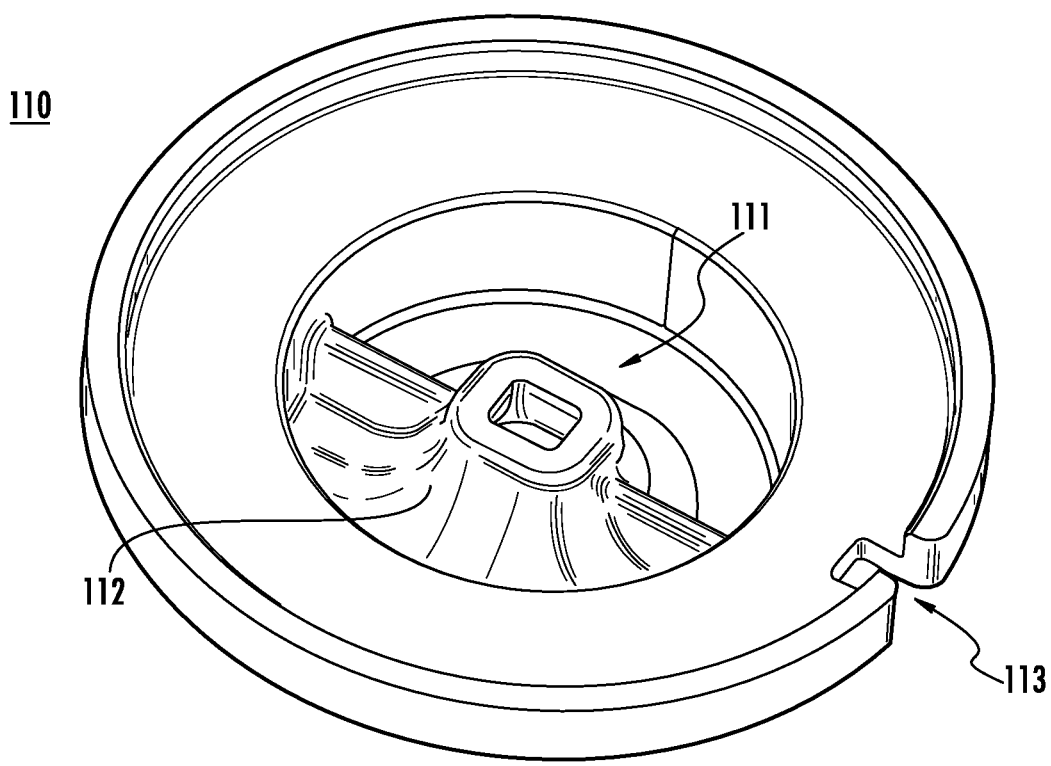

FIGS. 11A-11B illustrate perspective views of an exemplary replaceable collection media assembly in accordance with various embodiments described herein. In particular, FIGS. 11A and 11B show a top perspective view and a bottom perspective view, respectively, of an upper cassette portion 110 of an exemplary replaceable collection media assembly 100 according to various embodiments described herein. In various embodiments, the upper cassette portion 110 may define a portion of a replaceable collection media assembly 100 that is configured to receive a volume of fluid traveling through a fluid composition sensor and direct the volume of air towards a collection media. As described herein, the upper cassette portion 110 may be configured such that it may be assembled together with a lower cassette portion in order to define a collection media housing. In various embodiments, the upper cassette portion 110 may comprise one or more attachment features configured to facilitate the connection between the upper cassette portion 110 and the lower cassette portion. For example, the one or more attachment features may comprise one or more geometric features (e.g., protrusions ridges, indentions, and/or the like) configured to facilitate a semi-permanent engagement of the upper cassette portion 110 with the lower cassette portion. As illustrated in FIG. 11B, the one or more attachment features of the upper cassette portion 110 may comprise a geometric profile, such as, for example, an outer flange, extending around at least a portion of the perimeter of the upper cassette portion 110. In various embodiments, the one or more attachment features of the upper cassette portion 110 may correspond to at least one of the attachment features defined by the lower cassette portion so as to facilitate the assembly of the upper cassette portion 110 to the lower cassette portion in a secured configuration.

As illustrated in FIGS. 11A-11B, the upper cassette portion 110 may be configured to include the impactor nozzle 112 of a fluid composition sensor. For example, the impactor nozzle 112 may be positioned on a top portion of the upper cassette portion 110. In such a configuration, the impactor nozzle 112 may define the fluid inlet 111 of the upper cassette portion 110 through which the upper cassette portion 110 may be configured to receive a volume of fluid from, for example, a removable fluid flow component positioned upstream within the fluid composition sensor. For example, the fluid inlet 111 of the upper cassette portion 110 may be defined by the outlet of the impactor nozzle 112. In various embodiments, the impactor nozzle 112 may be further configured to direct the volume of fluid toward particle collection slide (e.g., a receiving face of a collection media arranged on the particle collection slide) disposed within the replaceable collection media assembly 100 such that at least a portion of the particles within the volume of fluid received by the upper cassette portion 110 become embedded within the collection media. The impactor nozzle 112 may extend from a top portion of the upper cassette portion 110 into the interior portion of the upper cassette portion 110 such that when the upper cassette portion 110 is attached to a lower cassette portion with a particle collection slide disposed therebetween, the fluid inlet 111 of the upper cassette portion (e.g., the impactor nozzle outlet) is positioned at a predetermined distance away from the particle collection slide (e.g., a receiving face of a collection media disposed on the particle collection slide) in order to optimize a particle collection function of sensor, as described herein.

Figure 12A:
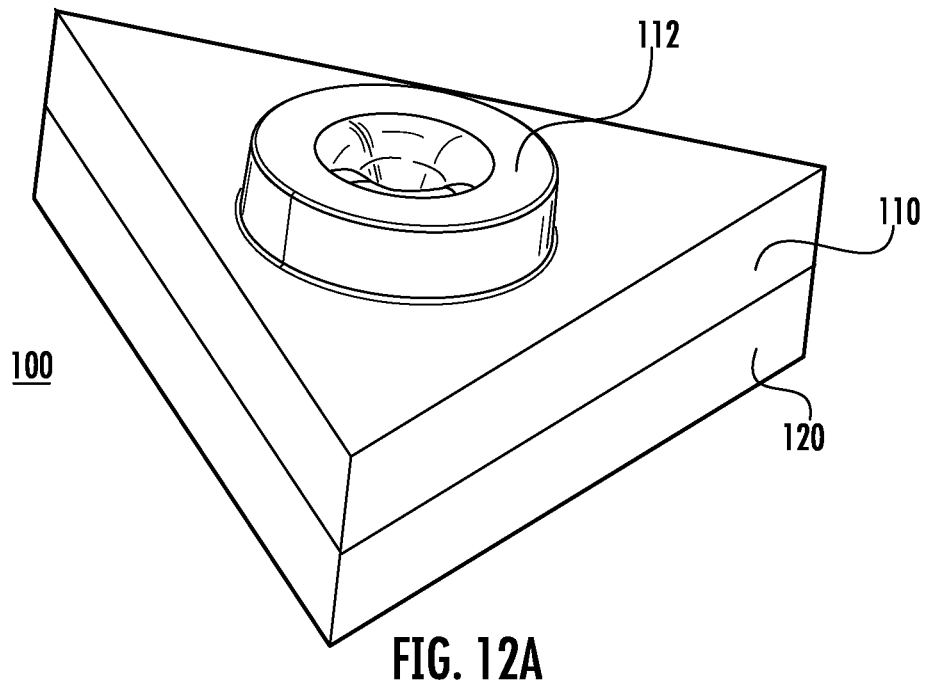
FIGS. 12A-12B illustrate perspective views of exemplary replaceable collection media assemblies in accordance with various embodiments described herein.
Figure 12B:
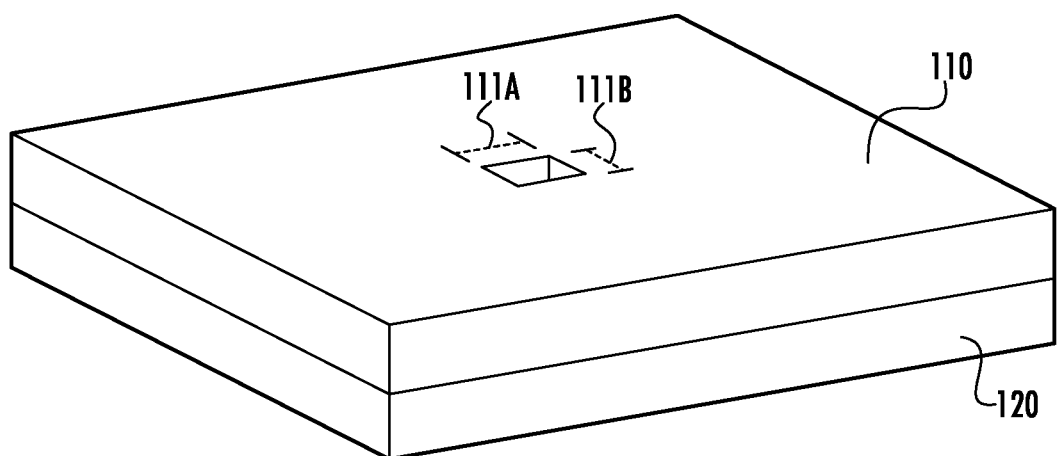

FIGS. 12A-12B illustrate perspective views of various exemplary replaceable collection media assemblies in accordance with various embodiments described herein. In particular, FIGS. 12A-12B illustrate replaceable collection media assemblies 100 embodied as replaceable cassettes comprising various configurations. In various embodiments, a replaceable collection media assembly 100 may be configured to facilitate the insertion of a collection media disposed within a collection media housing into a fluid composition sensor in a particular arrangement relative to an imaging device and/or an impactor nozzle 112 in order to facilitate the particle collection and particle analysis functions of the sensor, as described herein. Accordingly, in various embodiments, the replaceable collection media assembly 100 may be configured based at least in part on one or more components disposed within the fluid composition sensor with which the replaceable collection media assembly 100 may interact.

For example, as described herein, the replaceable collection media assembly 100 may be configured to enable the insertion thereof into a collection media assembly dock element and facilitate the repeatability of the proper alignment thereof within the fluid construction sensor. For example, the replaceable collection media assembly 100 may comprise one or more alignment features configured to engage one or more other components within the sensor so as to facilitate the linear alignment and/or the angular alignment of the replaceable collection media assembly 100 relative to the collection media assembly dock element. As illustrated in FIGS. 12A and 12B, for example, the replaceable collection media assembly 100 may define an asymmetric (e.g., non-circular) perimeter, such as, for example, a triangular or rectangular perimeter, respectively. In such a configuration, and wherein the collection media assembly dock element disposed within the fluid composition sensor comprises a substantially similar shape, the replaceable collection media assembly 100 may only fit into the collection media assembly dock element in an angular configuration that ensures proper alignment of the replaceable collection media assembly 100 (e.g., the collection media within the replaceable collection media assembly) within the sensor, as described in further detail herein.

Further, in various embodiments wherein an impactor nozzle 112 of the fluid composition sensor is included as a distinct component of the sensor or as a part of, for example, a removable fluid flow component disposed within the sensor, the replaceable collection media assembly 100 may be configured without an impactor nozzle. In such a circumstance, as illustrated in FIG. 12B, the fluid inlet 111 of the replaceable collection media assembly 100 may be defined by the upper cassette portion 110. The fluid inlet 111 may be configured such that the volume of fluid passes therethrough in a fluid flow direction at least substantially perpendicular to the collection media. In such an exemplary circumstance, the upper cassette portion 110 may be configured such that when the upper cassette portion 110 and the lower cassette portion 120 are attached to one another with a particle collection slide disposed therebetween, the fluid inlet 111 of the upper cassette portion 110 is positioned at a predetermined distance away from the particle collection slide (e.g., a receiving face of a collection media disposed on the particle collection slide). The fluid inlet 111 may be defined at least in part by the dimensions 111A and 111B so as direct the volume of fluid toward an area on a receiving face of a collection media that is entirely within a field of view of an imaging device, as described herein. For example, dimensions 111A, 111B may be configured based at least in part on an aspect ratio of the imaging device.

Figure 13:
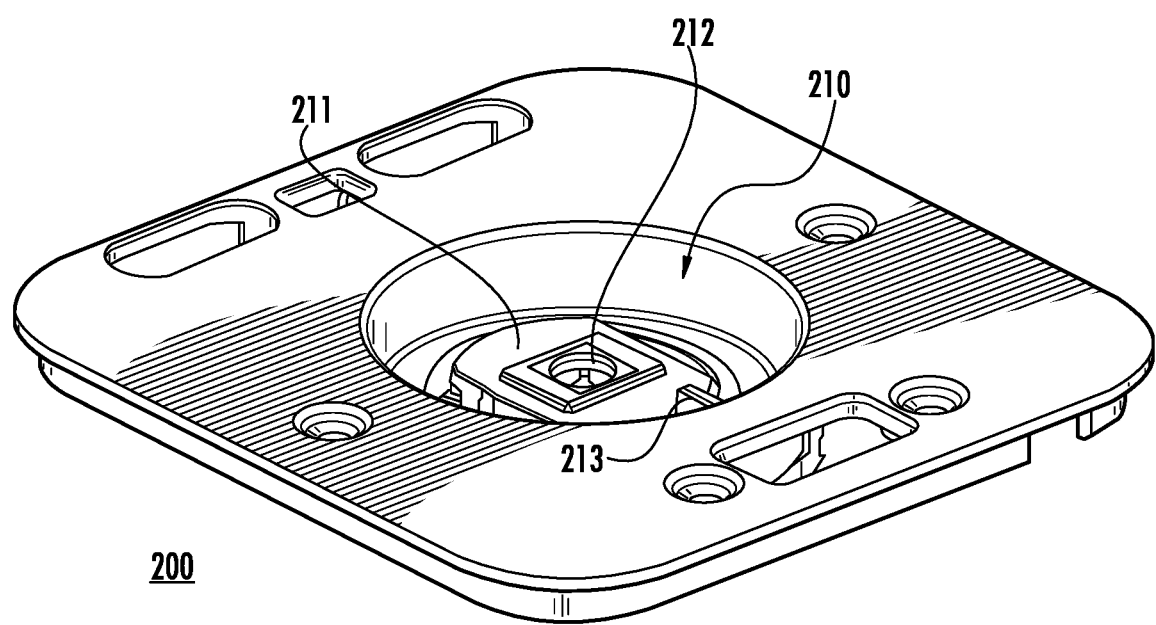
FIG. 13 illustrates a perspective view of an exemplary collection media assembly dock element in accordance with various embodiments described herein.

FIG. 13 illustrates a perspective view of an exemplary collection media assembly dock element in accordance with various embodiments described herein. In various embodiments, a collection media assembly dock element 200 may be configured to receive a replaceable collection media assembly and secure the collection media assembly in a preferred alignment within internal sensor portion of a fluid composition sensor. As illustrated in FIG. 13, the collection media assembly dock element 200 may be embodied as a tray comprising a collection media assembly receptacle 210 designed to include one or more geometric features corresponding to the physical configuration of a replaceable collection media assembly such that the replaceable collection media assembly may be inserted therein and secured in a desired position relative one or more other components of the sensor. In various embodiments, the collection media assembly dock element 200 may be configured such that an imaging device may be operatively attached (e.g., via a printed circuit board) to a bottom surface thereof. For example, an imaging device operatively attached to the collection media assembly dock element 200 may be positioned directly adjacent an imaging orifice 212 extending through the collection media assembly dock element 200 such that the imaging device may have an unimpeded line of sight through the collection media assembly dock element 200. In such a configuration, the collection media assembly dock element 200 (e.g., the imaging orifice 212) facilitates the particle analysis functionality of the fluid composition sensor, as described herein, by enabling an imaging device to capture an image of a replaceable collection media assembly 100 while the replaceable collection media assembly 100 remains secured within the collection media assembly dock element 200.

In various embodiments, one or more portions of the collection media assembly receptacle 210, such as, for example, one or more of the collection media assembly receptacle sidewalls, a peripheral alignment protrusion 213, and/or a bottom alignment protrusion 211, may engage a replaceable collection media assembly disposed therein so as to prevent the replaceable collection media assembly from moving in the x-y plane relative to the collection media assembly dock element 200. For example, the bottom alignment protrusion 211 may be configured to extend upward into a collection media assembly receptacle 210 from a bottom interior surface thereof. In such a configuration, wherein a replaceable collection media assembly 100 is positioned within the collection media assembly receptacle 210, the bottom alignment protrusion 211 may be configured to protrude into an interior cavity of the lower cassette portion of the removable collection media assembly so as to engage one or more of a bottom surface, a sidewall, and a geometric protrusion thereof in order to stabilize the position of the replaceable collection media assembly within the collection media assembly receptacle.

Further, as described herein, the collection media assembly dock element 200 may comprise one or more alignment features positioned at least substantially adjacent the collection media assembly receptacle 210 and configured to engage a corresponding feature of a replaceable collection media assembly disposed within the receptacle 210. The one or more alignment features may facilitate the angular alignment of a replaceable collection media assembly and to prevent the replaceable collection media assembly from moving, for example, in an angular direction relative to the collection media assembly dock element 200. In various embodiments, as described herein, the collection media assembly dock element 200 may be configured within a fluid composition sensor such that a replaceable collection media assembly inserted therein may be prevented from moving relative to the collection media assembly dock element 200 in each of the x-direction, the y-direction, the z-direction, and the angular direction.

Figure 14A:
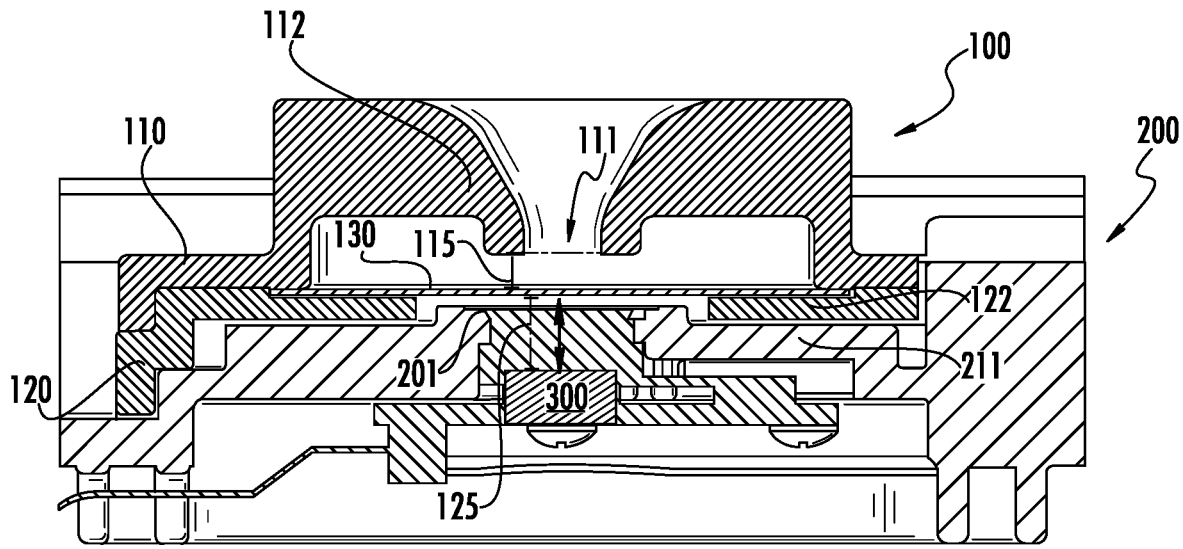
FIGS. 14A-14B illustrate cross-sectional views of an exemplary apparatus in accordance with one embodiment described herein.
Figure 14B:
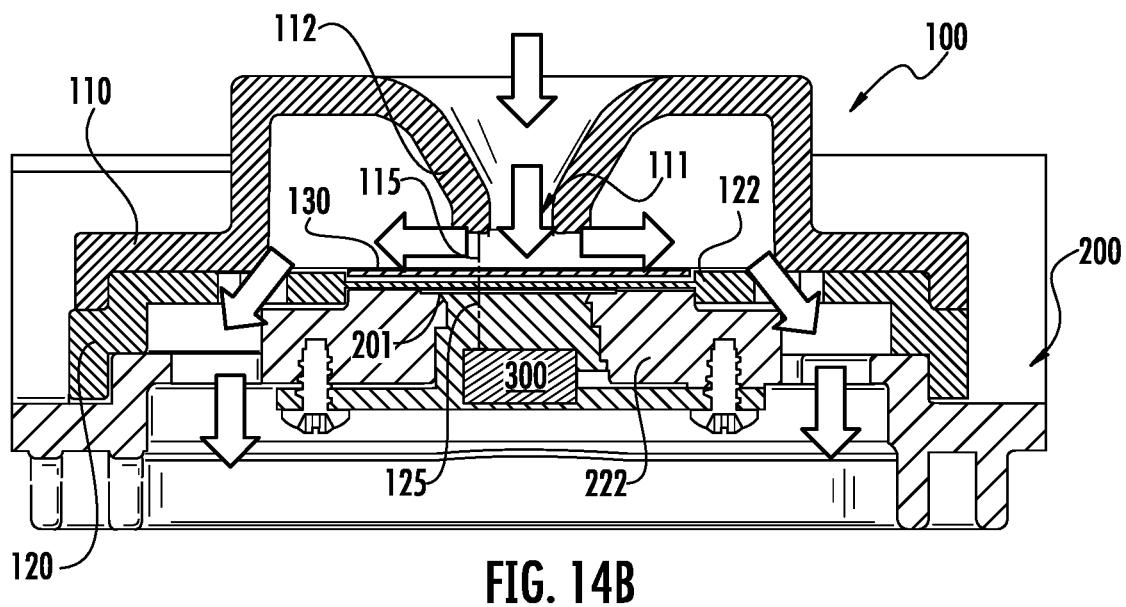

FIGS. 14A-15B illustrate various views of various sensor components of an exemplary sensor in accordance with various embodiments described herein. In particular, FIG. 14A and FIG. 14B illustrate various cross-sectional views of an exemplary replaceable collection media assembly 100 disposed within a collection media assembly dock element 200, wherein the replaceable collection media assembly 100 comprises an impactor nozzle 112. As described herein, the replaceable collection media assembly 100 of a fluid composition sensor may be embodied as, for example, a replaceable cassette comprising an upper cassette portion 110, a lower cassette portion 120, and a particle collection slide 130. The upper cassette portion 110 and the lower cassette portion 120 may collectively define a collection media housing configured secure the particle collection slide 130 (e.g., the collection media) relative to each of the two cassette portions 110, 120. As described herein, the upper cassette portion 110 may be configured to receive a volume of fluid, for example, through an impactor nozzle 112 (e.g., via a nozzle inlet) positioned at a top portion thereof. The impactor nozzle 112 may be configured to direct the volume of fluid toward a receiving area of the collection media disposed upon the particle collection slide 130 in a fluid flow direction at least substantially perpendicular to the collection media. The volume of fluid may travel from the outlet 111 of the impactor nozzle 112 and pass across at least a portion of a surface the collection media 131 such that at least a portion of the plurality of particles within the volume of fluid become disposed within the collection media. As shown, upon passing over the particle collection slide, the volume of fluid may continue to flow along a fluid flow path through one or more openings defined by the lower cassette portion 120 located on either side of the particle collection slide 130.

As illustrated, the imaging device 300 of the fluid composition sensor may be operatively attached (e.g., via a printed circuit board) to the collection media assembly dock element 200. The imaging device 300 may be positioned directly adjacent and/or at least partially within an imaging orifice extending through the collection media assembly dock element 200 such that the imaging device 300 may have an unimpeded line of sight to the particle collection slide 130. Such a configuration may enable the imaging device 300 to capture an image of the plurality of particles embedded within a receiving area of the particle collection slide 130 (e.g., the collection media) while the replaceable collection media assembly 100 remains secured within the collection media assembly dock element 200. In various embodiments, a portion of the collection media assembly dock element 200 (e.g., the bottom alignment protrusion 211) may extend upward into an interior cavity of a replaceable collection media assembly 100 secured thereto. For example, the collection media assembly dock element 200 may be configured such that at least a portion of the imaging device 300 secured thereto may be disposed within in the interior cavity of the replaceable collection media assembly 100.

In various embodiments, at least a portion of the collection media assembly dock element 200 may engage one or more of a bottom surface, a sidewall, and a geometric feature of the replaceable collection media assembly 100 in order to stabilize the position of the replaceable collection media assembly 100 relative to the collection media assembly dock element 200 and/or the imaging device 300 attached thereto. For example, the replaceable collection media 100 may be secured within the collection media assembly dock element 200 such that the particle collection slide 130 is arranged within the fluid composition sensor at an internal particle imaging distance 125 away from the imaging device 300. The internal particle imaging distance 125 may be such that the receiving area of a collection media disposed upon the particle collection slide may be located within the field of view of the imaging device 300. For example, in various embodiments, the internal particle imaging distance may be at least approximately between about 100 microns and about 5 mm (e.g., 1 mm). As described herein, the internal particle imaging distance 125 may be selectively designated in order to optimize the imaging capability of the imaging device 300 with respect to the plurality of particles embedded within the collection media, so as to facilitate the particle analysis function of the fluid composition sensor.

As illustrated, the particle collection slide 130 may be configured to receive a plurality of particles from an exemplary volume of fluid dispensed from the outlet of the impactor nozzle 112 (e.g., the fluid inlet 111) at a receiving area of the collection media disposed thereon. As described herein, the receiving area of the collection media may correspond to the configuration of the outlet of the impactor nozzle 112 from which the exemplary volume of fluid is dispensed prior to impacting the collection media. For example, the receiving area of the collection media may be defined at least in part by an outer perimeter with a shape corresponding to that of the outlet of the impactor nozzle 112. Further, in various embodiments, the size of the receiving area and/or the percentage of particles within the volume of fluid that impact the collection media may correspond at least in part to the interior particle imaging distance 115, defined by the distance between the outlet of the impactor nozzle and the collection media. In various embodiments, the internal particle collection distance 115 may be configured so as to maximize the percentage of particles from volume of fluid that become embedded within the collection media. The internal particle collection distance 115 may be set such that the entirety of the receiving area of the collection media disposed upon the particle collection slide 130 may be located within the field of view of the imaging device 300. As described herein, the internal particle collection distance 115 may be selectively designated in order to optimize the particle collection function of the fluid composition sensor. In various embodiments, the fluid composition sensor 10 may be configured to facilitate the convergence of the field of view of the imaging device 300 and the receiving area of the collection media. For example, in various embodiments, a central axis of the impactor nozzle 112 (e.g., a fluid inlet 111) may be at least substantially aligned with the field of view of the imaging device 300. Further, the outlet of the impactor nozzle 112 may be configured so as to comprise a shape that is at least substantially similar to the field of view of the imaging device 300. For example, in an exemplary circumstance wherein the field of view is defined by an aspect ratio of 3:4, the outlet of the impactor nozzle 112 may comprise a rectangular cross-section with a height-to-width ratio of 3:4, and having an overall size corresponding to the configuration of the imaging device 300.

Figure 15A:
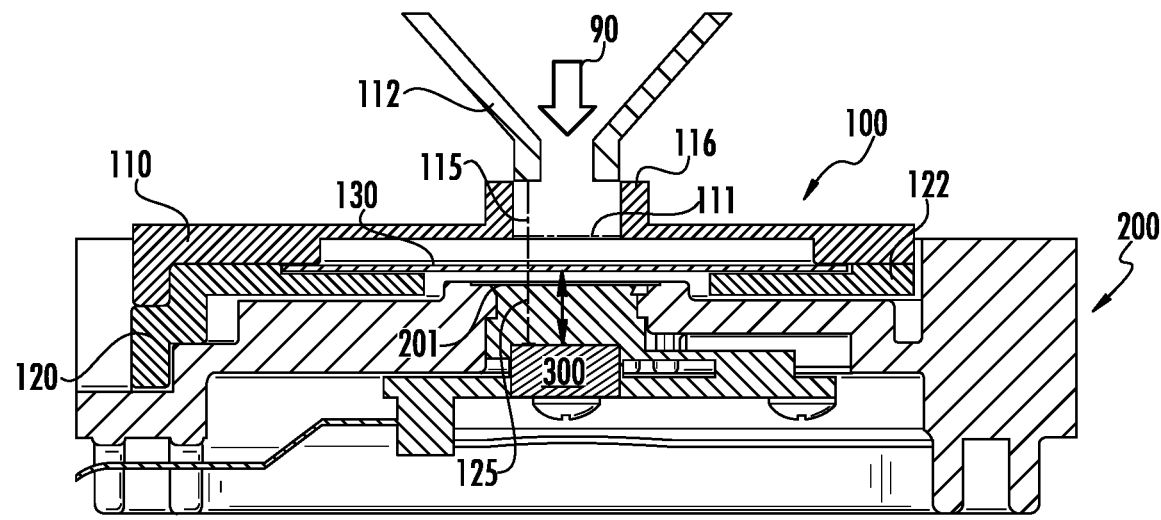
FIGS. 15A-15B illustrate cross-sectional views of an exemplary apparatus in accordance with one embodiment described herein.
Figure 15B:
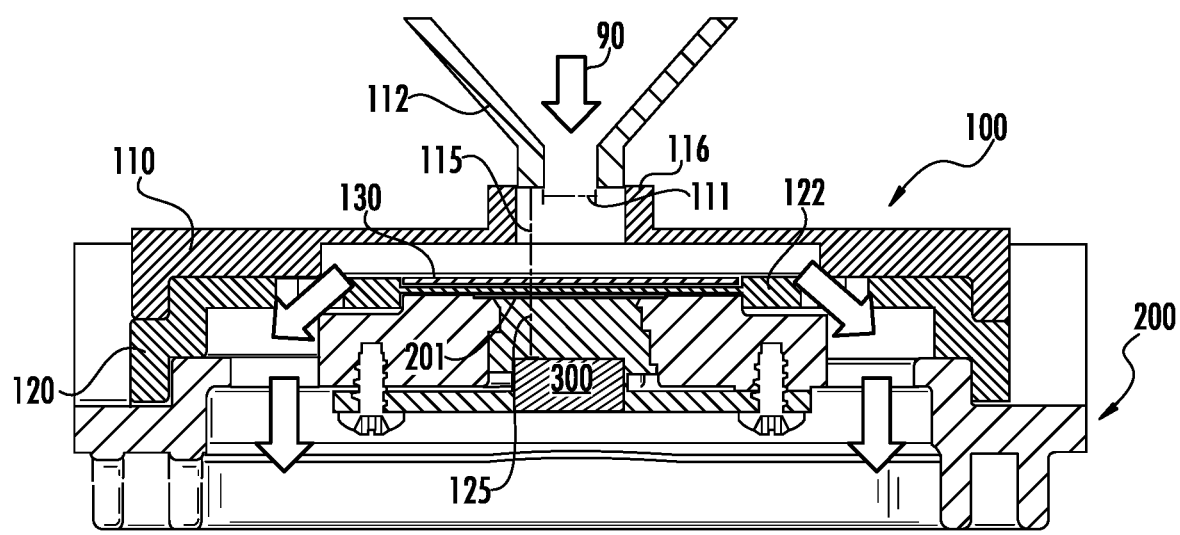

FIGS. 15A and 15B illustrate various side sectional views of an exemplary replaceable collection media assembly 100 disposed within a collection media assembly dock element 200, wherein the replaceable collection media assembly 100 does not comprise an impactor nozzle 112. In such a configuration, the fluid inlet 111 of the replaceable collection media assembly 110 may be defined by an upper cassette portion 110. As illustrated, the fluid inlet 111 of the replaceable collection media assembly 100 may be configured to receive a sample volume of fluid from an outlet of the impactor nozzle, which may be embodied as a distinct component of the sensor or may be attached to one of the other components defining at least a portion of the fluid flow path 90 within the sensor. For example, the upper cassette portion may comprise an impactor nozzle alignment element 116 configured to engage the outlet of the impactor nozzle 112 so as to minimize the risk of a portion of the volume of air being lost between the impactor nozzle 112 and the fluid inlet 111.

The fluid inlet 111 may be configured such that the volume of fluid passes therethrough in a fluid flow direction at least substantially perpendicular to the collection media. As described herein, the volume of fluid may travel from the fluid inlet 111 and pass across at least a portion of a surface the collection media disposed upon the particle collection slide 130 such that at least a portion of the plurality of particles within the volume of fluid become disposed within the collection media. Upon passing over the particle collection slide 130, the volume of fluid may continue to flow along a fluid flow path 90 through one or more openings defined by the lower cassette portion 120 located on either side of the particle collection slide 130.

As illustrated, the particle collection slide 130 may be configured to receive a plurality of particles from an exemplary volume of fluid dispensed from the fluid inlet 111 at a receiving area of the collection media disposed thereon. As described herein, the receiving area of the collection media may correspond to the configuration of the fluid inlet 111 from which the exemplary volume of fluid is dispensed prior to impacting the collection media. For example, the receiving area of the collection media may be defined at least in part by an outer perimeter with a shape corresponding to that of the fluid inlet 111. Further, in various embodiments, the size of the receiving area and/or the percentage of particles within the volume of fluid that impact the collection media may correspond at least in part to the interior particle imaging distance 115, defined by the distance between the fluid inlet 111 and the collection media. In various embodiments, the internal particle collection distance 115, as described herein, may be configured so as to maximize the percentage of particles from volume of fluid that become embedded within the collection media. As described above, the fluid composition sensor may be configured to facilitate the convergence of the field of view of the imaging device 300 and the receiving area of the collection media. For example, in various embodiments, a central axis of the fluid inlet 111 may be at least substantially aligned with the field of view of the imaging device 300. Further, the fluid inlet 111 may be configured so as to comprise a shape that is at least substantially similar to the field of view of the imaging device 300. For example, in an exemplary circumstance wherein the field of view is defined by an aspect ratio of 3:4, the fluid inlet 111 may comprise a rectangular cross-section with a height-to-width ratio of 3:4, corresponding to the configuration of the imaging device 300.

Figure 16:
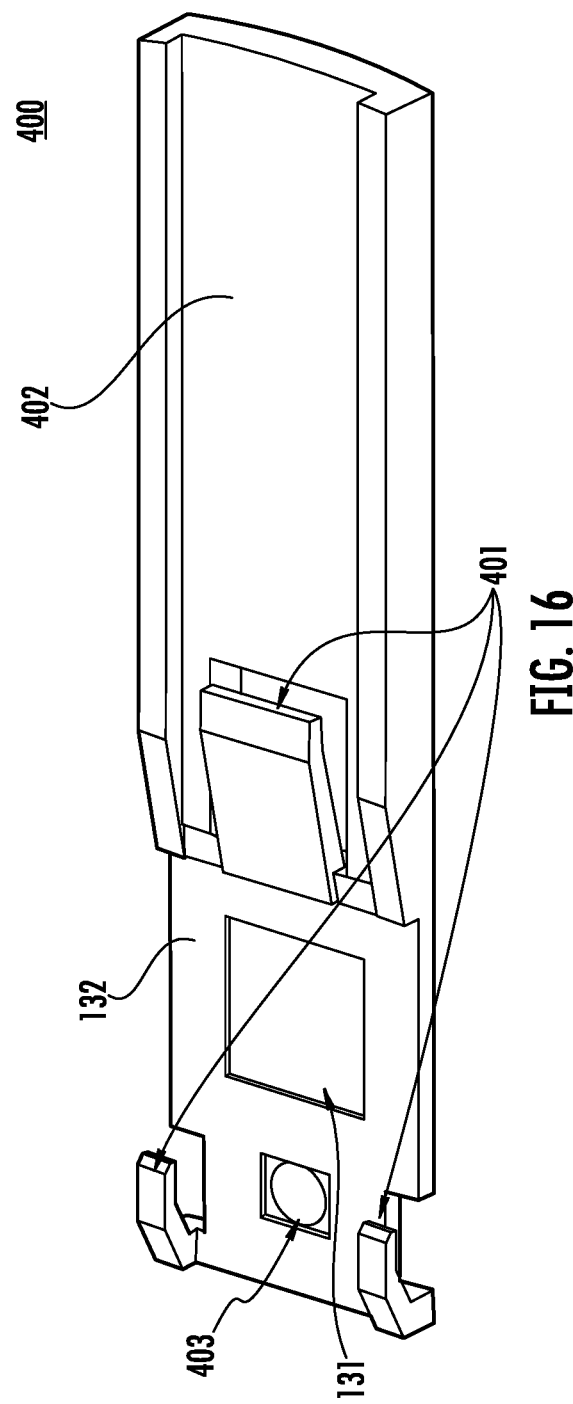
FIG. 16 illustrates a perspective view of an exemplary replaceable collection media assembly in accordance with various embodiments described herein.

FIG. 16 illustrates a perspective view of an exemplary replaceable collection media assembly in accordance with various embodiments described herein. In particular, FIG. 16 illustrates a replaceable collection media assembly 400, wherein the replaceable collection media assembly 400 is embodied as a disposable slide. In various embodiments, the disposable slide 400 may comprise a transparent substrate 132 having a collection media 131 on at least a portion of an upper surface thereof. As described herein, the collection media 131 may be configured to receive one or more particles of a plurality of particles via interaction with a volume of fluid traveling through a fluid composition sensor along a fluid flow path. In various embodiments, the disposable slide may further comprise a slide frame element 402 configured to support the transparent substrate 132 and the collection media 131 attached thereto. In various embodiments, at least a portion of the slide frame element 402 may be embodied as a handle configured to facilitate user interaction with the disposable slide so as to enable the removal and/or replacement of the collection media 131 from the fluid composition sensor 10. In various embodiments, the disposable slide may comprise at least two distinct and separable components. For example, in various embodiments the slide frame element 402 may be selectively detachable from the transparent substrate 132.

In various embodiments, the disposable slide may further comprise one or more compression elements 401. For example, the one or more compression elements 401 may comprise protrusions extending from the slide frame element that are configured to engage a portion of the fluid composition sensor upon the disposable slide 400 being inserted into the internal sensor portion of the sensor, as described herein. In various embodiments, upon being inserted into the internal sensor portion of the sensor, the one or more compression elements 401 may be embodied as, for example, springs molded into the slide frame element 402 that are configured so as to apply a pressing force against at least an adjacent portion of the sensor. Alternatively, or additionally, the one or more compression elements may comprise protrusions and/or surfaces disposed about the disposable slide 400 that may be configured to receive a compression force from a corresponding spring element disposed within the fluid composition sensor. The one or more compression elements 401 may facilitate the stabilization of the disposable handle 400 within an internal sensor portion of the fluid composition sensor by constraining the movement of the disposable slide 400 in a vertical direction. In various embodiments, the disposable slide 400 may further comprise a latch. For example, in various embodiments, the latch may be defined by one of the compression elements. The latch may be configured to, upon the insertion of the disposable slide 400 into the fluid composition sensor, engage an adjacent interior portion of the sensor so as to prevent the disposable slide 400 from being removed from the sensor. The latch may be configured such that, upon being pulled by a user in a removal direction, the latch may engage the adjacent internal sensor portion so as to constrain further movement of the disposable slide 400 relative to the fluid composition sensor in the removal direction.

In various embodiments, the disposable slide 400 may further comprise one or more identification elements configured to uniquely identify the particular disposable slide 400 corresponding thereto. The identification element 403 may comprise, for example, a bar code, QR code, serial number, and/or the like. In various embodiments, the identification element 403 may be disposed upon and/or within the transparent substrate 132 of the disposable slide 400. In such a configuration, the identification element 403 may be positioned about the disposable slide 400 such that the identification element 403 may be captured and/or identified by an imaging device disposed either within or external to the fluid composition sensor, as described herein. Further, in various embodiments, a controller of the fluid composition sensor, as described herein, may be used in combination with the aforementioned imaging device to facilitate the identification and/or processing of the disposable slide 400 based at least in part on the identification element 403.

Figure 17:
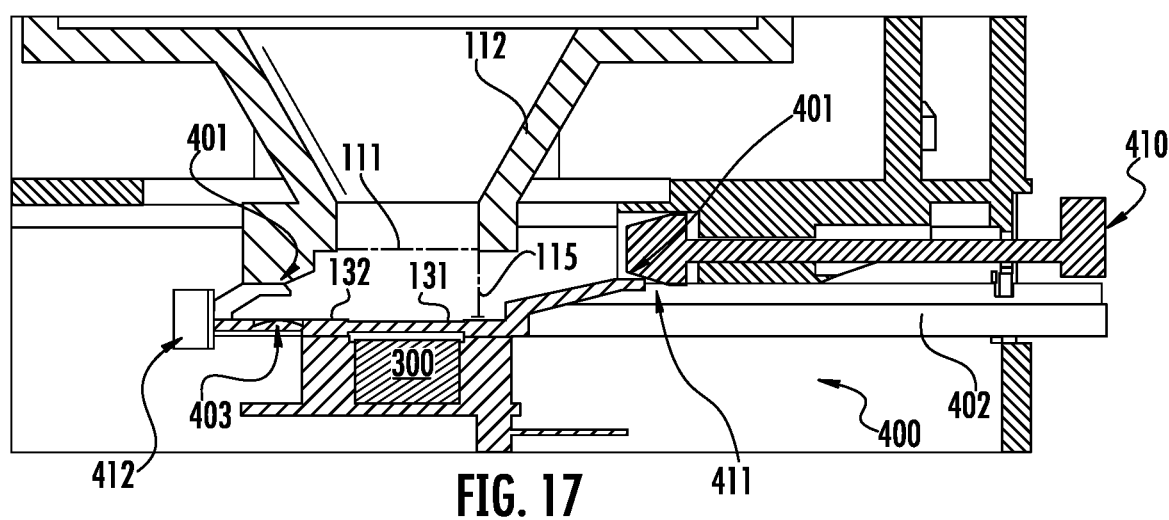
FIG. 17 illustrates a cross-sectional view of an exemplary apparatus in accordance with one embodiment described herein.

FIG. 17 illustrates a cross-sectional view of an exemplary fluid composition according to various embodiments described herein. In particular, FIG. 17 illustrates an exemplary replaceable collection media assembly 100 disposed within a fluid composition sensor, wherein the replaceable collection media assembly 100 is embodied as a disposable slide 400. As described herein, the fluid composition sensor may be configured to receive a disposable slide 400 having a collection media 131 attached thereto through an opening in the sensor housing. The fluid composition sensor may position the slide 400 at least partially within an internal sensor portion, such that the collection media 131 is disposed within a fluid flow path defined by a sample volume of fluid traveling through the sensor. Disposable slide 400 may be arranged within the fluid composition sensor such that at least a portion of the collection media 131 disposed upon the transparent substrate 132 may be at least substantially aligned with both an outlet 111 of the impactor nozzle 112 and an imaging device 300, as described herein. In such a configuration, the collection media 131 may define a receiving area configured to receive a plurality of particles from the sample volume of fluid. For example, the receiving area of the collection media 131 may be positioned within the field of view of the imaging device 300.

As illustrated, the fluid composition sensor may be configured such that when the disposable slide 400 is positioned within the internal portion of the sensor in a particle collection position, the compression elements 401 of the disposable slide 400 may engage a corresponding adjacent portion of one or more sensor components disposed within the sensor. For example, the compression elements 401 may be predisposed to apply an at least substantially vertical pressing force to the corresponding adjacent sensor portion such that the disposable slide 400 may receive a reciprocal force from the adjacent sensor portion. In various embodiments, the reciprocal forces realized by the disposable slide 400 in the opposite vertical direction may be such that the slide 400 may be pressed against one or more vertically constrained surfaces within the sensor. As such, the reciprocal forces exerted on the disposable slide 400—and provoked by the one or more compression elements 401—may function to stabilize the disposable slide 400 within the sensor in the vertical direction. As illustrated, for example, the reciprocal forces acting on the disposable slide 400 may cause at least a portion of the slide 400, such as, for example, a portion of the transparent substrate 132 at least substantially adjacent the receiving area of the collection media 131, to be pressed against the imaging device 300 and/or a protective housing having the imaging device 300 disposed therein. In such a configuration, the engagement of the slide 400 to the imaging device 300 may create a seal along the interface between the slide 400 and the imaging device 300 that may function to protect the imaging device 300 from contamination, as described herein. Further, the securing of the slide relative to the imaging device 300 may enable the fluid composition sensor to control the internal particle imaging distance between the imaging device 300 and the transparent substrate, so as to optimize the imaging capability of the imaging device 300 with respect to the plurality of particles embedded within the collection media 131. Similarly, the slide 400 relative to the imaging device 300 may enable the fluid composition sensor to control the internal particle collection distance 115 between the collection media 131 and the outlet of the impactor nozzle 112, so as to optimize the particle collection functionality of the sensor, as described herein.

In various embodiments, the fluid composition sensor may further comprise a slide ejection button 410 configured to facilitate the removal of the disposable slide 400 from the housing of the sensor. As described herein, the latch 411 of the disposable slide 400 may be configured to engage the slide ejection button 410 so as to prevent the disposable slide 400 from being removed from the sensor. As illustrated, the latch 411 is defined by one of the compression elements 401. The latch 411 may be configured such that, upon being pulled by a user in a removal direction (e.g., a substantially horizontal direction), the latch 411 may engage the slide ejector button 410 so as to prevent the disposable slide 400 from further moving relative to the fluid composition sensor in the removal direction. For example, wherein the latch 411 is defined by one of the compression elements 401, the latch 411 may engage the slide ejection button 410 in a substantially different direction (e.g., the x-direction) than the direction of the aforementioned compression force configured to at least partially secure the slide 400 in a vertical direction (e.g., the y-direction). The fluid composition sensor may be configured such that, upon receiving user input (e.g., a pushing force) at the slide ejection button 410, a portion of the slide ejection button 410 may move within the sensor causing the latch 411 to become disengaged therewith, thereby enabling the movement of the disposable slide 400 relative to the fluid composition sensor in the removal direction. Further, in various embodiments, the fluid composition may further comprise an ejection spring configured to apply a pushing force against the disposable slide 400 in the removal direction when the slide is fully positioned in the particle collection position, as described above. In the exemplary circumstance wherein a latch 411 of the slide 400 becomes disengaged with an adjacent portion of the slide ejector button 410, the ejection spring 412 may press against the slide 400 so as to at least partially remove the slide 400 from the internal portion of the sensor.

Controller

Figure 18:
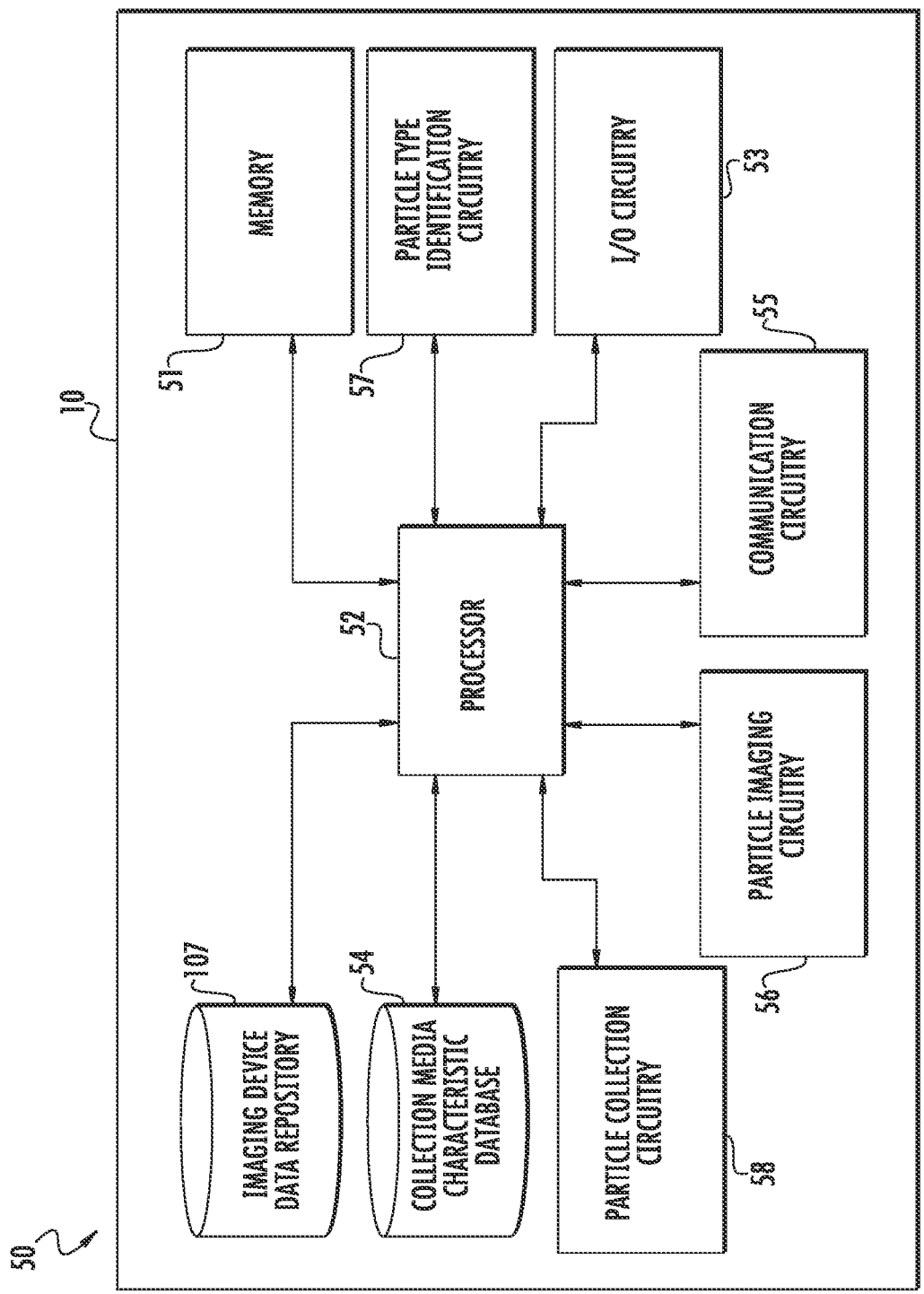
FIG. 18 schematically illustrates an exemplary apparatus for implementing various embodiments of the present disclosure.

As shown in FIG. 18, the fluid composition sensor 10 may comprise a controller 50 configured to control the various operations associated with the particle collection function of a fluid composition sensor 10, as well as the imaging and analysis of the particles collected by the sensor to determine at least one particle characteristic of a volume of fluid received by sensor 10. As illustrated in FIG. 18, the controller 50 may comprise a memory 51, a processor 52, input/output circuitry 53, communication circuitry 55, an imaging device data repository 107, a collection media characteristic database 54, particle imaging circuitry 56, particle type identification circuitry 57, and particle collection circuitry 58. The controller 50 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the controller 50 should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the controller 50 may provide or supplement the functionality of particular circuitry. For example, the processor 52 may provide processing functionality, the memory 51 may provide storage functionality, the communications circuitry 55 may provide network interface functionality, and the like.

In some embodiments, the processor 52 (and/or co-processor or any other processing circuitry assisting or otherwise associated with the processor) may be in communication with the memory 51 via a bus for passing information among components of the apparatus. The memory 51 may be non-transitory and may include, for example, one or more volatile and/or non-volatile memories. For example, the memory 51 may be an electronic storage device (e.g., a computer readable storage medium). In various embodiments, the memory 51 may be configured to store information, data, content, applications, instructions, or the like, for enabling the apparatus to carry out various functions in accordance with example embodiments of the present disclosure. It will be understood that the memory 51 may be configured to store partially or wholly any electronic information, data, data structures, embodiments, examples, figures, processes, operations, techniques, algorithms, instructions, systems, apparatuses, methods, look-up tables, or computer program products described herein, or any combination thereof. As a non-limiting example, the memory 51 may be configured to store particle size data, particle type data, particle impaction depth data, particle image data, particle shape data, particle cross-sectional area data, particle mass data, particle density data, and particulate matter mass concentration data associated with a volume of fluid. In various embodiments, the memory may be further configured to store one or more particle impaction depth-momentum look-up tables.

The processor 52 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 52 may be configured to execute instructions stored in the memory 51 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the controller 50 may include input-output circuitry 53 that may, in turn, be in communication with the processor 52 to provide output to the user and, in some embodiments, to receive input such as a command provided by the user. The input-output circuitry 53 may comprise a user interface, such as a graphical user interface (GUI), and may include a display that may include a web user interface, a GUI application, a mobile application, a client device, or any other suitable hardware or software. In some embodiments, the input-output circuitry 53 may also include a display device, a display screen, user input elements, such as a touch screen, touch areas, soft keys, a keyboard, a mouse, a microphone, a speaker (e.g., a buzzer), a light emitting device (e.g., a red light emitting diode (LED), a green LED, a blue LED, a white LED, an infrared (IR) LED, an ultraviolet (UV) LED, or a combination thereof), or other input-output mechanisms. The processor 52, input-output circuitry 53 (which may utilize the processing circuitry), or both may be configured to control one or more functions of one or more user interface elements through computer-executable program code instructions (e.g., software, firmware) stored in a non-transitory computer-readable storage medium (e.g., memory 51). Input-output circuitry 53 is optional and, in some embodiments, the controller 50 may not include input-output circuitry. For example, where the controller 50 does not interact directly with the user, the controller 50 may generate user interface data for display by one or more other devices with which one or more users directly interact and transmit the generated user interface data to one or more of those devices. For example, the controller 50, using user interface circuitry may generate user interface data for display by one or more display devices and transmit the generated user interface data to those display devices.

The communications circuitry 55 may be a device or circuitry embodied in either hardware or a combination of hardware and software that is configured to receive and/or transmit data from/to a network and/or any other device, circuitry, or module in communication with the controller 50. For example, the communications circuitry 55 may be configured to communicate with one or more computing devices via wired (e.g., USB) or wireless (e.g., Bluetooth, Wi-Fi, cellular, and/or the like) communication protocols.

In various embodiments, the processor 52 may be configured to communicate with the particle imaging circuitry 56. The particle imaging circuitry 56 may be a device or circuitry embodied in either hardware or a combination of hardware and software that is configured to receive, process, generate, and/or transmit data, such as an image captured by the imaging device 300. In various embodiments, the particle imaging circuitry 56 may be configured to analyze one or more images captured by the imaging device 300 of the fluid composition sensor 10 to determine which particles of the plurality of particles present within the collection media 131 were newly received by the collection media 131 during a recent particle analysis. The particle imaging circuitry 56 may receive from the imaging device a first captured particle image and a second captured particle image, captured at a first time and a second time, respectively, wherein the first time represents the start of an analysis of the one or more particles of the plurality of particles captured by the collection media 131 by the fluid composition sensor 10 and the second time is subsequent the first time (occurs after the first time). In such a configuration, the device may be configured to distinguish between particles present within the collection media 131 at the start of the particle analysis and particles that were newly received by the collection media 131 by comparing the respective particle images captured at the first and second times and identifying any particles from the second captured particle image that were not captured in the first captured particle image. In various embodiments, the particle imaging circuitry 56 may be further configured to analyze one or more images captured by the imaging device 300 of the fluid composition sensor 10 to determine the size of each of the one or more particles of the plurality of particles within the collection media 131. In various embodiments, the size of a particle may be defined by the cross-sectional area of the particle. In various embodiments, the particle imaging circuitry 56 may be configured to determine the particle size of particles with any of a variety of particle sizes. As an example, the particle imaging circuitry 56 may be configured to determine particle sizes of particles having a diameter of between about 0.3 and about 100 microns (e.g., 2.5 microns), and thus, a size category with which the particle may be associated, such as, for example, PM10, PM4, PM2.5, or PM1. In various embodiments, the controller and/or the particle imaging circuitry 56 may be further configured to analyze one or more images captured by the imaging device 300 of the fluid composition sensor 10 to determine the shape of each of the one or more particles of the plurality of particles within the collection media 131. In various embodiments, a particle shape may be defined at least in part by a particle cross-sectional area. The particle imaging circuitry 56 may be further configured to determine the particle impaction depth of each of the one or more particles of the plurality of particles within the collection media 131 using one or more image focusing techniques. The particle imaging circuitry 56 may be configured to execute instructions stored, for example, in the memory 51 for carrying out the one or more image focusing techniques. In various embodiments, the one or more image focusing techniques may comprise one or computational techniques, such as, for example, Angular Spectrum Propagation (ASP). In other embodiments, opto-mechanical adjustment may be used as an image focusing technique. In various embodiments, the particle imaging circuitry 56 may use the one or more image focusing techniques to determine a depth of focus 122 for each of the one or more particles of the plurality of particles within the collection media. Upon determining a depth of focus for each of the one or more particles, the particle imaging circuitry 56 may be configured to calculate, using known dimensions of the fluid composition sensor 10 such as, for example, the collection media thickness and the distance between the transparent substrate 108 and the imaging device 300, the impaction depth 121 of each of the one or more particles of the plurality of particles within the collection media 131. In various embodiments, for example, the impaction depth 121 of a particle within the collection media 131 may be calculated by subtracting the measured depth of focus 122 of a particle from the sum of the collection media thickness, the transparent substrate thickness, and the distance between the transparent substrate 108 and the imaging device 300. The particle imaging circuitry 56 may send and/or receive data from the imaging device data repository 107. In various embodiments, the particle imaging circuitry 56 may be configured to determine one or more particle characteristics of a particle using one or more machine learning techniques. In various embodiments, the one or more machine learning techniques used by the particle imaging circuitry 56 to determine the one or more particle characteristics of the particle may comprise using deep supervised learning with one or more labeled datasets of one or more known particle characteristics, such as, for example, particle type, particle velocity, particle size, particle shape, and/or any other data generated, transmitted, and/or received by the controller 50.

In various embodiments, the processor 52 may be configured to communicate with the particle type identification circuitry 57. The particle type identification circuitry 57 may be a device or circuitry embodied in either hardware or a combination of hardware and software that is configured to identify a particle type and/or particle species of one or more particles of the plurality of particles received by the collection media 131. In various embodiments, a plurality of particles within a volume of fluid may comprise one or more particles of various particle types, such as, for example, one or more of bacteria, pollen, spores, molds, biological particles, soot, inorganic particles, and organic particles. In various embodiments, the particle type identification circuitry 57 may determine the particle type and/or particle species of each of the one or more particles of the plurality of particles received by the collection media 131 using one or more machine learning techniques. In various embodiments, the one or more machine learning techniques used by the particle type identification circuitry 57 to determine the particle type and/or species of each of the one or more particles of the plurality of particles may comprise analyzing an image captured by the imaging device 300, particle size data, particle shape data, and/or any other data generated, transmitted, and/or received by the controller 50. In various embodiments, the particle type identification circuitry 57 may send and/or receive data from the imaging device data repository 107. In various embodiments, the particle type identification circuitry 57 may be configured to compare the determined particle initial velocity for a particle to the particle velocity approximated based at least in part on a known flow rate of fluid moving through the fluid composition sensor 10 and generate velocity comparison data associated with the particle. In various embodiments, the particle type identification circuitry 57 may be configured to execute a feedback loop, wherein one or more velocity comparison data associated with one or more particles of the plurality of particles received by the collection media 131 may define one or more inputs into a machine learning model in order to increase a rate of machine learning associated with the one or more machine learning techniques, as described herein.

In various embodiments, the fluid composition sensor 10 may be configured with, or in communication with, a collection media characteristic database 54. The collection media characteristic database 54 may be stored, at least partially on the memory 51 of the system. In some embodiments, the collection media characteristic database 54 may be remote from, but in connection with, the fluid composition sensor 10. The collection media characteristic database 54 may contain information, such as one or more particle impaction depth-momentum relationship look-up tables. In various embodiments, a particle impaction depth-momentum relationship look-up table may comprise a data matrix used to define a relationship between a particle impaction depth and a particle initial momentum (i.e. the momentum of a particle at a receiving surface of the collection media 131, wherein the particle is received by the collection media 131 at the receiving surface, as described herein) for a particular collection media type. Various particle impaction depth-momentum relationship look-up tables may comprise data matrices used to define a relationship between a particle impaction depth and a particle initial momentum for various collection media types.

The particle collection circuitry 58 may be a device or circuitry embodied in either hardware or a combination of hardware and software that is configured to control the particle collection functionality of the fluid composition sensor 10, as described herein. For example, the particle collection circuitry 58 may control a fan disposed within the fluid control sensor 10 in order to execute a fluid sample collection process by pulling a volume of fluid from an ambient environment into and through the fluid composition sensor 10. In various embodiments, the particle collection circuitry 58 may configure the fluid composition sensor between an open configuration and a closed configuration, as described herein. In various embodiments, the particle collection circuitry 58 may be configured to lock the fluid composition sensor 10 in a closed configuration during the fluid sample collection process. Further, the particle collection circuitry 58 may be configured to determine when the collection of the fluid sample is complete (e.g., after a predetermined amount of time, after a number of particles present within the collection media has surpassed a predetermined threshold number of particles, and/or after a percentage of particle coverage within a field of view has surpassed threshold particle coverage percentage). Upon such a determination, the particle collection circuitry 58 may be configured to selectively unlock the fluid composition sensor 10 and configure the sensor 10 in an open configuration. Further, in various embodiments, the particle collection circuitry 58 may facilitate the automated reconfiguration and/or replacement of one or more collection media assemblies, as described herein. In various embodiments, the particle collection circuitry 58 may communicate with the particle imaging circuitry 56 in order to facilitate the capturing of an image of an identification element disposed upon a replaceable collection media assembly and subsequent identification thereof. In various embodiments, the image of the identification element disposed upon the replaceable collection media assembly may be communicated to one or more components (e.g., internal sensor components and/or external system databases) to facilitate the identification of the particular replaceable collection media assembly 100 captured in the image.

In various embodiments, the fluid composition sensor 10 may be configured with, or in communication with, an imaging device data repository 107. The imaging device data repository 107 may be stored, at least partially on the memory 51 of the system. In some embodiments, the imaging device data repository 107 may be remote from, but in connection with, the fluid composition sensor 10. The imaging device data repository 107 may contain information, such as images relating to one or more potential components of fluids. In some embodiments, the imaging device data repository 107, and/or other similar reference databases in communication with the fluid composition sensor 10, may comprise non-image information used to identify particles (e.g., for florescent particles, a spectrometer may be used by the fluid composition sensor 10 as discussed herein and the fluid composition sensor 10 may receive spectrum information to identify and/or classify the particles). In some embodiments, the fluid composition sensor 10 may also use machine learning for identifying and/or classifying particles, such that the fluid composition sensor 10 may use a reference database, such as the imaging device data repository 107, to initially train the fluid composition sensor 10 and then may be configured to identify and/or classify particles without referencing the imaging device data repository 107 or other reference databases (e.g., a system may not be in active communication with the imaging device data repository 107 during regular operations).

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device for detecting fluid particle characteristics comprising:
    a fluid composition sensor configured to receive a volume of fluid, the fluid composition sensor comprising:
    a removable fluid flow component disposed within an internal sensor portion and configured to define at least a portion of a fluid flow path;
    a collection media assembly dock element configured to receive a replaceable collection media assembly comprising a collection media configured to receive one or more particles of a plurality of particles within the volume of fluid and the replaceable collection media assembly is arranged within the internal sensor portion in a particle collection position;
    a housing defining the internal sensor portion and being selectively configurable between an open housing configuration and a closed housing configuration, wherein when the housing is in the closed housing configuration, a vertical compression force is applied to the replaceable collection media assembly so as to at least partially constrain the replaceable collection media assembly in a vertical direction; and
    an imaging device, wherein the imaging device is configured to capture an image of at least a portion of the one or more particles of the plurality of particles received by the collection media using lensless holography.

2. The device of claim 1, further comprising a controller configured to determine, based at least in part on the image, at least one particle characteristic of the plurality of particles of the volume of fluid and fluid flow path extends in a fluid flow direction that is at least substantially toward the collection media.

3. The device of claim 2, wherein the collection media assembly dock element comprises one or more alignment features configured to engage the replaceable collection media assembly so as to constrain the replaceable collection media assembly against movement relative to the collection media assembly dock element.

4. The device of claim 3, wherein the replaceable collection media assembly further comprises one or more alignment features configured to engage the collection media assembly dock element so as to constrain the replaceable collection media assembly against movement relative to the collection media assembly dock element in at least a second direction.

5. The device of claim 3, wherein the housing comprises a fluid inlet configured to receive the volume of fluid, wherein the open housing configuration provides an opening through which the replaceable collection media assembly may be removed from within the internal sensor portion, and wherein the fluid composition sensor in the closed housing configuration is configured to constrain the replaceable collection media assembly against movement relative to the collection media assembly dock element in at least a lateral direction, a vertical direction, and an angular direction.

6. The device of claim 3, wherein the imaging device is operatively secured to the collection media assembly dock element.

7. The device of claim 3, wherein the fluid flow path is defined at least in part by a fluid impaction outlet disposed within the internal sensor portion and configured relative to the collection media assembly dock element so as to direct the volume of fluid in the fluid flow direction at least substantially perpendicular to the collection media of the replaceable collection media assembly received by the collection media assembly dock element.

8. The device of claim 7, wherein the fluid impaction outlet is defined at least in part by a fluid impaction outlet shape that is at least substantially similar to a field of view shape of the imaging device.

9. The device of claim 7, wherein the fluid composition sensor is configured such that at least a portion of the collection media of the replaceable collection media assembly received by the collection media assembly dock element is at least substantially aligned with a field of view of the imaging device and a central axis of the fluid impaction outlet.

10. The device of claim 7, wherein the fluid flow path is defined at least in part by an impactor nozzle, and wherein the fluid impaction outlet is defined by an impactor nozzle outlet of the impactor nozzle.

11. The device of claim 3, further comprising at least one illumination source configured to emit one or more light beams so as to engage the collection media of the replaceable collection media assembly received by the collection media assembly dock element and illuminate the one or more particles received by the collection media.

12. The device of claim 3, wherein one or both of the controller and the imaging device is configured to read one or more identification elements disposed on the replaceable collection media assembly received by the collection media assembly dock element so as to identify the replaceable collection media assembly, wherein the one or more identification elements configured to uniquely identify the replaceable collection media assembly.

13. The device of claim 1, wherein the fluid composition sensor is configured such that the volume of fluid passes over at least a portion of an internal circuitry disposed within the internal sensor portion before the volume of fluid is dispensed from the internal sensor portion through a fluid outlet of the fluid composition sensor.

14. The device of claim 1, wherein the fluid composition sensor is configured to consecutively receive a plurality of replaceable collection media assemblies within the internal sensor portion in series.

15. The device of claim 1, wherein the removable fluid flow component is configured to be removable from within the internal sensor portion when the fluid composition sensos in the open housing configuration.

16. A method for detecting fluid particle characteristics comprising:
 receiving, via a fluid composition sensor, a volume of fluid;
 capturing, using an imaging device disposed within the fluid composition sensor, an image of at least a portion of one or more particles of a plurality of particles received by a collection media using lensless holography;
 determining, based at least in part on the image, at least one particle characteristic of the plurality of particles of volume of fluid;
 upon determining the at least one particle characteristic of the plurality of particles of volume of fluid, reconfiguring the fluid composition sensor to an open configuration; and
 replacing a first replaceable collection media assembly with a second replaceable collection media assembly;
 wherein the second replaceable collection media assembly comprises at least one alignment feature, and wherein replacing the first replaceable collection media assembly with the second replaceable collection media assembly comprises positioning the second replaceable collection media assembly within a portion of the fluid composition sensor based at least in part on the at least one alignment feature, and wherein, when the fluid composition sensor is in a closed housing configuration, a vertical compression force is applied to the first replaceable collection media assembly so as to at least partially constrain the first replaceable collection media assembly in a vertical direction.

17. The method of claim 16, further comprising directing the volume of fluid, via an impactor nozzle, toward the collection media of the first replaceable collection media assembly and is captured using lensless holography.

18. The method of claim 16, further comprising receiving, via the collection media, the one or more particles of the plurality of particles within the volume of fluid for image capturing.

* * * * *